US006643328B2

(12) United States Patent
Yagasaki et al.

(10) Patent No.: US 6,643,328 B2
(45) Date of Patent: Nov. 4, 2003

(54) IMAGE ENCODER, IMAGE ENCODING METHOD, IMAGE DECODER, IMAGE DECODING METHOD, AND DISTRIBUTION MEDIA

(75) Inventors: Yoichi Yagasaki, Tokyo (JP); Teruhiko Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/128,904

(22) Filed: Apr. 24, 2002

(65) Prior Publication Data

US 2002/0118750 A1 Aug. 29, 2002

Related U.S. Application Data

(63) Continuation of application No. 09/200,064, filed on Nov. 25, 1998, now Pat. No. 6,414,991, which is a continuation of application No. PCT/JP98/01453, filed on Mar. 31, 1998.

(30) Foreign Application Priority Data

Apr. 1, 1997 (JP) .............................. 9-099683

(51) Int. Cl.[7] .............................. H04N 7/32
(52) U.S. Cl. ................................ 375/240.12
(58) Field of Search .............. 348/42, 699; 375/240.01, 375/240.08–240.16, 240.24, 240.25, 240.28; 382/232, 236, 238, 240, 243; H04N 7/12, 7/32

(56) References Cited

U.S. PATENT DOCUMENTS

| 5,060,285 A | 10/1991 | Dixit et al. |
| 5,414,469 A | 5/1995 | Gonzales et al. |
| 5,515,377 A | 5/1996 | Horne et al. |
| 5,701,126 A | 12/1997 | Kim |
| 5,742,343 A | 4/1998 | Haskell et al. |
| 5,818,531 A | 10/1998 | Yamaguchi et al. |
| 5,828,788 A | 10/1998 | Chiang et al. |

(List continued on next page.)

FOREIGN PATENT DOCUMENTS

| CN | 1129883 A | 8/1996 |
| EP | 0 539 833 A3 | 5/1993 |
| JP | 5-236447 | 9/1993 |
| JP | 8-223055 | 8/1996 |
| JP | 8-294127 | 11/1996 |
| WO | WO 98 02003 | 1/1998 |
| WO | WO 99 21367 | 4/1999 |

OTHER PUBLICATIONS

ISO/IEC AD HOC Group on MPEG–4 Video VM Editing: "MPEG–4 Video Verification Model Version 7.0 ISO/IEC JTC1/SC29/WG11 MPEG97/NI642" International Organization for Standarization—Organisation Internationale De Normalisation, XX, XX, Apr. 1997 , pp. 1–252 XP002144264.

(List continued on next page.)

Primary Examiner—Richard Lee
(74) Attorney, Agent, or Firm—Frommer Lawrence & Haug LLP; William S. Frommer; Gordon Kessler

(57) ABSTRACT

A group of video plane (GOV) layers in which the encoding start time is absolute time with an accuracy of one second is provided as a coded bit stream. A GOV layer can be inserted not only at the head of the coded bit stream but at an arbitrary position in the coded bit stream. The display time of each video object plane (VOP) included in the GOV layer is represented by modulo_time_base which represents absolute time in one second units with the encoding start time set as the standard, and VOP_time_increment, which represents in millisecond units, the time that has elapsed since the time point represented by the modulo_time_base.

10 Claims, 39 Drawing Sheets

U.S. PATENT DOCUMENTS

| | | | |
|---|---|---|---|
| 5,886,736 A | | 3/1999 | Chen |
| 5,973,739 A | | 10/1999 | Nilsson |
| 6,043,846 A | | 3/2000 | Shen et al. |
| 6,055,012 A | | 4/2000 | Haskell et al. |
| 6,057,884 A | * | 5/2000 | Chen et al. ............ 375/240.16 |
| 6,075,576 A | | 6/2000 | Tan et al. |
| 6,111,596 A | | 8/2000 | Haskell et al. |
| 6,148,026 A | | 11/2000 | Puri et al. |
| 6,233,356 B1 | * | 5/2001 | Haskell et al. ......... 375/240.11 |
| 6,314,209 B1 | * | 11/2001 | Kweon et al. .............. 382/232 |
| 6,339,618 B1 | * | 1/2002 | Puri et al. .............. 375/240.16 |
| 6,414,991 B1 | * | 7/2002 | Yagasaki et al. ....... 375/240.12 |

OTHER PUBLICATIONS

ISO/IEC AD HOC Group on MPEG–4 Video VM Editing: "MPEG–4 Video Verification Model Version 5.0 ISO/IEC JTC1/SC29/WG11 MPEG96/N1469" International Organization for Standarization—Organisation Internationale De Normalisation, XX, XX, Nov. 1996 , pp. 1–165, XP000992566.

"Transmission Of Non–Telephone Signals. Information Technology—Generic Coding of Moving Pictures and Associated Audio Information: Video" ITU–T Telecommunication Standardization Sector of ITU, XX, XX, Jul. 1, 1995, pp. A–B, I–VIII, 1, XP000198491.

* cited by examiner

Enhancement Layer
(A)
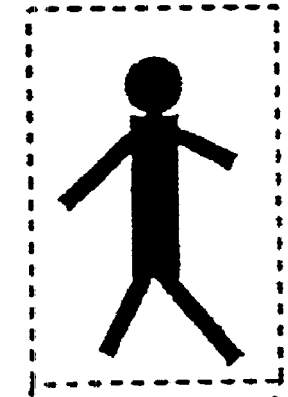
(B)
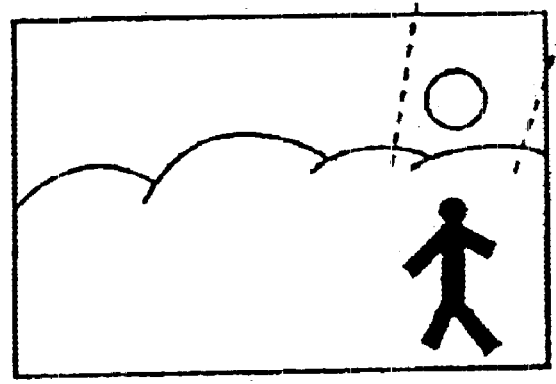
Base Layer
FIG. 7

Enhancement Layer
(A) 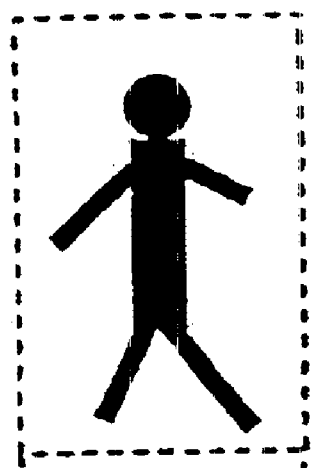
(B) 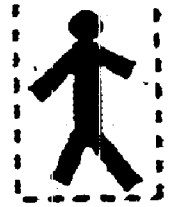
Base Layer
FIG. 9

BASE LAYER DECODING SECTION 95

ENHANCEMENT LAYER DECODING SECTION 93

Hierarchy in the proposed video syntax

Video Session Class

| Syntax | No. of bits | Mnemonic |
|---|---|---|
| Video Seeion(){ | | |
|     Video_session_start_code | sc+8=32 | |
|     do*{ | | |
|         Video Object() | | |
|     }while(nextbits()==video_object_start_code) | | |
|     vedeo_session_end_code | sc+8=32 | |
| } | | |

*concurrent loop solution to be provided by MSDL.

FIG. 20

Video Object

| Syntax | No. of bits | Mnemonic |
|---|---|---|
| Video Object(){ | | |
|     Video_object_start_code | sc+3=27 | |
|     Video_object_id | 5 | |
|     do{ | | |
|         Video Object Layer() | | |
|     }while(nextbits()== | | |
|         video_object_layer_start_code) | | |
| } | | |

FIG. 21

Video Object Layer

| Syntax | No. of bits | Mnemonic |
|---|---|---|
| Video Object Layer(){ | | |
|     video_object_layer_start_code | sc+4=28 | |
|     video_object_layer_id | 4 | |
|     video_object_layer_shape | 2 | |
|     if(video_object_layer_shape== "00" ){ | | |
|         video_object_layer_width | 10 | |
|         video_object_layer_height | 10 | |
|     } | | |
|     video_object_layer_quant_type | 1 | |
|     if(video_object_layer_quant_type){ | | |
|         load_intra_quant_mat | 1 | |
|         If(load_intra_quant_mat) | | |
|             intra_quant_mat[64] | 8*64 | |
|         load_nonintra_quant_mat | 1 | |
|         if(load_nonintra_quant_mat) | | |
|             nonintra_quant_mat[64] | 8*64 | |
|     } | | |
|     intra_dcpred_disable | 1 | |
|     video_object_layer_fcode_forward | 2 | |
|     video_object_layer_fcode_backward | 2 | |
|     separate_motion_shape_texture | 1 | |
|     scalability | 1 | |
|     if(scalability){ | | |
|         ref_layer_id | 4 | |
|         ref_layer_sampling_direc | 1 | |
|         hor_sampling_factor_n | 5 | |
|         hor_sampling_factor_m | 5 | |
|         vert_sampling_factor_n | 5 | |
|         vert_sampling_factor_m | 5 | |
|         enhancement_type | 1 | |
|     } | | |
|     do{ | | |
|         video object Plane() | | |
|     }while(nextbits()== | | |
|         video_object_plane_plane_start_code) | | |
| } | | |

FIG. 22

Video Object Plane

| Syntax | No. of bits | Mnemonic |
|---|---|---|
| Video Object Plane(){ | | |
|     VOP_start_code | sc+8=32 | |
|     do{ | | |
|         modulo_time_base | 1 | |
|     }while(modulo_time_base_!= "0" ) | | |
|     VOP_time_increment | 10 | |
|     VOP_prediction_type | 2 | |
|     if(video_object_layer_shape!= "0" ) { | | |
|         VOP_width | 10 | |
|         VOP_height | 10 | |
|         VOP_horizontal_mc_spatial_ref | 10 | |
|         marker_bit | 1 | |
|         VOP_vertical_mc_spatial_ref | 10 | |
|         if(scalability && enhancement_type) | | |
|           background_composition | 1 | |
|     } | | |
|     if(VOP_prediction_type== "10" ) | | |
|         VOP_dbquant | 2 | |
|     else | | |
|         VOP_quant | 5 | |
|     if(!scalability){ | | |
|         if(!separate_motion_shape_texture) | | |
|           combined_motion_shape_texture_coding() | | |
|         else{ | | |
|           do{ | | |
|             first_MMR_code | | |
|           }while(count of macroblocks! | 1-2 | |
|               =total number of macroblocks) | | |
|           motion_coding() | | |
|           shade_coding() | | |
|           texture_coding() | | |
|         } | | |
|     } | | |
|     else{ | | |
|         if(background_composition){ | | |
|           load_backward_shape | | |
|           if(load_backward_shape){ | 1 | |
|             bacward_shape_coding() | | |
|           load_forward_shape | | |
|           if(load_forward_shape) | 1 | |
|             forward_shape_coding() | | |
|         } | | |
|         ref_select_code | | |
|         if(VOP_prediction_type== "01" | 2 | |
|           \| VOP_prediction_type== "10" ) { | | |
|           forward_temporal_ref | 10 | |
|           if(VOP_prediction_type_== "10" ){ | | |
|             marker_bit | 1 | |
|             backward_temporal_ref | 10 | |
|           } | | |
|         } | | |
|         combined_motion_shape_texture_coding() | | |
|     } | | |
| } | | |

FIG. 23

| Group of Video Object Plane | No. of bits | Mnemonie |
|---|---|---|
| Syntax | | |
| group_of_plane(){ | | |
|     group_start_code | 32 | bslbf |
|     time_code | 25 | bslbf |
|     closed_gop | 1 | uimsbf |
|     broken_link | 1 | uimsbf |
|     next_start_code() | | |
| } | | |

FIG. 26 time_code

| time_code | range of value | No. of bits | Mnemonic |
|---|---|---|---|
| drop_frame_flag | | 1 | uimsbf |
| time_code_hours | 0-23 | 5 | uimsbf |
| time_code_minutes | 0-59 | 6 | uimsbf |
| marker_bit | 1 | 1 | bslbf |
| time_code_seconds | 0-59 | 6 | uimsbf |
| time_code_pictures | 0-59 | 6 | uimsbf |

FIG. 27

IMAGE ENCODER, IMAGE ENCODING METHOD, IMAGE DECODER, IMAGE DECODING METHOD, AND DISTRIBUTION MEDIA

CROSS REFERENCE TO RELATED APPLICATIONS

This is a continuation of U.S. patent application Ser. No. 09/200,064 filed Nov. 25, 1998, now U.S. Pat. No. 6,414, 991, which is a continuation of copending International Application PCT/JP98/01453, having an International filing date of Mar. 31, 1998.

TECHNICAL FIELD

The present invention relates to an image encoder, an image encoding method, an image decoder, an image decoding method, and distribution media. More particularly, the invention relates to an image encoder, an image encoding method, an image decoder, an image decoding method, and distribution media suitable for use, for example, in the case where dynamic image data is recorded on storage media, such as a magneto-optical disk, magnetic tape, etc., and also the recorded data is regenerated and displayed on a display, or in the case where dynamic image data is transmitted from a transmitter side to a receiver side through a transmission path and, on the receiver side, the received dynamic image data is displayed or it is edited and recorded, as in videoconference systems, videophone systems, broadcasting equipment, and multimedia data base retrieval systems.

BACKGROUND ART

For instance, as in videoconference systems and videophone systems, in systems which transmit dynamic image data to a remote place, image data is compressed and encoded by taking advantage of the line correlation and interframe correlation in order to take efficient advantage of transmission paths.

As a representative high-efficient dynamic image encoding system, there is a dynamic image encoding system for storage media, based on Moving Picture Experts Group (MPEG) standard. This MPEG standard has been discussed by the International Organization for Standardization (ISO)-IEC/JTC1/SC2/WG11 and has been proposed as a proposal for standard. The MPEG standard has adopted a hybrid system using a combination of motion compensative predictive coding and discrete cosine transform (DCT) coding.

The MPEG standard defines some profiles and levels in order to support a wide range of applications and functions. The MPEG standard is primarily based on Main Profile at Main level (MP@ML).

FIG. 1 illustrates the constitution example of an MP@ML encoder in the MPEG standard system.

Image data to be encoded is input to frame memory 31 and stored temporarily. A motion vector detector 32 reads out image data stored in the frame memory 31, for example, at a macroblock unit constituted by 16 (16 pixels, and detects the motion vectors.

Here, the motion vector detector 32 processes the image data of each frame as any one of an intracoded picture (I-picture), a forward predictive-coded picture (P-picture), or a bidirectionally predictive-coded picture (B-picture). Note that how images of frames input in sequence are processed as I-, P-, and B-pictures has been predetermined (e.g., images are processed as I-picture, B-picture, P-picture, B-picture, P-picture, . . . , B-picture, and P-picture in the recited order).

That is, in the motion vector detector 32, reference is made to a predetermined reference frame in the image data stored in the frame memory 31, and a small block of 16 pixels (16 lines (macroblock) in the current frame to be encoded is matched with a set of blocks of the same size in the reference frame. With block matching, the motion vector of the macroblock is detected.

Here, in the MPEG standard, predictive modes for an image include four kinds: intracoding, forward predictive coding, backward predictive coding, and bidirectionally predictive coding. An I-picture is encoded by intracoding. A P-picture is encoded by either intracoding or forward predictive coding. A B-picture is encoded by either intracoding, forward predictive coding, backward predictive coding, or bidirectionally predictive coding.

That is, the motion vector detector 32 sets the intracoding mode to an I-picture as a predictive mode. In this case, the motion vector detector 32 outputs the predictive mode (intracoding mode) to a variable word length coding (VLC) unit 36 and a motion compensator 42 without detecting the motion vector.

The motion vector detector 32 also performs forward prediction for a P-picture and detects the motion vector. Furthermore, in the motion vector detector 32, a prediction error caused by performing forward prediction is compared with dispersion, for example, of macroblocks to be encoded (macroblocks in the P-picture). As a result of the comparison, when the dispersion of the macroblocks is smaller than the prediction error, the motion vector detector 32 sets an intracoding mode as the predictive mode and outputs it to the VLC unit 36 and motion compensator 42. Also, if the prediction error caused by performing forward prediction is smaller, the motion vector detector 32 sets a forward predictive coding mode as the predictive mode. The forward predictive coding mode, along with the detected motion vector, is output to the VLC unit 36 and motion compensator 42.

The motion vector detector 32 further performs forward prediction, backward prediction, and bidirectional prediction for a B-picture and detects the respective motion vectors. Then, the motion vector detector 32 detects the minimum error from among the prediction errors in the forward prediction, backward prediction, and bidirectional prediction (hereinafter referred to the minimum prediction error as needed), and compares the minimum prediction error with dispersion, for example, of macroblocks to be encoded (macroblocks in the B-picture). As a result of the comparison, when the dispersion of the macroblocks is smaller than the minimum prediction error, the motion vector detector 32 sets an intracoding mode as the predictive mode and outputs it to the VLC unit 36 and motion compensator 42. Also, if the minimum prediction error is smaller, the motion vector detector 32 sets as the predictive mode a predictive mode in which the minimum prediction error was obtained. The predictive mode, along with the corresponding motion vector, is output to the VLC unit 36 and motion compensator 42.

If the motion compensator 42 receives both the predictive mode and the motion vector from the motion vector detector 32, the motion compensator 42 will read out the coded and previously locally decoded image data stored in the frame memory 41 in accordance with the received predictive mode and motion vector. This read image data is supplied to arithmetic units 33 and 40 as predicted image data.

The arithmetic unit 33 reads from the frame memory 31 the same macroblock as the image data read out from the frame memory 31 by the motion vector detector 32, and computes the difference between the macroblock and the predicted image which was supplied from the motion compensator 42. This differential value is supplied to a DCT unit 34.

On the other hand, in the case where a predictive mode alone is received from the motion vector detector 32, i.e., the case where a predictive mode is an intracoding mode, the motion compensator 42 does not output a predicted image. In this case, the arithmetic unit 33 (the arithmetic unit 40 as well) outputs to the DCT unit 34 the macroblock read out from the frame memory 31 without processing it.

In the DCT unit 34, DCT is applied to the output data of the arithmetic unit 33, and the resultant DCT coefficients are supplied to a quantizer 35. In the quantizer 35, a quantization step (quantization scale) is set in correspondence to the data storage quantity of the buffer 37 (which is the quantity of the data stored in a buffer 37) (buffer feedback). In the quantization step, the DCT coefficients from the DCT unit 34 are quantized. The quantized DCT coefficients (hereinafter referred to as quantized coefficients as needed), along with the set quantization step, are supplied to the VLC unit 36.

In the VLC unit 36, the quantized coefficients supplied by the quantizer 35 are transformed to variable word length codes such as Huffman codes and output to the buffer 37. Furthermore, in the VLC unit 36, the quantization step from the quantizer 35 is encoded by variable word length coding, and likewise the predictive mode (indicating either intracoding (image predictive intracoding), forward predictive coding, backward predictive coding, or bidirectionally predictive coding) and motion vector from the motion vector detector 32 are encoded. The resultant coded data is output to the buffer 37.

The buffer 37 temporarily stores the coded data supplied from the VLC unit 36, thereby smoothing the stored quantity of data. For example, the smoothed data is output to a transmission path or recorded on a storage medium, as a coded bit stream.

The buffer 37 also outputs the stored quantity of data to the quantizer 35. The quantizer 35 sets a quantization step in correspondence to the stored quantity of data output by this buffer 37. That is, when there is a possibility that the capacity of the buffer 37 will overflow, the quantizer 35 increases the size of the quantization step, thereby reducing the data quantity of quantized coefficients. When there is a possibility that the capacity of the buffer 37 will be caused to be in a state of underflow, the quantizer 35 reduces the size of the quantization step, thereby increasing the data quantity of quantized coefficients. In this manner, the overflow and underflow of the buffer 37 are prevented.

The quantized coefficients and quantization step, output by the quantizer 35, are not supplied only to the VLC unit 36 but also to an inverse quantizer 38. In the inverse quantizer 38, the quantized coefficients from the quantizer 35 are inversely quantized according to the quantization step supplied from the quantizer 35, whereby the quantized coefficients are transformed to DCT coefficients. The DCT coefficients are supplied to an inverse DCT unit (IDCT unit) 39. In the IDCT 39, an inverse DCT is applied to the DCT coefficients and the resultant data is supplied to the arithmetic unit 40.

In addition to the output data of the IDCT unit 39, the same data as the predicted image supplied to the arithmetic unit 33 is supplied from the motion compensator 42 to the arithmetic unit 40, as described above. The arithmetic unit 40 adds the output data (prediction residual (differential data)) of the IDCT unit 39 and the predicted image data of the motion compensator 42, thereby decoding the original image data locally. The locally decoded image data is output. (However, in the case where a predictive mode is an intracoding mode, the output data of the IDCT 39 is passed through the arithmetic unit 40 and supplied to the frame memory 41 as locally decoded image data without being processed.) Note that this decoded image data is consistent with decoded image data that is obtained at the receiver side.

The decoded image data obtained in the arithmetic unit 40 (locally decoded image data) is supplied to the frame memory 41 and stored. Thereafter, the decoded image data is employed as reference image data (reference frame) with respect to an image to which intracoding (forward predictive coding, backward predictive coding, or bidirectionally predictive coding) is applied.

Next, FIG. 2 illustrates the constitution example of an MP@ML decoder in the MPEG standard system which decodes the coded data output from the encoder of FIG. 1.

The coded bit stream (coded data) transmitted through a transmission path is received by a receiver (not shown), or the coded bit stream (coded data) recorded in a storage medium is regenerated by a regenerator (not shown). The received or regenerated bit stream is supplied to a buffer 101 and stored.

An inverse VLC unit (IVLC unit (variable word length decoder)) 102 reads out the coded data stored in the buffer 101 and performs variable length word decoding, thereby separating the coded data into the motion vector, predictive mode, quantization step, and quantized coefficients at a macroblock unit. Among them, the motion vector and the predictive mode are supplied to a motion compensator 107, while the quantization step and the quantized macroblock coefficients are supplied to an inverse quantizer 103.

In the inverse quantizer 103, the quantized macroblock coefficients supplied from the IVLC unit 102 are inversely quantized according to the quantization step supplied from the same IVLC unit 102. The resultant DCT coefficients are supplied to an IDCT unit 104. In the IDCT 104, an inverse DCT is applied to the macroblock DCT coefficients supplied from the inverse quantizer 103, and the resultant data is supplied to an arithmetic unit 105.

In addition to the output data of the IDCT unit 104, the output data of the motion compensator 107 is also supplied to the arithmetic unit 105. That is, in the motion compensator 107, as in the case of the motion compensator 42 of FIG. 1, the previously decoded image data stored in the frame memory 106 is read out according to the motion vector and predictive mode supplied from the IVLC unit 102 and is supplied to the arithmetic unit 105 as predicted image data. The arithmetic unit 105 adds the output data (prediction residual (differential value)) of the IDCT unit 104 and the predicted image data of the motion compensator 107, thereby decoding the original image data. This decoded image data is supplied to the frame memory 106 and stored. Note that, in the case where the output data of the IDCT unit 104 is intracoded data, the output data is passed through the arithmetic unit 105 and supplied to the frame memory 106 as decoded image data without being processed.

The decoded image data stored in the frame memory 106 is employed as reference image data for the next image data to be decoded. Furthermore, the decoded image data is supplied, for example, to a display (not shown) and displayed as an output reproduced image.

Note that in MPEG-1 standard and MPEG-2 standard, a B-picture is not stored in the frame memory 41 in the encoder (FIG. 1) and the frame memory 106 in the decoder (FIG. 2), because it is not employed as reference image data.

The aforementioned encoder and decoder shown in FIGS. 1 and 2 are based on MPEG-1/2 standard. Currently a system for encoding video at a unit of the video object (VO) of an object sequence constituting an image is being standardized as MPEG-4 standard by the ISO-IEC/JTC1/SC29/WG11.

Incidentally, since the MPEG-4 standard is being standardized on the assumption that it is primarily used in the field of communication, it does not prescribe the group of pictures (GOP) prescribed in the MPEG-1/2 standard. Therefore, in the case where the MPEG-4 standard is utilized in storage media, efficient random access will be difficult.

DISCLOSURE OF INVENTION

The present invention has been made in view of such circumstances and therefore the object of the invention is to make efficient random access possible.

An image encoder comprises encoding means for partitioning one or more layers of each sequence of objects constituting an image into a plurality of groups and encodes the groups.

An image encoding method partitions one or more layers of each sequence of objects constituting an image into a plurality of groups and encodes the groups.

An image encoder comprises decoding means for decoding a coded bit stream obtained by partitioning one or more layers of each sequence of objects constituting an image into a plurality of groups which are encoded.

An image decoding method decodes a coded bit stream obtained by partitioning one or more layers of each sequence of objects constituting an image into a plurality of groups which were encoded.

A distribution medium distributes the coded bit stream which is obtained by partitioning one or more layers of each sequence of objects constituting an image into a plurality of groups which are encoded.

An image encoder comprises: second-accuracy time information generation means for generating second-accuracy time information which indicates time within accuracy of a second; and detailed time information generation means for generating detailed time information which indicates a time period between the second-accuracy time information directly before display time of the I-VOP, P-VOP, or B-VOP and the display time within accuracy finer than accuracy of a second.

An image encoding method generates second-accuracy time information which indicates time within accuracy of a second; and generates detailed time information which indicates a time period between the second-accuracy time information directly before display time of the I-VOP, P-VOP, or B-VOP and the display time within accuracy finer than accuracy of a second.

An image decoder comprises display time computation means for computing display time of I-VOP, P-VOP, or B-VOP on the basis of the second-accuracy time information and detailed time information.

An image decoding method comprises computing display time of I-VOP, P-VOP, or B-VOP on the basis of the second-accuracy time information and detailed time information.

A distribution medium distributes a coded bit stream which is obtained by generating second-accuracy time information which indicates time within accuracy of a second, also by generating detailed time information which indicates a time period between the second-accuracy time information directly before display time of the I-VOP, P-VOP, or B-VOP and the display time within accuracy finer than accuracy of a second, and adding the second-accuracy time information and detailed time information to a corresponding I-VOP, P-VOP, or B-VOP as information which indicates display time of the I-VOP, P-VOP, or B-VOP.

BRIEF DESCRIPTION OF THE DRAWINGS

FIG. 7 is a diagram for explaining spatial scalability;

FIG. 9 is a diagram for explaining spatial scalability;

FIG. 20 is a diagram showing the syntax of VS;

FIG. 21 is a diagram showing the syntax of a VO;

FIG. 22 is a diagram showing the syntax of a VOL;

FIG. 23 is a diagram showing the syntax of a VOP;

FIG. 26 is a diagram showing the syntax of a GOV;

FIG. 27 is a diagram showing the constitution of time_code;

BEST MODE FOR CARRYING OUT THE INVENTION

Embodiments of the present invention will hereinafter be described in detail with reference to the drawings. Before that, in order to make clear the corresponding relation between each means of the present invention as set forth in claims and the following embodiments, the characteristics of the present invention will hereinafter be described in detail by adding a corresponding embodiment within a parenthesis after each means. The corresponding embodiment is merely an example.

Figure 11:
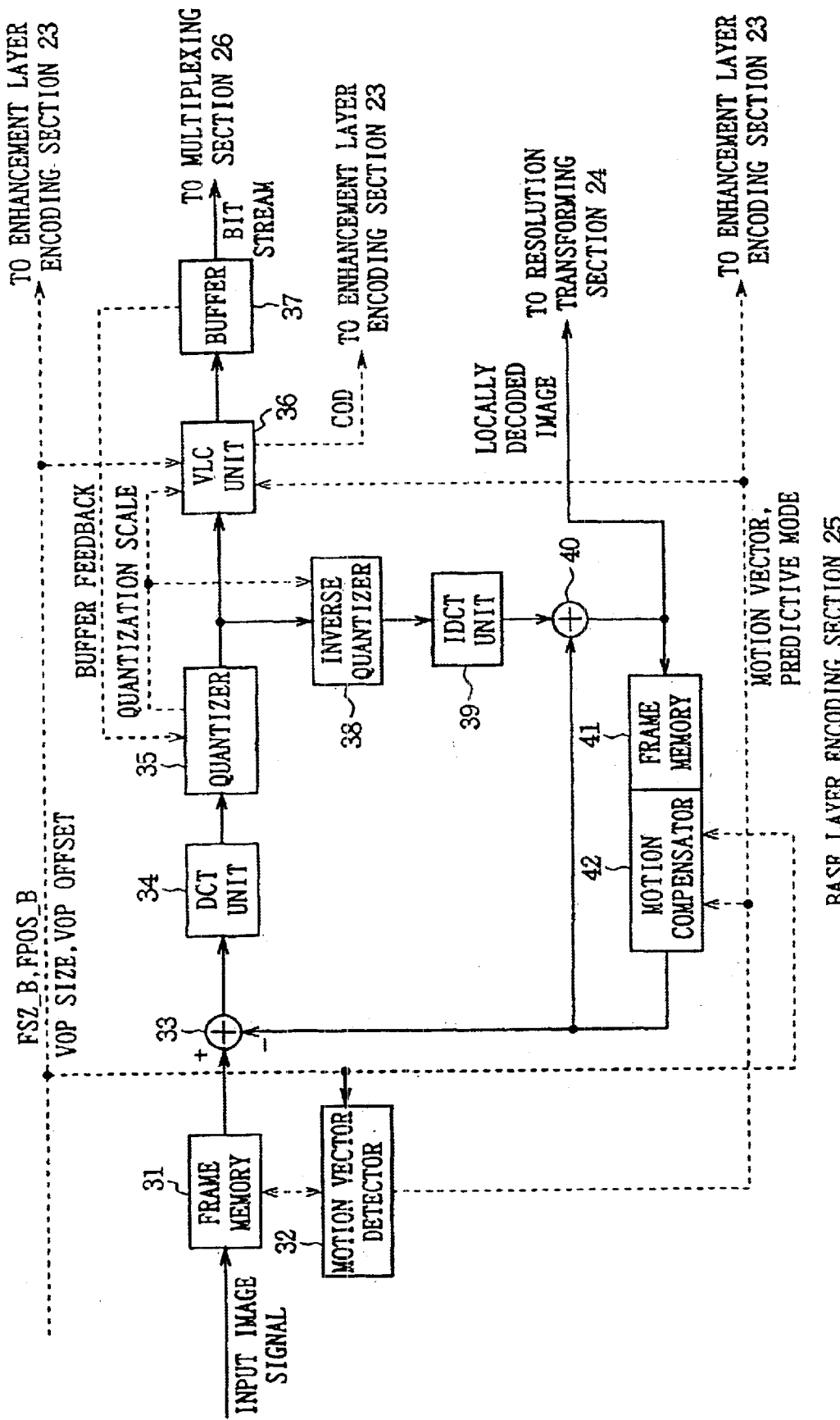
FIG. 11 is a block diagram showing the constitution example of the base layer encoding section 25 of FIG. 5.
Figure 12:
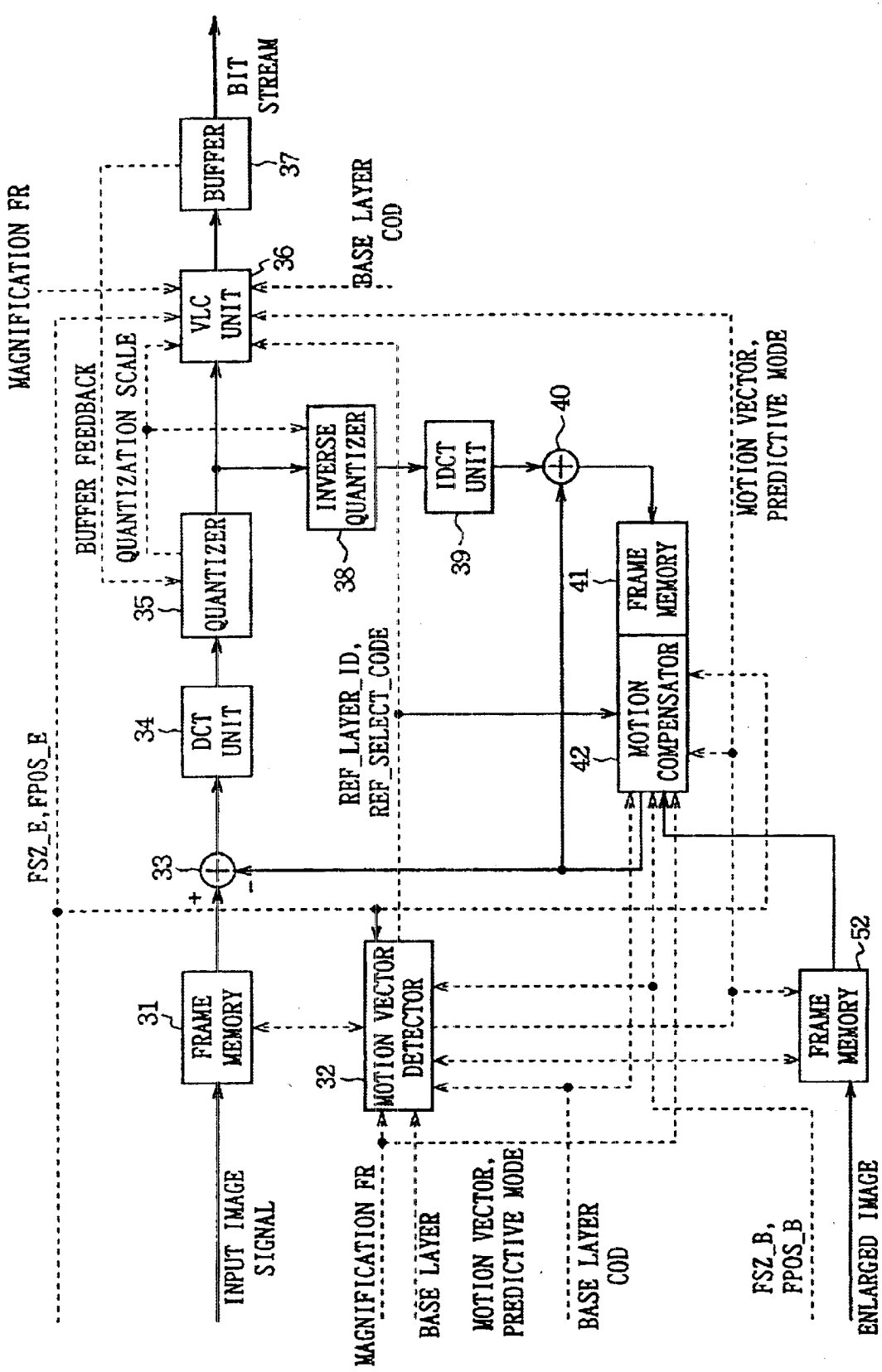
FIG. 12 is a block diagram showing the constitution example of the enhancement layer encoding section 23 of FIG. 5.

That is, the image encoder encodes an image and outputs the resultant coded bit stream, the image encoder comprises: receiving means for receiving the image (e.g., frame memory 31 shown in FIG. 11 or 12, etc.); and encoding means for partitioning one or more layers of each of the objects constituting the image into a plurality of groups and encoding the groups (e.g., VLC unit 36 shown in FIG. 11 or 12, etc.)

When it is assumed that an object which is encoded by intracoding is an intra-video object plane (I-VOP), an object which is encoded by either intracoding or forward predictive coding is a predictive-VOP (P-VOP), and an object which is encoded by either intracoding, forward predictive coding, backward predictive coding, or bidirectionally predictive coding is a bidirectionally predictive-VOP (B-VOP), the image encoder further comprises second-accuracy time information generation means for generating second-accuracy time information which indicates time within accuracy of a second based on encoding start second-accuracy absolute time (e.g., processing steps S3 to S7 in the program shown in FIG. 32, processing steps S43 to S47 in the program shown in FIG. 37, etc.); detailed time information generation means for generating detailed time information which indicates a time period between the second-accuracy time information directly before display time of the I-VOP, P-VOP, or B-VOP included in the object group and the display time within accuracy finer than accuracy of a second (e.g., processing step S8 in the program shown in FIG. 32, processing step S48 in the program shown in FIG. 37, etc.); and addition means for adding the second-accuracy time information and detailed time information to a corresponding I-VOP, P-VOP, or B-VOP as information which indicates display time of the I-VOP, P-VOP, or B-VOP (e.g., VLC unit 36 shown in FIG. 11 or 12, etc.).

Figure 17:
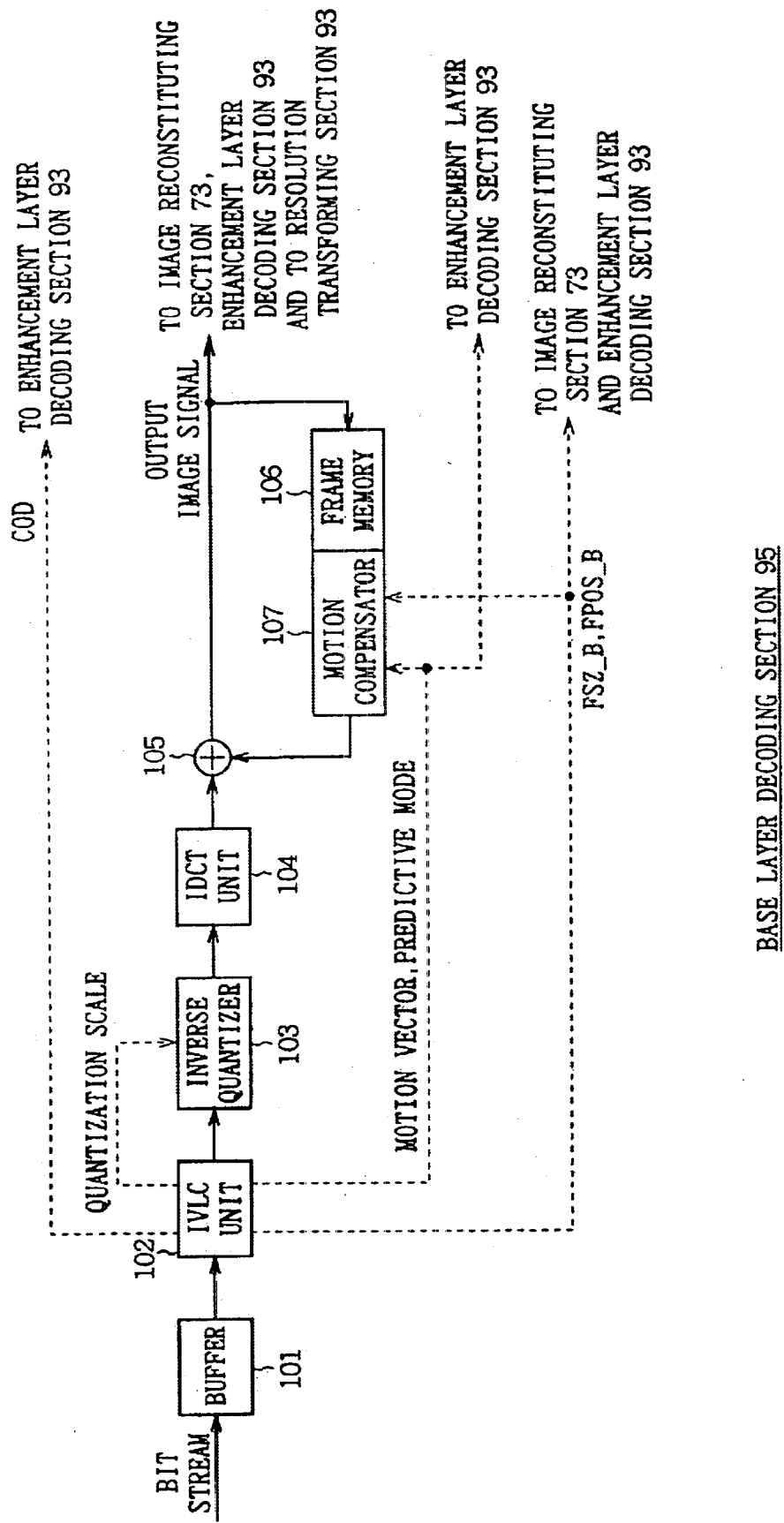
FIG. 17 is a block diagram showing the constitution example of the base layer decoding section 95 of FIG. 16.
Figure 18:
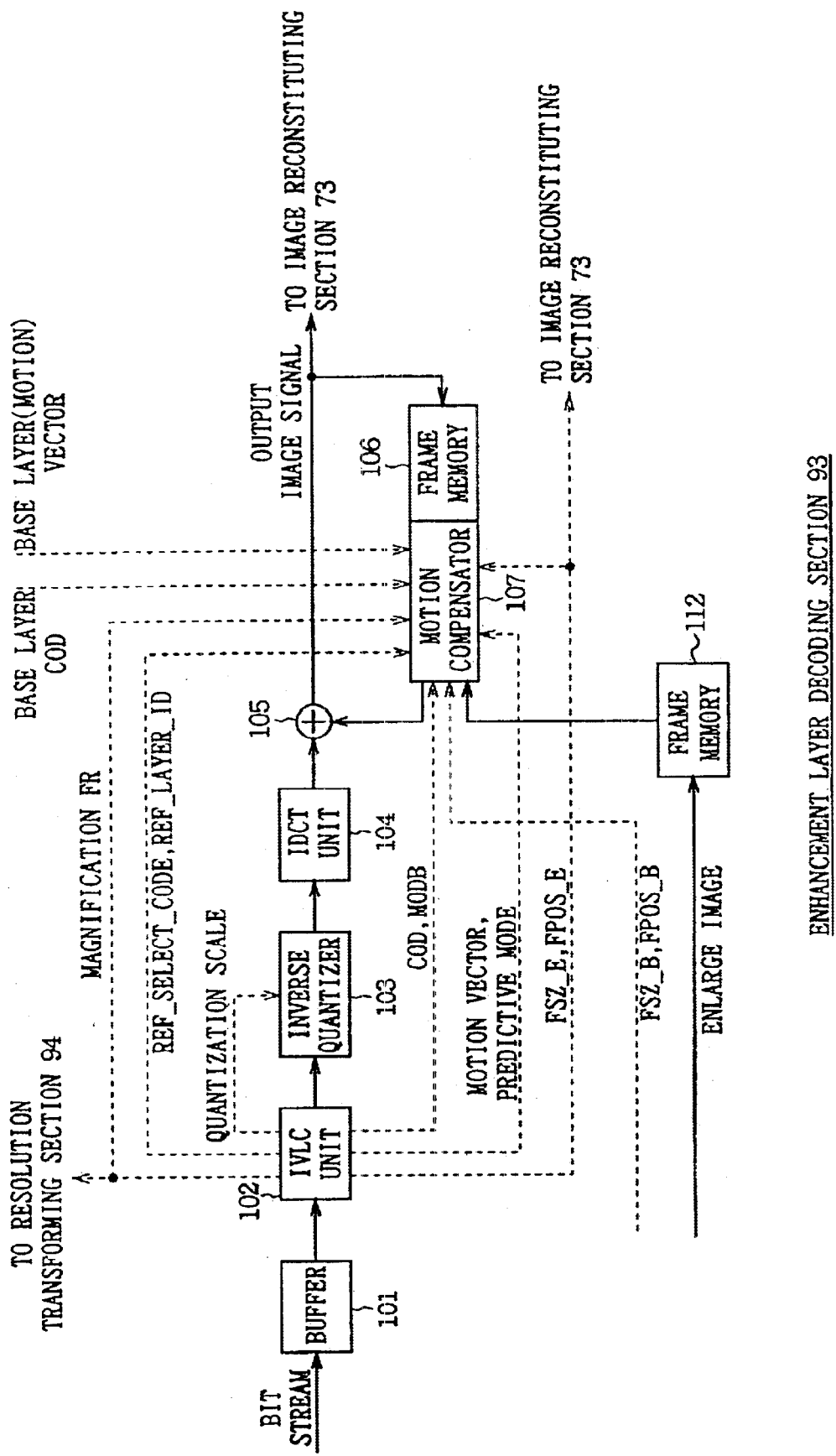
FIG. 18 is a block diagram showing the constitution example of the enhancement layer decoding section 93 of FIG. 16.

The image decoder comprises receiving means for receiving a coded bit stream obtained by partitioning one or more layers of each of objects constituting the image into a plurality of groups which are encoded (e.g., buffer 101 shown in FIG. 17 or 18, etc.); and decoding means for decoding the coded bit stream (e.g., IVLC unit 102 shown in FIG. 17 or 18, etc.).

The image decoder preferably operates as illustrated by: (e.g., processing steps S22 to S27 in the program shown in FIG. 34, processing steps S52 to S57 in the program shown in FIG. 38, etc.).

Note that, of course, this description does not mean that each means is limited to the aforementioned.

Figure 3:
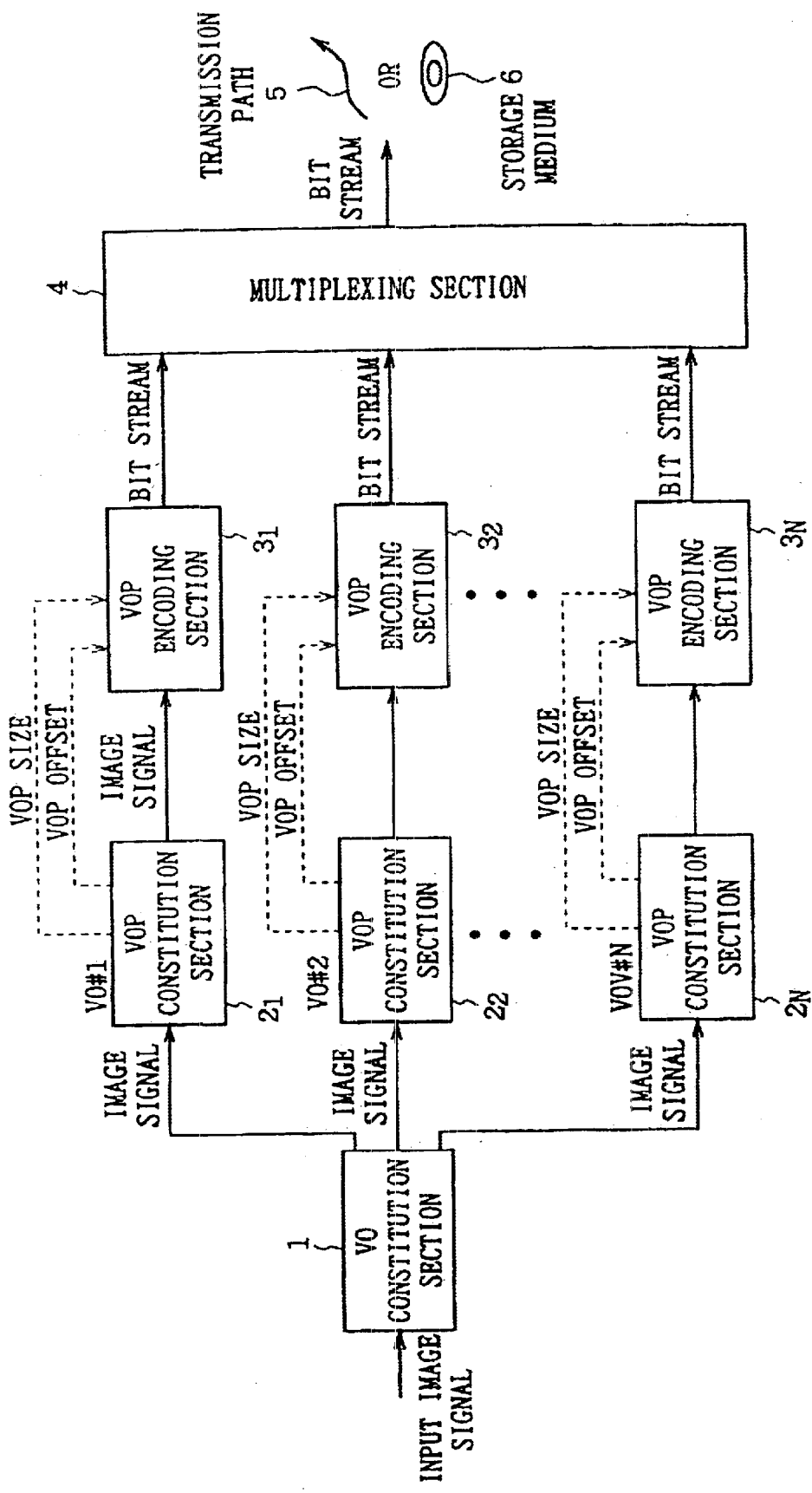
FIG. 3 is a block diagram showing the constitution example of an embodiment of an encoder to which the present invention is applied.

FIG. 3 shows the constitution example of an embodiment of an encoder to which the present invention is applied.

Image (dynamic image) data to be encoded is input to a video object (VO) constitution section 1. In the VO constitution section 1, the image is constituted for each object by a sequence of VOs. The sequence of VOs are output to VOP constitution sections 21 to 2N. That is, in the VO constitution section 1, in the case where N video objects (VO#1 to VO#N) are produced, the VO#1 to VO#N are output to the VOP constitution sections 21 to 2N, respectively.

More specifically, for example, when image data to be encoded is constituted by a sequence of independent background F1 and foreground F2, the VO constitution section 1 outputs the foreground F2, for example, to the VOP constitution section 21 as VO#1 and also outputs the background F1 to the VOP constitution section 22 as VO#2.

Note that, in the case where image data to be encoded is, for example, an image previously synthesized by background F1 and foreground F2, the VO constitution section 1 partitions the image into the background F1 and foreground F2 in accordance with a predetermined algorithm. The background F1 and foreground F2 are output to corresponding VOP constitution sections 2n (where n=1, 2, . . . , and N).

The VOP constitution sections 2n produce VO planes (VOPs) from the outputs of the VO constitution section 1. That is, for example, an object is extracted from each frame. For example, the minimum rectangle surrounding the object (hereinafter referred to as the minimum rectangle as needed) is taken to be the VOP. Note that, at this time, the VOP constitution sections 2n produce the VOP so that the number of horizontal pixels and the number of vertical pixels are a multiple of 16. If the VO constitution sections 2n produce VOPs, the VOPs are output to VOP encoding sections 3n, respectively.

Furthermore, the VOP constitution sections 2n detect size data (VOP size) indicating the size of a VOP (e.g., horizontal and vertical lengths) and offset data (VOP offset) indicating the position of the VOP in a frame (e.g., coordinates as the left uppermost of a frame is the origin). The size data and offset data are also supplied to the VOP encoding sections 3n.

The VOP encoding sections 3n encode the outputs of the VOP constitution sections 2n, for example, by a method based on MPEG standard or H.263 standard. The resulting bit streams are output to a multiplexing section 4 which multiplexes the bit streams obtained from the VOP encoding sections 31 to 3N. The resulting multiplexed data is transmitted through a ground wave or through a transmission path 5 such as a satellite line, a CATV network, etc. Alternatively, the multiplexed data is recorded on storage media 6 such as a magnetic disk, a magneto-optical disk, an optical disk, magnetic tape, etc.

Here, a description will be made of the video object (VO) and the video object plane (VOP).

In the case of a synthesized image, each of the images constituting the synthesized image is referred to as the VO, while the VOP means a VO at a certain time. That is, for example, in the case of a synthesized image F3 constituted by images F1 and F2, when the image F1 and F2 are arranged in a time series manner, they are VOs. The image F1 or F2 at a certain time is a VOP. Therefore, it may be said that the VO is a set of the VOPs of the same object at different times.

For instance, if it is assumed that image F1 is background and also image F2 is foreground, synthesized image F3 will be obtained by synthesizing the images F1 and F2 with a key signal for extracting the image F2. The VOP of the image F2 in this case is assumed to include the key signal in addition to image data (luminance signal and color difference signal) constituting the image F2.

An image frame does not vary in both size and position, but there are cases where the size or position of a VO changes. That is, even in the case a VOP constitutes the same VO, there are cases where the size or position varies with time.

Figure 4:
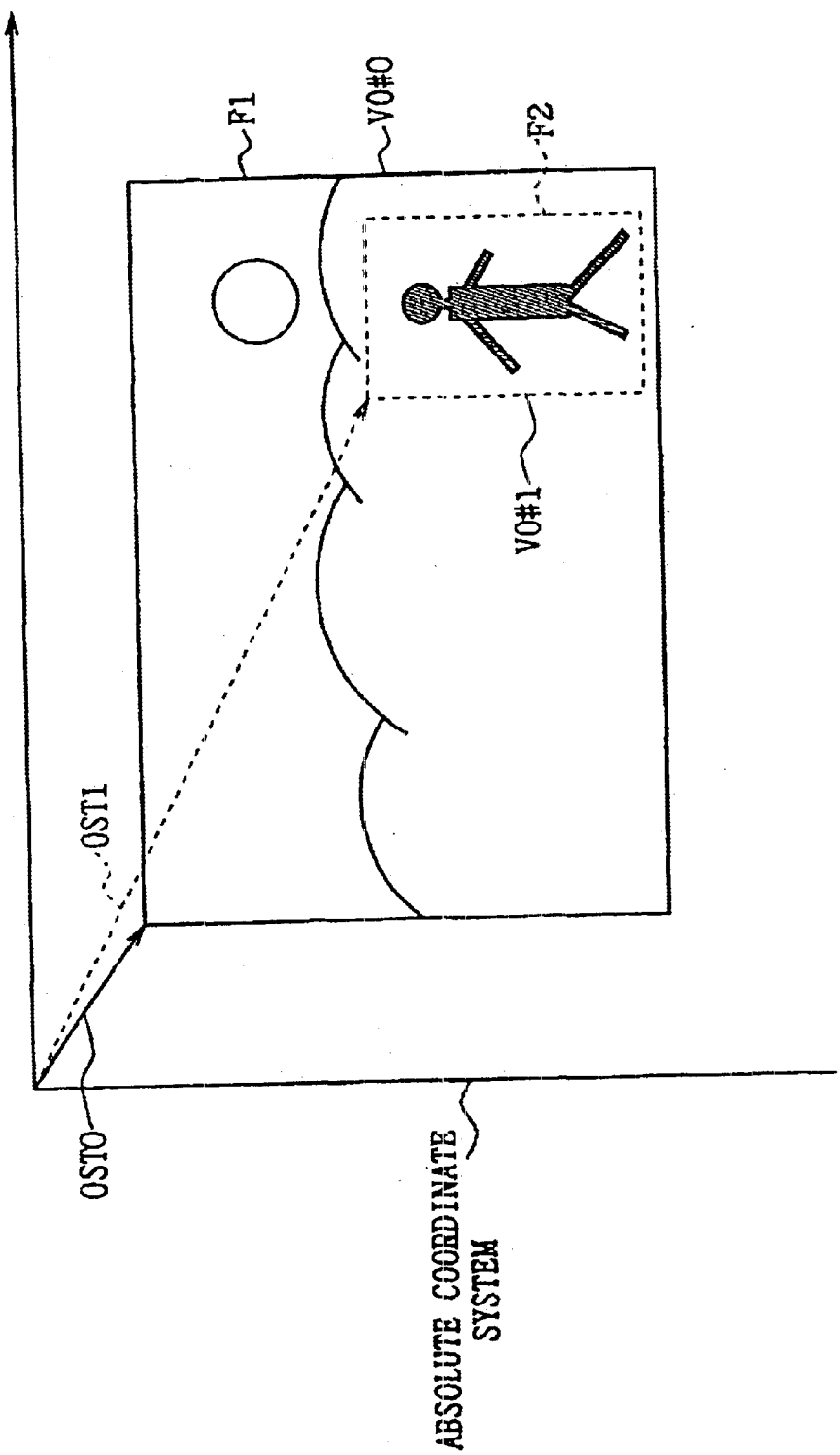
FIG. 4 is a diagram for explaining that the position and size of a video object (VO) vary with time.

Specifically, FIG. 4 illustrates a synthesized image constituted by image F1 (background) and image F2 (foreground).

For example, assume that the image F1 is an image obtained by photographing a certain natural scene and that the entire image is a single VO (e.g., VO#0). Also assume that the image F2 is an image obtained by photographing a person who is walking and that the minimum rectangular surrounding the person is a single VO (e.g., VO#1).

In this case, since the VO#0 is the image of a scene, basically both the position and the size do not change as in a normal image frame. On the other hand, since the VO#1 is the image of a person, the position or the size will change if the person moves right and left or moves toward this side or depth side in FIG. 4. Therefore, although FIG. 4 shows VO#0 and VO#1 at the same time, there are cases where the position or size of the VO varies with time.

Hence, the output-bit stream of the VOP encoding sections 3n of FIG. 3 includes information on the position (coordinates) and size of a VOP on a predetermined absolute coordinate system in addition to data indicating a coded VOP. Note in FIG. 4 that a vector indicating the position of the VOP of VO#0 (image F1) at a certain time is represented by OST0 and also a vector indicating the position of the VOP of VO#1 (image F2) at the certain time is represented by OST1.

Figure 5:
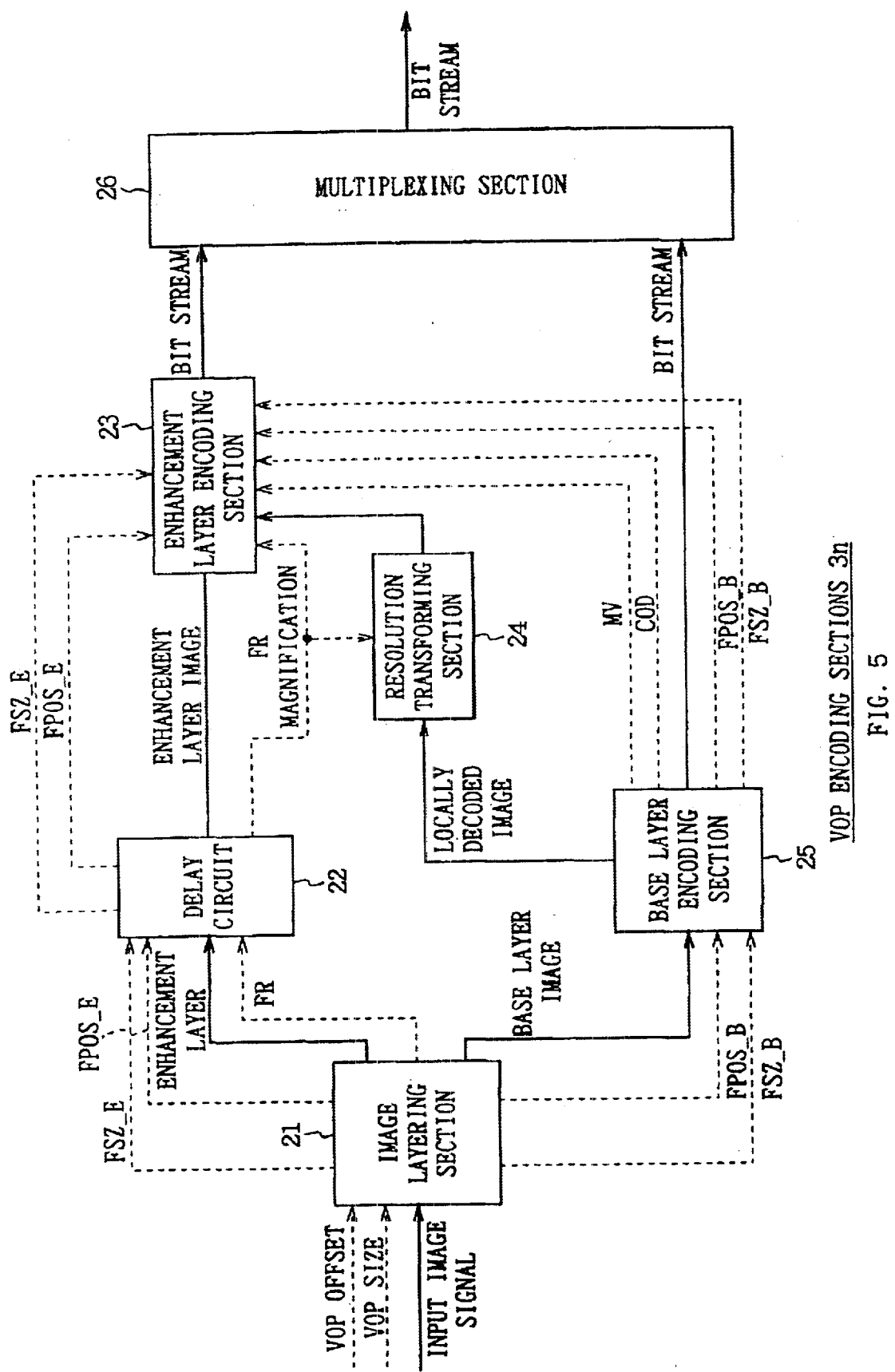
FIG. 5 is a block diagram showing the constitution example of the VOP encoding sections 31 to 3N of FIG. 3.

Next, FIG. 5 shows the constitution example of the VOP encoding sections 3n of FIG. 3 which realize scalability.

That is, the MPEG standard introduces a scalable encoding method which realizes scalability coping with different image sizes and frame rates. The VOP encoding sections 3n shown in FIG. 5 are constructed so that such scalability can be realized.

The VOP (image data), the size data (VOP size), and offset data (VOP offset) from the VOP constitution sections 2n are all supplied to an image layering section 21.

The image layering section 21 generates one or more layers of image data from the VOP (layering of the VOP is performed). That is, for example, in the case of performing encoding of spatial scalability, the image data input to the image layering section 21, as it is, is output as an enhancement layer of image data. At the same time, the number of pixels constituting the image data is reduced (resolution is reduced) by thinning out the pixels, and the image data reduced in number of pixels is output as a base layer of image data.

Note that an input VOP can be employed as a base layer of data and also the VOP increased in pixel number (resolution) by some other methods can be employed as an enhancement layer of data.

In addition, although the number of layers can be made 1, this case cannot realize scalability. In this case, the VOP encoding sections 3n are constituted, for example, by a base layer encoding section 25 alone.

Furthermore, the number of layers can be made 3 or more. But in this embodiment, the case of two layers will be described for simplicity.

For example, in the case of performing encoding of temporal scalability, the image layering section 21 outputs image data, for example, alternately base layer data or enhancement layer data in correspondence to time. That is, for example, when it is assumed that the VOPs constituting a certain VO are input in order of VOP0, VOP1, VOP2, VOP3, . . . , the image layering section 21 outputs VOP0, VOP2, VOP4, VOP6, . . . as base layer data and VOP1, VOP3, VOP5, VOP7, . . . as enhancement layer data. Note that, in the case of temporal scalability, the VOPs thus thinned out are merely output as base layer data and enhancement layer data and the enlargement or reduction of image data (resolution conversion) is not performed (But it is possible to perform the enlargement or reduction).

Also, for example, in the case of performing the encoding of signal-to-noise ratio (SNR) scalability, the image data input to the image layering section 21, as it is, is output as enhancement layer data or base layer data. That is, in this case, the base layer data and the enhancement layer data are consistent with each other.

Here, for the spatial scalability in the case of performing an encoding operation for each VOP, there are, for example, the following three kinds.

Figure 6:
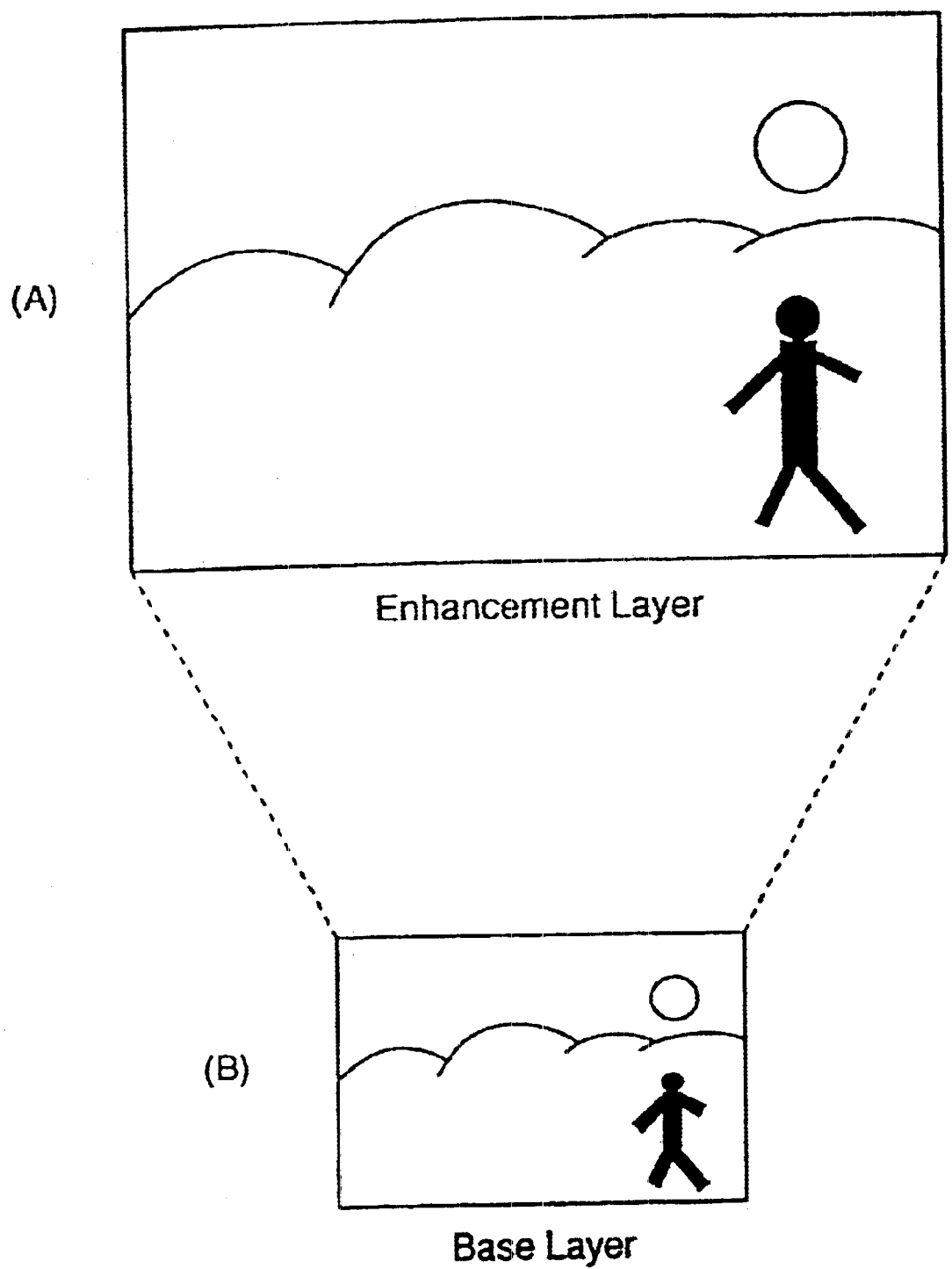
FIG. 6 is a diagram for explaining spatial scalability.

That is, for example, if it is now assumed that a synthesized image consisting of images F1 and F2 such as the one shown in FIG. 4 is input as a VOP, in the first spatial scalability the input entire VOP (FIG. 6(A)) is taken to be an enhancement layer, as shown in FIG. 6, and the entire VOP reduced (FIG. 6(B)) is taken to be a base layer.

Also, in the second spatial scalability, as shown in FIG. 7, an object constituting part of an input VOP (FIG. 7(A) (which corresponds to image F2)) is extracted. The extracted object is taken to be an enhancement layer, while the reduced entire VOP (FIG. 7(B)) is taken to be a base layer. (Such extraction is performed, for example, in the same manner as the case of the VOP constitution sections 2n. Therefore, the extracted object is also a single VOP.)

Figure 8:
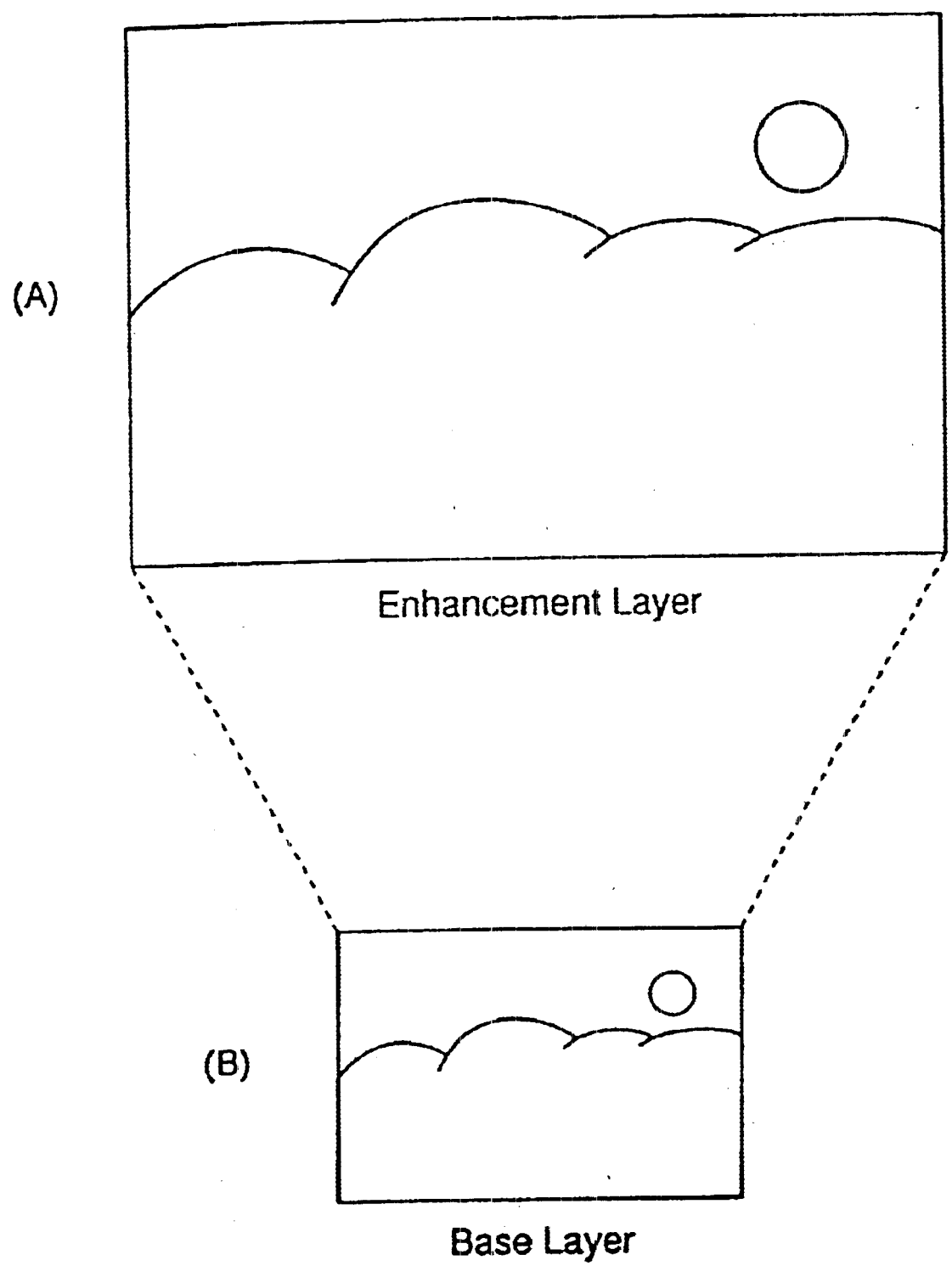
FIG. 8 is a diagram for explaining spatial scalability.

Furthermore, in the third scalability, as shown in FIGS. 8 and 9, objects (VOP) constituting an input VOP are extracted, and an enhancement layer and a base layer are generated for each object. Note that FIG. 8 shows an enhancement layer and a base layer generated from the background (image F1) constituting the VOP shown in FIG. 4, while FIG. 9 shows an enhancement layer and a base layer generated from the foreground (image F2) constituting the VOP shown in FIG. 4.

It has been predetermined which of the aforementioned scalabilities is employed. The image layering section 21 performs layering of a VOP so that encoding can be performed according to a predetermined scalability.

Furthermore, the image layering section 21 computes (or determines) the size data and offset data of generated base and enhancement layers from the size data and offset data of an input VOP (hereinafter respectively referred to as initial size data and initial offset data as needed). The offset data indicates the position of a base or enhancement layer in a predetermined absolute coordinate system of the VOP, while the size data indicates the size of the base or enhancement layer.

Here, a method of determining the offset data (position information) and size data of VOPs in base and enhancement layers will be described, for example, in the case where the above-mentioned second scalability (FIG. 7) is performed.

Figure 10:
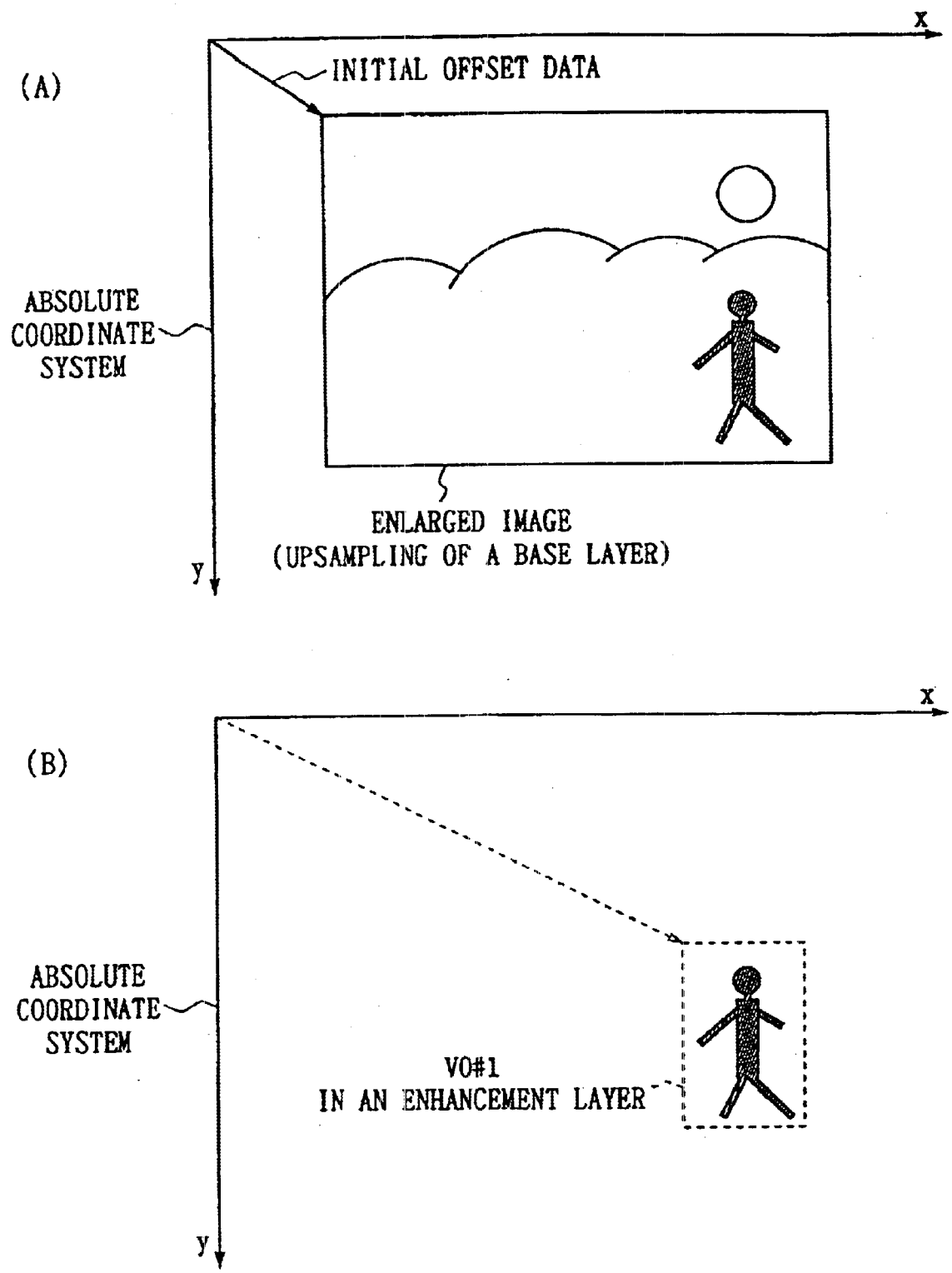
FIG. 10 is a diagram for explaining a method of determining the size data and offset data of a video object plane (VOP)

In this case, for example, the offset data of a base layer, FPOS_B, as shown in FIG. 10(A), is determined so that, when the image data in the base layer is enlarged (upsampled) based on the difference between the resolution of the base layer and the resolution of the enhancement layer, i.e., when the image in the base layer is enlarged with a magnification ratio such that the size is consistent with that of the image in the enhancement layer (a reciprocal of the demagnification ratio as the image in the base layer is generated by reducing the image in the enhancement layer) (hereinafter referred to as magnification FR as needed), the offset data of the enlarged image in the absolute coordinate system is consistent with the initial offset data. The size data of the base layer, FSZ_B, is likewise determined so that the size data of an enlarged image, obtained when the image in the base layer is enlarged with magnification FR, is consistent with the initial size data. That is, the offset data FPOS_B is determined so that it is FR times itself or consistent with the initial offset data. Also, the size data FSZ_B is determined in the same manner.

On the other hand, for the offset data FPOS_E of an enhancement layer, the coordinates of the left upper corner of the minimum rectangle (VOP) surrounding an object extracted from an input VOP, for example, are computed based on the initial offset data, as shown in FIG. 10(B), and this value is determined as offset data FPOS_E. Also, the size data FPOS_E of the enhancement layer is determined to the horizontal and vertical lengths, for example, of the minimum rectangle surrounding an object extracted from an input VOP.

Therefore, in this case, the offset data FPOS_B and size data FPOS_B of the base layer are first transformed according to magnification FR. (The offset data FPOS_B and size data FPOS_B after transformation are referred to as transformed offset data FPOS_B and transformed size data FPOS_B, respectively.) Then, at a position corresponding to the transformed offset data FPOS_B in the absolute coordinate system, consider an image frame of the size corresponding to the transformed size data FSZ_B. If an enlarged image obtained by enlarging the image data in the base layer by FR times is arranged at the aforementioned corresponding position (FIG. 10(A)) and also if the image in the enhancement layer is likewise arranged in the absolute coordinate system in accordance with the offset data FPOS_E and size data FPOS_E of the enhancement layer (FIG. 10(B)), the pixels constituting the enlarged image and the pixels constituting the image in the enhancement layer will be arranged so that mutually corresponding pixels are located at the same position. That is, for example, in FIG. 10, the person in the enhancement layer and the person in the enlarged image will be arranged at the same position.

Even in the case of the first scalability and the third scalability, the offset data FPOS_B, offset data FPOS_E, size data FSZ_B, and size data FSZ_E are likewise determined so that mutually corresponding pixels constituting an enlarged image in a base layer and an image in an enhancement layer are located at the same position in the absolute coordinate system.

Returning to FIG. 5, the image data, offset data FPOS_E, and size data FSZ_E in the enhancement layer, generated in the image layering section 21, are delayed by a delay circuit 22 by the processing period of a base layer encoding section 25 to be described later and are supplied to an enhancement layer encoding section 23. Also, the image data, offset data FPOS_B, and size data FSZ_B in the base layer are supplied to the base layer encoding section 25. In addition, magnification FR is supplied to the enhancement layer encoding section 23 and resolution transforming section 24 through the delay circuit 22.

In the base layer encoding section 25, the image data in the base layer is encoded. The resultant coded data (bit stream) includes the offset data FPOS_B and size data FSZ_B and is supplied to a multiplexing section 26.

Also, the base layer encoding section 25 decodes the coded data locally and outputs the locally decoded image data in the base layer to the resolution transforming section 24. In the resolution transforming section 24, the image data in the base layer from the base layer encoding section 25 is returned to the original size by enlarging (or reducing) the image data in accordance with magnification FR. The resultant enlarged image is output to the enhancement layer encoding section 23.

On the other hand, in the enhancement layer encoding section 23, the image data in the enhancement layer is encoded. The resultant coded data (bit stream) includes the offset data FPOS_E and size data FSZ_E and is supplied to the multiplexing section 26. Note that in the enhancement layer encoding section 23, the encoding of the enhancement layer image data is performed by employing as a reference image the enlarged image supplied from the resolution transforming section 24.

The multiplexing section 26 multiplexes the outputs of the enhancement layer encoding section 23 and base layer encoding section 25 and outputs the multiplexed bit stream.

Note that the size data FSZ_B, offset data FPOS_B, motion vector (MV), flag COD, etc. of the base layer are supplied from the base layer encoding section 25 to the enhancement layer encoding section 23 and that the enhancement layer encoding section 23 is constructed so that it performs processing, making reference to the supplied data as needed. The details will be described later.

Next, FIG. 11 shows the detailed constitution example of the base layer encoding section 25 of FIG. 5. In FIG. 11, the same reference numerals are applied to parts corresponding to FIG. 1. That is, basically the base layer encoding section 25 is constituted as in the encoder of FIG. 1.

Figure 1:
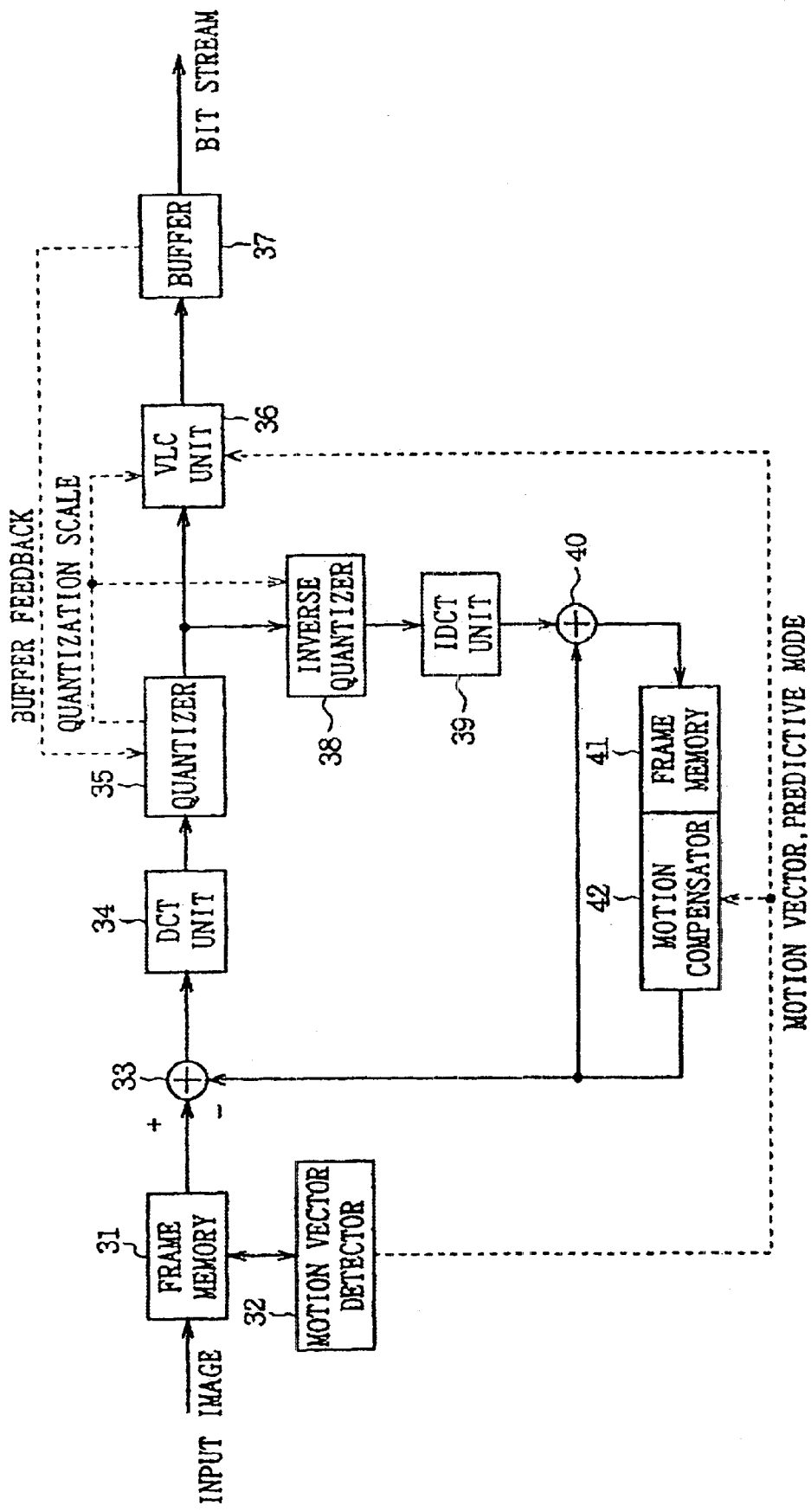
FIG. 1 is a block diagram showing the constitution example of a conventional encoder.

The image data from the image layering section 21 (FIG. 5), i.e., the VOP in the base layer, as with FIG. 1, is supplied to a frame memory 31 and stored. In a motion vector detector 32, the motion vector is detected at a macroblock unit.

But the size data FSZ_B and offset data FPOS_B of the VOP of a base layer are supplied to the motion vector detector 32 of the base layer encoding section 25, which in turn detects the motion vector of a macroblock, based on the supplied size data FSZ_B and offset data FPOS_B.

That is, as described above, the size and position of a VOP vary with time (frame). Therefore, in detecting the motion vector, there is a need to set a reference coordinate system for the detection and detect motion in the coordinate system. Hence, in the motion vector detector 32 here, the above-mentioned absolute coordinate system is employed as a reference coordinate system, and a VOP to be encoded and a reference VOP are arranged in the absolute coordinate system in accordance with the size data FSZ_B and offset data FPOS_B, whereby the motion vector is detected.

Note that the detected motion vector (MV), along with the predictive mode, is supplied to a VLC unit 36 and a motion compensator 42 and is also supplied to the enhancement layer encoding section 23 (FIG. 5).

Even in the case of performing motion compensation, there is also a need to detect motion in a reference coordinate system, as described above. Therefore, size data FSZ_B and offset data FPOS_B are supplied to the motion compensator 42.

A VOP whose motion vector was-detected is quantized as in the case of FIG. 1, and the quantized coefficients are supplied to the VLC unit 36. Also, as in the case of FIG. 1, the size data FSZ_B and offset data FPOS_B from the image layering section 21 are supplied to the VLC unit 36 in addition to the quantized coefficients, quantization step, motion vector, and predictive mode. In the VLC unit 36, the supplied data is encoded by variable word length coding.

In addition to the above-mentioned encoding, the VOP whose motion vector was detected is locally decoded as in the case of FIG. 1 and stored in frame memory 41. This decoded image is employed as a reference image, as previously described, and furthermore, it is output to the resolution transforming section 24 (FIG. 5).

Note that, unlike the MPEG-1 standard and the MPEG-2 standard, in the MPEG-4 standard a B-picture (B-VOP) is also employed as a reference image. For this reason, a B-picture is also decoded locally and stored in the frame memory 41. (However, a B-picture is presently employed only in an enhancement layer as a reference image.)

On the other hand, as described in FIG. 1, the VLC unit 36 determines whether the macroblock in an I-picture, a P-picture, or a B-picture (I-VOP, P-VOP, or B-VOP) is made a skip macroblock. The VLC unit 36 sets flags COD and MODB indicating the determination result. The flags COD and MODB are also encoded by variable word length coding and are transmitted. Furthermore, the flag COD is supplied to the enhancement layer encoding section 23.

Next, FIG. 12 shows the constitution example of the enhancement layer encoding section 23 of FIG. 5. In FIG. 12, the same reference numerals are applied to parts corresponding to FIG. 11 or 1. That is, basically the enhancement layer encoding section 23 is constituted as in the base layer encoding section 25 of FIG. 11 or the encoder of FIG. 1 except that frame memory 52 is newly provided.

The image data from the image layering section 21 (FIG. 5), i.e., the VOP of the enhancement layer, as in the case of FIG. 1, is supplied to the frame memory 31 and stored. In the motion vector detector 32, the motion vector is detected at a macroblock unit. Even in this case, as in the case of FIG. 11, the size data FSZ_E and offset data FPOS_E are supplied to the motion vector detector 32 in addition to the VOP of the enhancement layer, etc. In the motion vector detector 32, as in the above-mentioned case, the arranged position of the VOP of the enhancement layer in the absolute coordinate system is recognized based on the size data FSZ_E and offset data FPOS_E, and the motion vector of the macroblock is detected.

Here, in the motion vector detectors 32 of the enhancement layer encoding section 23 and base layer encoding section 25, VOPs are processed according to a predetermined sequence, as described in FIG. 1. For example, the sequence is set as follows.

That is, in the case of spatial scalability, as shown in FIG. 13(A) or 13(B), the VOPs in an enhancement layer or a base layer are processed, for example, in order of P, B, B, B, . . . or I, P, P, P, . . .

And in this case, the first P-picture (P-VOP) in the enhancement layer is encoded, for example, by employing as a reference image the VOP of the base layer present at the same time as the P-picture (here, I-picture (I-VOP)). Also, the second B-picture (B-VOP) in the enhancement layer is encoded, for example, by employing as reference images the picture in the enhancement layer immediately before that and also the VOP in the base layer present at the same time as the B-picture. That is, in this example, the B-picture in the enhancement layer, as with the P-picture in base layer, is employed as a reference image in encoding another VOP.

For the base layer, encoding is performed, for example, as in the case of the MPEG-1 standard, MPEG-2 standard, or H. 263 standard.

The SNR scalability is processed in the same manner as the above-mentioned spatial scalability, because it is the same as the spatial scalability when the magnification FR in the spatial scalability is 1.

Figure 14:
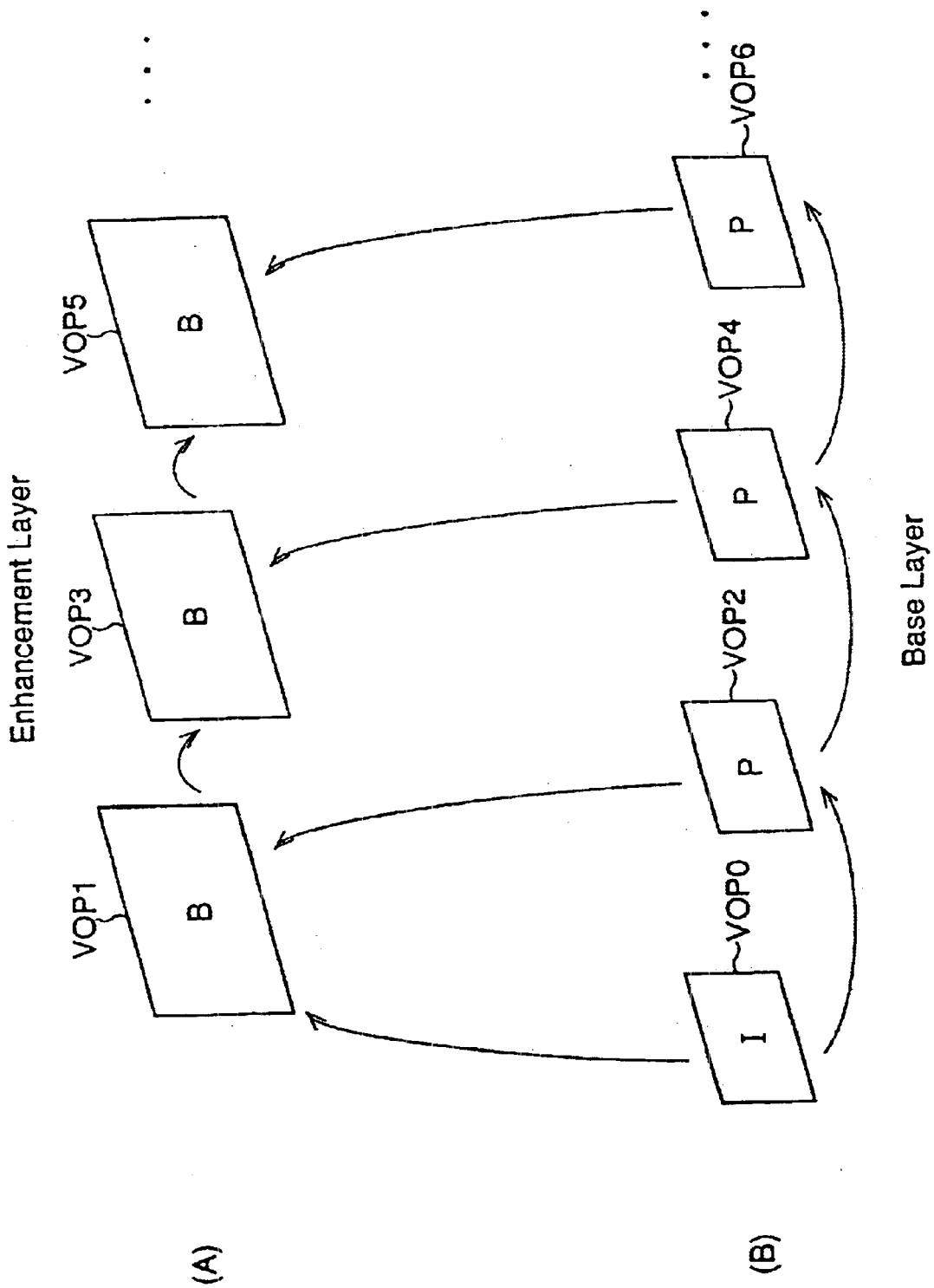
FIG. 14 is a diagram for explaining time scalability.

In the case of the temporal scalability, i.e., for example, in the case where a VO is constituted by VOP0, VOP1, VOP2, VOP3, . . . , and also VOP1, VOP3, VOP5, VOP7, . . . are taken to be in an enhancement layer (FIG. 14(A)) and VOP0, VOP2, VOP4, VOP6, . . . to be in a base layer (FIG. 14(B)), as described above, the VOPs in the enhancement and base layers are respectively processed in order of B, B, B, . . . and in order of I, P, P, P, . . . , as shown in FIG. 14.

And in this case, the first VOP1 (B-picture) in the enhancement layer is encoded, for example, by employing the VOP0 (I-picture) and VOP2 (P-picture) in the base layer as reference images. The second VOP3 (B-picture) in the enhancement layer is encoded, for example, by employing as reference images the first coded VOP1 (B-picture) in the enhancement layer immediately before that and the VOP4 (P-picture) in the base layer present at the time (frame) next to the VOP3. The third VOP5 (B-picture) in the enhancement layer, as with the encoding of the VOP3, is encoded, for example, by employing as reference images the second coded VOP3 (B-picture) in the enhancement layer immediately before that and the VOP6 (P-picture) in the base layer which is an image present at the time (frame) next to the VOP5.

As described above, for VOPs in one layer (here, enhancement layer), VOPs in another layer (scalable layer) (here, base layer) can be employed as reference images for encoding a P-picture and a B-picture. In the case where a VOP in one layer is thus encoded by employing a VOP in another layer as a reference image, i.e., like this embodiment, in the case where a VOP in the base layer is employed as a reference image in encoding a VOP in the enhancement layer predictively, the motion vector detector 32 of the enhancement layer encoding section 23 (FIG. 12) is constructed so as to set and output flag ref_layer_id indicating that a VOP in the base layer is employed to encode a VOP in the enhancement layer predictively. (In the case of 3 or more layers, the flag ref_layer_id represents a layer to which a VOP, employed as a reference image, belongs.)

Furthermore, the motion vector detector 32 of the enhancement layer encoding section 23 is constructed so as to set and output flag ref_select_code (reference image information) in accordance with the flag ref_layer_id for a VOP. The flag ref_select_code (reference image information) indicates which layer and which VOP in the layer are employed as a reference image in performing forward predictive coding or-backward predictive coding.

More specifically, for example, in the case where a P-picture in an enhancement layer is encoded by employing as a reference image a VOP which belongs to the same layer as a picture decoded (locally decoded) immediately before the P-picture, the flag ref_select_code is set to 00. Also, in the case where the P-picture is encoded by employing as a reference image a VOP which belongs to a layer (here, base layer (reference layer)) different from a picture displayed immediately before the P-picture, the flag ref_select_code is set to 01. In addition, in the case where the P-picture is encoded by employing as a reference image a VOP which belongs to a layer different from a picture to be displayed immediately after the P-picture, the flag ref_select_code is set to 10. Furthermore, in the case where the P-picture is encoded by employing as a reference image a VOP which belongs to a different layer present at the same time as the P-picture, the flag ref_select_code is set to 11.

On the other hand, for example, in the case where a B-picture in an enhancement layer is encoded by employing as a reference image for forward prediction a VOP which belongs to a different layer present at the same time as the B-picture and also by employing as a reference image for backward prediction a VOP which belongs to the same layer as a picture decoded immediately before the B-picture, the flag ref_select_code is set to 00. Also, in the case where the B-picture in the enhancement layer is encoded by employing as a reference image for forward prediction a VOP which belongs to the same layer as the B-picture and also by employing as a reference image for backward prediction a VOP which belongs to a layer different from a picture displayed immediately before the B-picture, the flag ref_select_code is set to 01. In addition, in the case where the B-picture in the enhancement layer is encoded by employing as a reference image for forward prediction a VOP which belongs to the same layer as a picture decoded immediately before the B-picture and also by employing as a reference image for backward prediction a VOP which belongs to a layer different from a picture to be displayed immediately after the B-picture, the flag ref_select_code is set to 10. Furthermore, in the case where the B-picture in the enhancement layer is encoded by employing as a reference image for forward prediction a VOP which belongs to a layer different from a picture displayed immediately before the B-picture and also by employing as a reference image for backward prediction a VOP which belongs to a layer different from a picture to be displayed immediately after the B-picture, the flag ref_select_code is set to 11.

Figure 13:
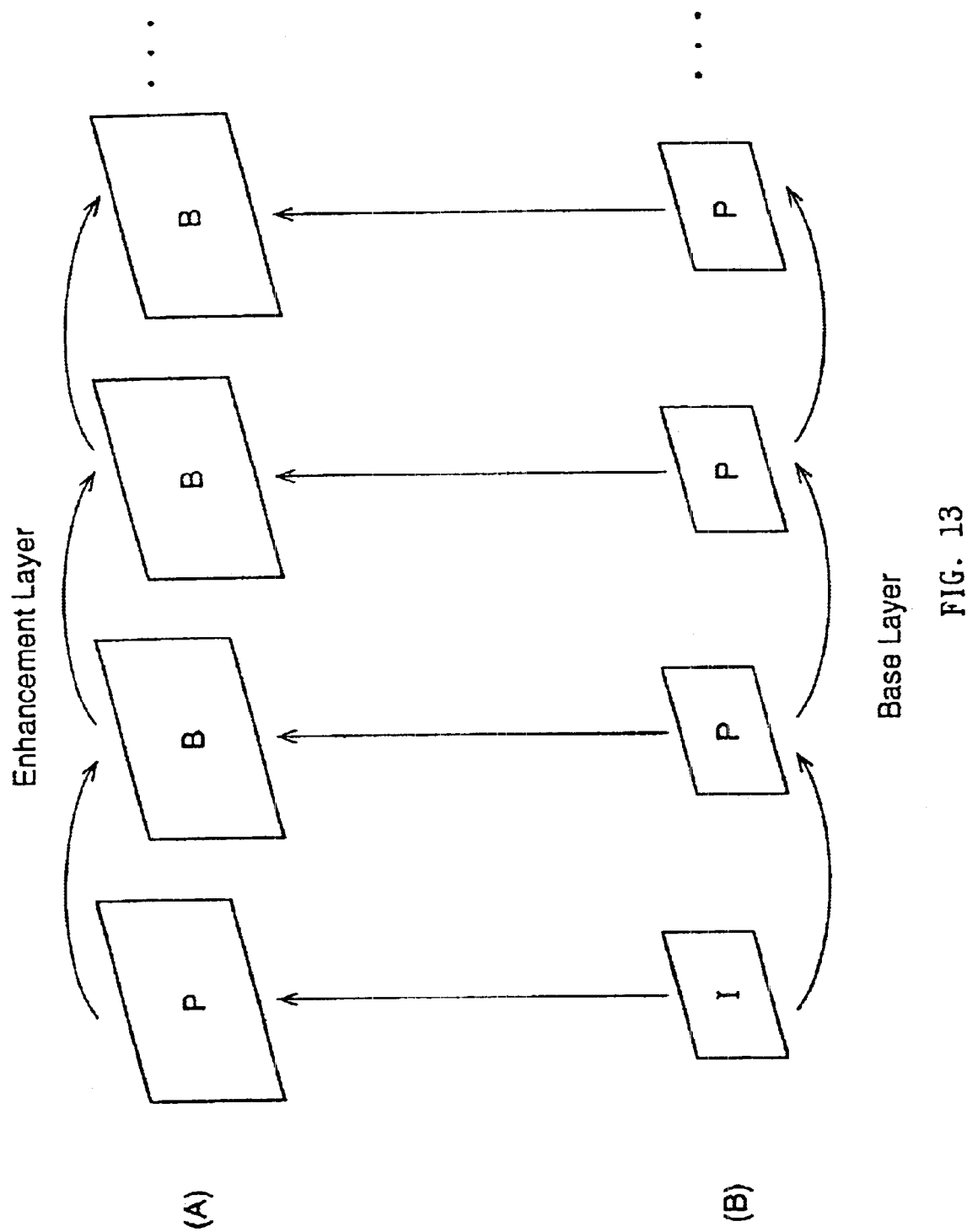
FIG. 13 is a diagram for explaining spatial scalability.

Here, the predictive coding shown in FIGS. 13 and 14 is merely a single example. Therefore, it is possible within the above-mentioned range to set freely which layer and which VOP in the layer are employed as a reference image for forward predictive coding, backward predictive coding, or bidirectionally predictive coding.

In the above-mentioned case, while the terms spatial scalability, temporal scalability, and SNR scalability have been employed for the convenience of explanation, it becomes difficult to discriminate the spatial scalability, temporal scalability, and SNR scalability from each other in the case where a reference image for predictive coding is set by the flag ref_select_code. That is, conversely speaking, the employment of the flag ref_select_code renders the above-mentioned discrimination between scalabilites unnecessary.

Here, if the above-mentioned scalability and flag ref_select_code are correlated with each other, the correlation will be, for example, as follows. That is, with respect to a P-picture, since the case of the flag ref_select_code being 11 is a case where a VOP at the same time in the layer indicated by the flag ref_layer_id is employed as a reference image (for forward prediction), this case corresponds to spatial scalability or SNR scalability. And the cases other than the case of the flag ref_select_code being 11 correspond to temporal scalability.

Also, with respect to a B-picture, the case of the flag ref_select_code being 00 is also the case where a VOP at the same time in the layer indicated by the flag ref_layer_id is employed as a reference image for forward prediction, so this case corresponds to spatial scalability or SNR scalability. And the cases other than the case of the flag ref_select_code being 00 correspond to temporal scalability.

Note that, in the case where in order to encode a VOP in an enhancement layer predictively, a VOP at the same time in a layer (here, base layer) different from the enhancement layer is employed as a reference image, there is no motion therebetween, so the motion vector is always made 0 ((0,0)).

Returning to FIG. 12, the aforementioned flag ref_layer_id and flag ref_select_code are set to the motion vector detector 32 of the enhancement layer encoding section 23 and supplied to the motion compensator 42 and VLC unit 36.

Also, the motion vector detector 32 detects a motion vector by not making reference only to the frame memory 31 in accordance with the flag ref_layer_id and flag ref_select_code but also making reference to the frame memory 52 as needed.

Here, a locally decoded enlarged image in the base layer is supplied from the resolution transforming section 24 (FIG. 5) to the frame memory 52. That is, in the resolution transforming section 24, the locally decoded VOP in the base layer is enlarged, for example, by a so-called interpolation filter, etc. With this, an enlarged image which is FR times the size of the VOP, i.e., an enlarged image of the same size as the VOP in the enhancement layer corresponding to the VOP in the base layer is generated. The generated image is supplied to the enhancement layer encoding section 23. The frame memory 52 stores the enlarged image supplied from the resolution transforming section 24 in this manner.

Therefore, when magnification FR is 1, the resolution transforming section 24 does not process the locally decoded VOP supplied from the base layer encoding section 25. The locally decoded VOP from the base layer encoding section 25, as it is, is supplied to the enhancement layer encoding section 23.

The size data FSZ_B and offset data FPOS_B are supplied from the base layer encoding section 25 to the motion vector detector 32, and the magnification FR from the delay circuit 22 (FIG. 5) is also supplied to the motion vector detector 32. In the case where the enlarged image stored in the frame memory 52 is employed as a reference image, i.e., in the case where in order to encode a VOP in an enhancement layer predictively, a VOP in a base layer at the same time as the enhancement layer VOP is employed as a reference image (in this case, the flag ref_select_code is made 11 for a P-picture and 00 for a B-picture), the motion vector detector 32 multiplies the size data FSZ_B and offset data FPOS_B corresponding to the enlarged image by magnification FR. And based on the multiplication result, the motion vector detector 32 recognizes the position of the enlarged image in the absolute coordinate system, thereby detecting the motion vector.

Note that the motion vector and predictive mode in a base layer are supplied to the motion vector detector 32. This data is used in the following case. That is, in the case where the flag ref_select_code for a B-picture in an enhancement layer is 00, when magnification FR is 1, i.e., in the case of SNR scalability (in this case, since a VOP in an enhancement layer is employed in encoding the enhancement layer predictively, the SNR scalability used herein differs in this respect from that prescribed in the MPEG-2 standard), images in the enhancement layer and base layer are the same. Therefore, when the predictive coding of a B-picture in an enhancement layer is performed, the motion vector detector 32 can employ the motion vector and predictive mode in a base layer present at the same time as the B-picture, as they are. Hence, in this case the motion vector detector 32 does not process the B-picture of the enhancement layer, but it adopts the motion vector and predictive mode of the base layer as they are.

In this case, in the enhancement layer encoding section 23, a motion vector and a predictive mode are not output from the motion vector detector 32 to the VLC unit 36. (Therefore, they are not transmitted.) This is because a receiver side can recognize the motion vector and predictive mode of an enhancement layer from the result of the decoding of a base layer.

As previously described, the motion vector detector 32 detects a motion vector by employing both a VOP in an enhancement layer and an enlarged image as reference images. Furthermore, as shown in FIG. 1, the motion vector detector 32 sets a predictive mode which makes a prediction error (or dispersion) minimum. Also, the motion vector detector 32 sets and outputs necessary information, such as flag ref_select_code, flag ref_layer_id, etc.

In FIG. 12, flag COD indicates whether a macroblock constituting an I-picture or a P-picture in a base layer is a skip macroblock, and the flag COD is supplied from the base layer encoding section 25 to the motion vector detector 32, VLC unit 36, and motion compensator 42.

The macroblock whose motion vector was detected is encoded in the same manner as the above-mentioned case. As a result of the encoding, variable-length codes are output from the VLC unit 36.

The VLC unit 36 of the enhancement layer encoding section 23, as in the case of the base layer encoding section 25, is constructed so as to set and output flags COD and MODB. Here, the flag COD, as described above, indicates whether a macroblock in an I- or P-picture is a skip macroblock, while the flag MODB indicates whether a macroblock in a B-picture is a skip macroblock.

The quantized coefficients, quantization step, motion vector, predictive mode, magnification FR, flag ref_select_code, flag ref_layer_id, size data FSZ_E, and offset data FPOS_E are also supplied to the VLC unit 36. In the VLC unit 36, these are encoded by variable word length coding and are output.

On the other hand, after a macroblock whose motion vector was detected has been encoded, it is also decoded locally as described above and is stored in the frame memory 41. And in the motion compensator 42, as in the case of the motion vector detector 32, motion compensation is performed by employing as reference images both a locally decoded VOP in an enhancement layer, stored in the frame memory 41, and a locally decoded and enlarged VOP in a base layer, stored in the frame memory 52. With this compensation, a predicted image is generated.

That is, in addition to the motion vector and predictive mode, the flag ref_select_code, flag ref_layer_id, magnification FR, size data FSZ_B, size data FSZ_E, offset data FPOS_B, and offset data FPOS_E are supplied to the motion compensator 42. The motion compensator 42 recognizes a reference image to be motion-compensated, based on the flags ref_select_code and ref_layer_id. Furthermore, in the case where a locally decoded VOP in an enhancement layer or an enlarged image is employed as a reference image, the motion compensator 42 recognizes the position and size of the reference image in the absolute coordinate system, based on the size data FSZ_E and offset data FPOS_E, or the size data FSZ_B and offset data FPOS_B. The motion compensator 42 generates a predicted image by employing magnification FR, as needed.

Figure 15:
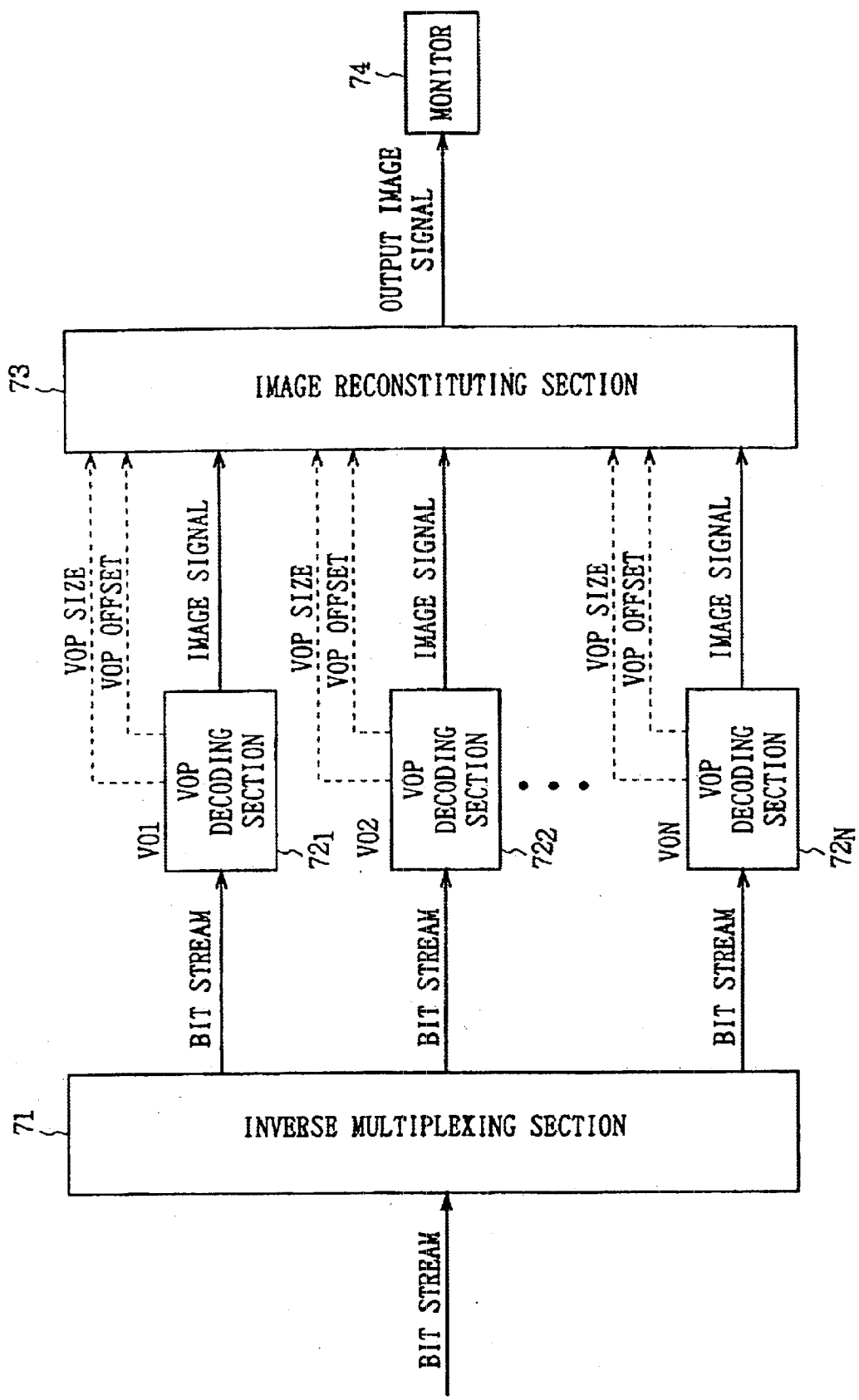
FIG. 15 is a block diagram showing the constitution example of an embodiment of a decoder to which the present invention is applied.

Next, FIG. 15 shows the constitution example of an embodiment of a decoder which decodes the bit stream output from the encoder of FIG. 3.

This decoder receives the bit stream supplied by the encoder of FIG. 3 through the transmission path 5 or storage medium 6. That is, the bit stream, output from the encoder of FIG. 3 and transmitted through the transmission path 5, is received by a receiver (not shown). Alternatively, the bit stream recorded on the storage medium 6 is regenerated by a regenerator (not shown). The received or regenerated bit stream is supplied to an inverse multiplexing section 71.

The inverse multiplexing section 71 receives the bit stream (video stream (VS) described later) input thereto. Furthermore, in the inverse multiplexing section 71, the input bit stream is separated into bit streams VO#1, VO#2, . . . The bit streams are supplied to corresponding VOP decoding sections 72n, respectively. In the VOP decoding sections 72n, the VOP (image data) constituting a VO, the size data (VOP size), and the offset data (VOP offset) are decoded from the bit stream supplied from the inverse multiplexing section 71. The decoded data is supplied to an image reconstituting section 73.

The image reconstituting section 73 reconstitutes the original image, based on the respective outputs of the VOP decoding sections $72_1$ to $72_N$. This reconstituted image is supplied, for example, to a monitor 74 and displayed.

Figure 16:
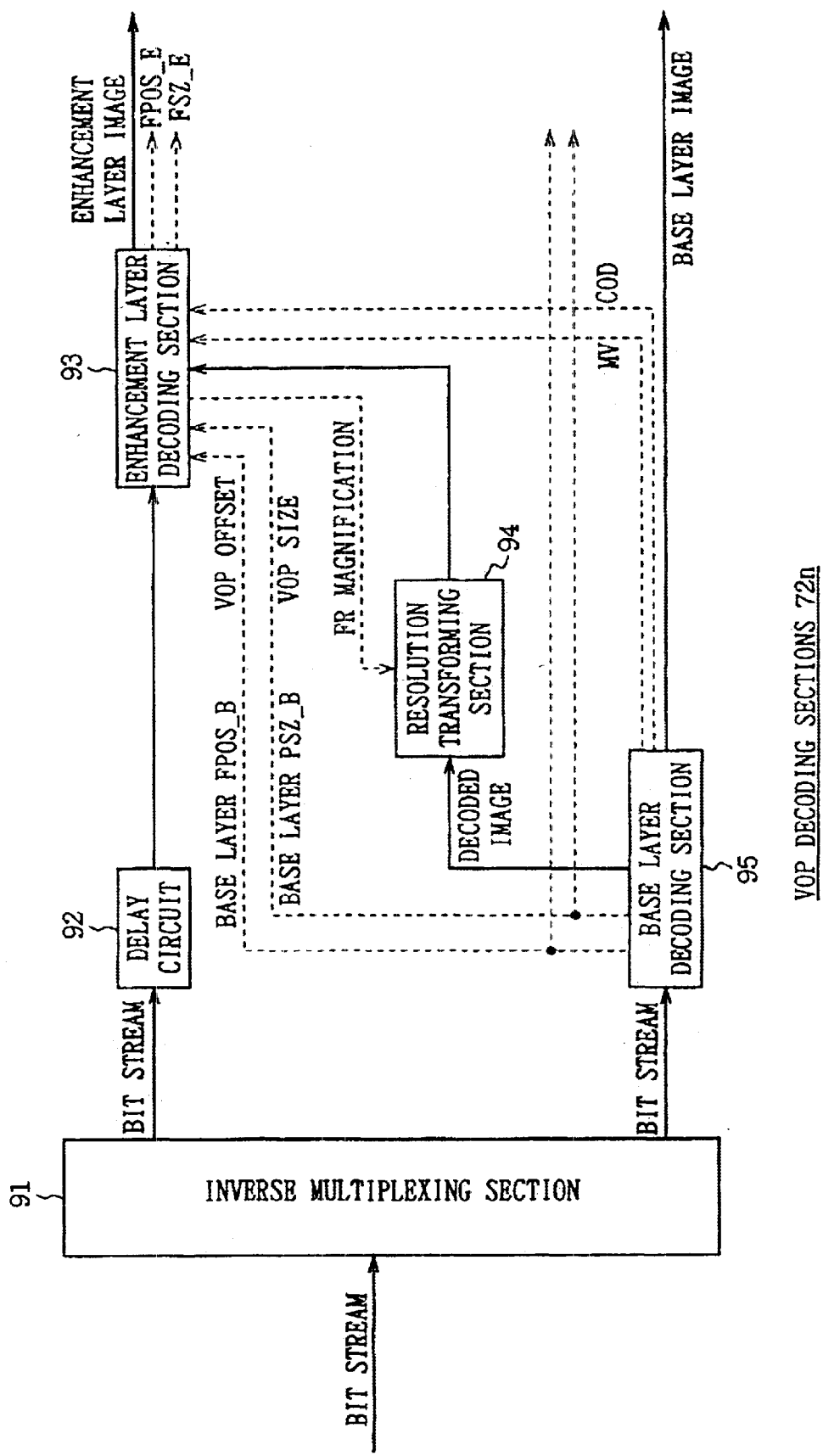
FIG. 16 is a block diagram showing another constitution example of the VOP decoding sections $72_1$ to $72_N$ of FIG. 15.

Next, FIG. 16 shows the constitution example of the VOP decoding section $72_N$ of FIG. 15 which realizes scalability.

The bit stream supplied from the inverse multiplexing section 71 (FIG. 15) is input to an inverse multiplexing section 91, in which the input bit stream is separated into a bit stream of a VOP in an enhancement layer and a bit stream of a VOP in a base layer. The bit stream of a VOP in an enhancement layer is delayed by a delay circuit 92 by the processing period in the base layer decoding section 95 and supplied to the enhancement layer decoding section 93. Also, the bit stream of a VOP in a base layer is supplied to the base layer decoding section 95.

In the base layer decoding section 95, the bit stream in a base layer is decoded, and the resulting decoded image in a base layer is supplied to a resolution transforming section 94. Also, in the base layer decoding section 95, information necessary for decoding a VOP in an enhancement layer, obtained by decoding the bit stream of a base layer, is supplied to the enhancement layer decoding section 93. The necessary information includes size data FSZ_B, offset data FPOS_B. motion vector (MV), predictive mode, flag COD, etc.

In the enhancement layer decoding section 93, the bit stream in an enhancement layer supplied through the delay circuit 92 is decoded by making reference to the outputs of the base layer decoding section 95 and resolution transforming section 94 as needed. The resultant decoded image in an enhancement layer, size data FSZ_E, and offset data FPOS_E are output. Furthermore, in the enhancement layer decoding section 93, the magnification FR, obtained by decoding the bit stream in an enhancement layer, is output to the resolution transforming section 94. In the resolution transforming section 94, as in the case of the resolution transforming section 24 in FIG. 5, the decoded image in a base layer is transformed by employing the magnification FR supplied from the enhancement layer decoding section 93. An enlarged image obtained with this transformation is supplied to the enhancement layer decoding section 93. As described above, the enlarged image is employed in decoding the bit stream of an enhancement layer.

Figure 2:
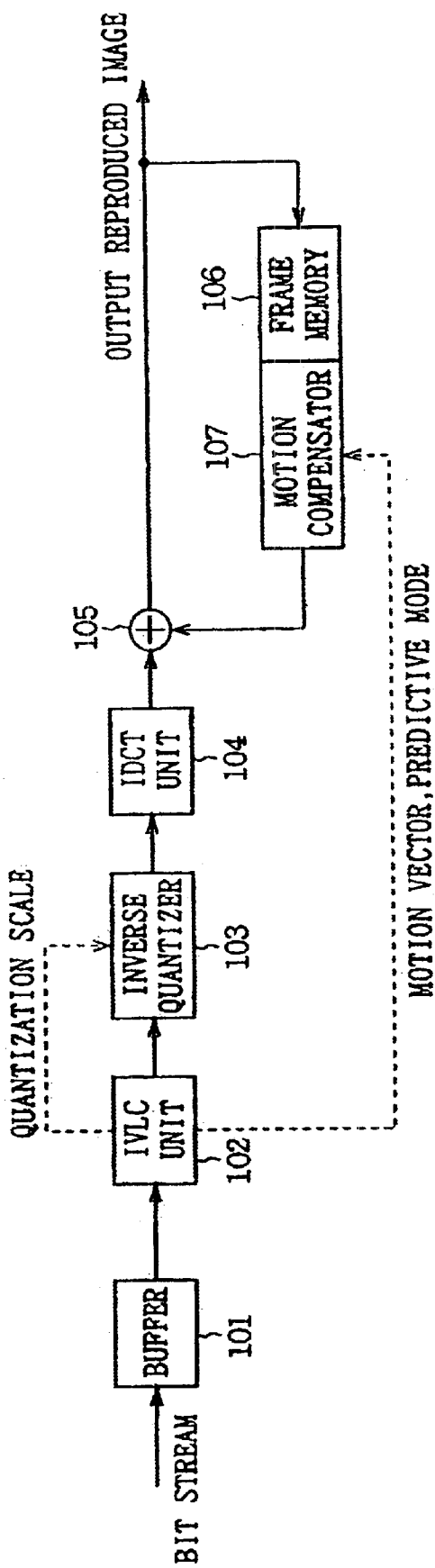
FIG. 2 is a block diagram showing the constitution example of a conventional decoder.

Next, FIG. 17 shows the constitution example of the base layer decoding section 95 of FIG. 16. In FIG. 17, the same reference numerals are applied to parts corresponding to the case of the decoder in FIG. 2. That is, basically the base layer decoding section 95 is constituted in the same manner as the decoder of FIG. 2.

The bit stream of a base layer from the inverse multiplexing section 91 is supplied to a buffer 101 and stored temporarily. An IVLC unit 102 reads out the bit stream from the buffer 101 in correspondence to a block processing state of the following stage, as needed, and the bit stream is decoded by variable word length decoding and is separated into quantized coefficients, a motion vector, a predictive mode, a quantization step, size data FSZ_B, offset data FPOS_B, and flag COD. The quantized coefficients and quantization step are supplied to an inverse quantizer 103. The motion vector and predictive mode are supplied to a motion compensator 107 and enhancement layer decoding section 93 (FIG. 16). Also, the size data FSZ_B and offset data FPOS_B are supplied to the motion compensator 107, image reconstituting section 73 (FIG. 15), and enhancement layer decoding section 93, while the flag COD is supplied to the enhancement layer decoding section 93.

The inverse quantizer 103, IDCT unit 104, arithmetic unit 105, frame memory 106, and motion compensator 107 perform similar processes corresponding to the inverse quantizer 38, IDCT unit 39, arithmetic unit 40, frame memory 41, and motion compensator 42 of the base layer encoding section 25 of FIG. 11, respectively. With this, the VOP of a base layer is decoded. The decoded VOP is supplied to the image reconstituting section 73, enhancement layer decoding section 93, and resolution transforming section 94 (FIG. 16).

Next, FIG. 18 shows the constitution example of the enhancement layer decoding section 93 of FIG. 16. In FIG. 18, the same reference numerals are applied to parts corresponding to the case in FIG. 2. That is, basically the enhancement layer decoding section 93 is constituted in the same manner as the decoder of FIG. 2 except that frame memory 112 is newly provided.

The bit stream of an enhancement layer from the inverse multiplexing section 91 is supplied to an IVLC 102 through a buffer 101. The IVLC unit 102 decodes the bit stream of an enhancement layer by variable word length decoding, thereby separating the bit stream into quantized coefficients, a motion vector, a predictive mode, a quantization step, size data FSZ_E, offset data FPOS_E, magnification FR, flag ref_layer_id, flag ref_select_code, flag COD, and flag MODB. The quantized coefficients and quantization step, as in the case of FIG. 17, are supplied to an inverse quantizer 103. The motion vector and predictive mode are supplied to a motion compensator 107. Also, the size data FSZ_E and offset data FPOS_E are supplied to the motion compensator 107 and image reconstituting section 73 (FIG. 15). The flag COD, flag MODB, flag ref_layer_id, and flag ref_select_code are supplied to the motion compensator 107. Furthermore, the magnification FR is supplied to the motion compensator 107 and resolution transforming section 94 (FIG. 16).

Note that the motion vector, flag COD, size data FSZ_B, and offset data FPOS_B of a base layer are supplied from the base layer decoding section 95 (FIG. 16) to the motion compensator 107 in addition to the above-mentioned data. Also, an enlarged image is supplied from the resolution transforming section 94 to frame-memory 112.

The inverse quantizer 103, IDCT unit 104, arithmetic unit 105, frame memory 106, motion compensator 107, and frame memory 112 perform similar processes corresponding to the inverse quantizer 38, IDCT unit 39, arithmetic unit 40, frame memory 41, motion compensator 42, and frame memory 52 of the enhancement layer encoding section 23 of FIG. 12, respectively. With this, the VOP of an enhancement layer is decoded. The decoded VOP is supplied to the image reconstituting section 73.

Here, in the VOP decoding sections 72n having both the enhancement layer decoding section 93 and base layer decoding section 95 constituted as described above, both the decoded image, size data FSZ_E, and offset data FPOS_E in an enhancement layer (hereinafter referred to as enhancement layer data as needed) and the decoded image, size data FSZ_B, and offset data FPOS_B in a base layer (hereinafter referred to as base layer data as needed) are obtained. In the image reconstituting section 73, an image is reconstituted from the enhancement layer data or base layer data, for example, in the following manner.

That is, for instance, in the case where the first spatial scalability (FIG. 6) is performed (i.e., in the case where the entire input VOP is made an enhancement layer and the entire VOP reduced is made a base layer), when both the base layer data and the enhancement layer data are decoded, the image reconstituting section 73 arranges the decoded image (VOP) of the enhancement layer of the size corresponding to size data FSZ_E at the position indicated by offset data FPOS_E, based on enhancement layer data-alone. Also, for example, when an error occurs in the bit stream of an enhancement layer, or when the monitor 74 processes only an image of low resolution and therefore only base layer data is decoded, the image reconstituting section 73 arranges the decoded image (VOP) of an enhancement layer of the size corresponding to size data FSZ_B at the position indicated by offset data FPOS_B, based on the base layer data alone.

Also, for instance, in the case where the second spatial scalability (FIG. 7) is performed (i.e., in the case where part of an input VOP is made an enhancement layer and the entire VOP reduced is made a base layer), when both the base layer data and the enhancement layer data are decoded, the image reconstituting section 73 enlarges the decoded image of the base layer of the size corresponding to size data FSZ_B in accordance with magnification FR and generates the enlarged image. Furthermore, the image reconstituting section 73 enlarges offset data FPOS_B by FR times and arranges the enlarged image at the position corresponding to the resulting value. And the image reconstituting section 73 arranges the decoded image of the enhancement layer of the size corresponding to size data FSZ_E at the position indicated by offset data FPOS_E.

In this case, the portion of the decoded image of an enhancement layer is displayed with higher resolution than the remaining portion.

Note that in the case where the decoded image of an enhancement layer is arranged, the decoded image and an enlarged image are synthesized with each other.

Also, although not shown in FIG. 16 (FIG. 15), magnification FR is supplied from the enhancement layer decoding section 93 (VOP decoding sections 72n) to the image reconstituting section 73 in addition to the above-mentioned data. The image reconstituting section 73 generates an enlarged image by employing the supplied magnification FR.

On the other hand, in the case where the second spatial scalability is performed, when base layer data alone is decoded, an image is reconstituted in the same manner as the above-mentioned case where the first spatial scalability is performed.

Furthermore, in the case where the third spatial scalability (FIGS. 8 and 9) is performed (i.e., in the case where each of the objects constituting an input VOP is made an enhancement layer and the VOP excluding the objects is made a base layer), an image is reconstituted in the same manner as the above-mentioned case where the second spatial scalability is performed.

As described above, the offset data FPOS_B and offset data FPOS_E are constructed so that mutually-corresponding pixels, constituting the enlarged image of a base layer and an image of an enhancement layer, are arranged at the same position in the absolute coordinate system. Therefore, by reconstituting an image in the aforementioned manner, an accurate image (with no positional offset) can be obtained.

Next, the syntax of the coded bit stream output by the encoder of FIG. 3 will be described, for example, with the video verification model (version 6.0) of the MPEG-4 standard (hereinafter referred to as VM-6.0 as needed) as an example.

Figure 19:
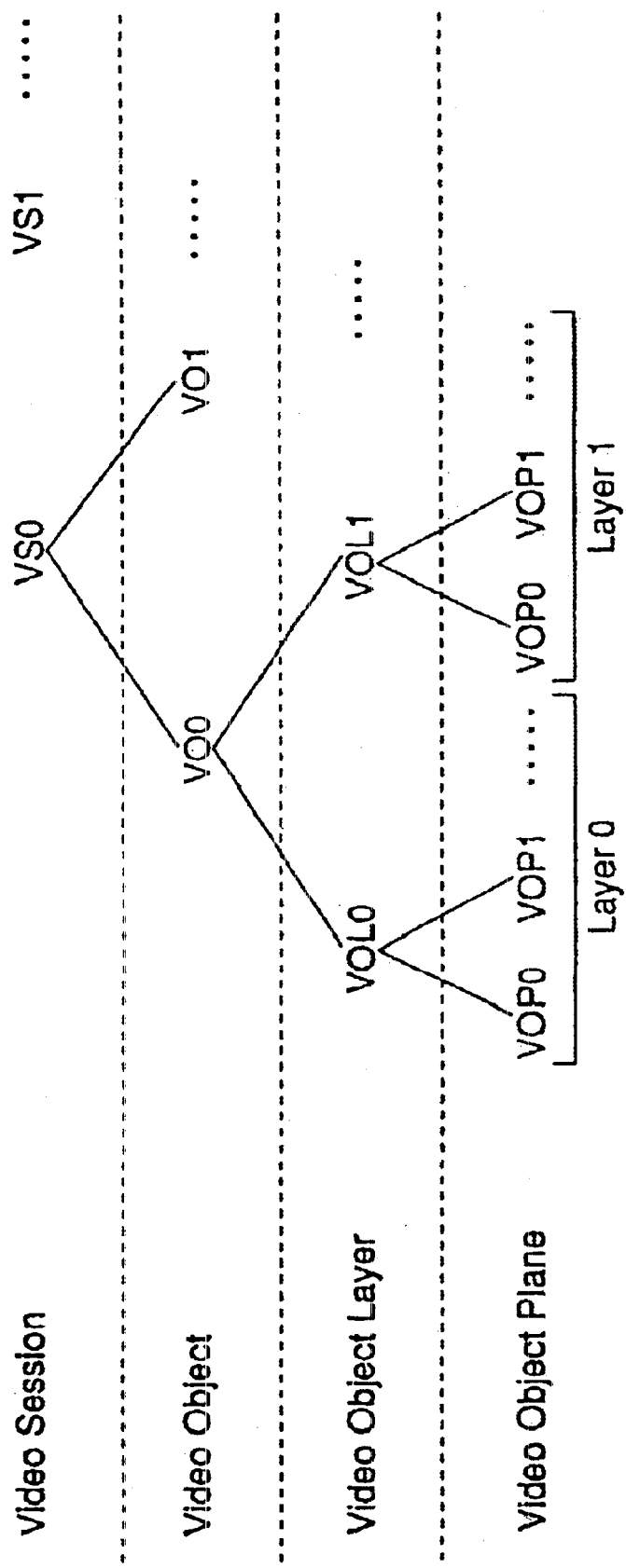
FIG. 19 is a diagram showing the syntax of a bit stream obtained by scalable coding.

FIG. 19 shows the syntax of a coded bit stream in VM-6.0.

The coded bit stream is constituted by video session classes (VSs). Each VS is constituted by one or more video object classes (VOs). Each VO is constituted by one or more video object layer classes (VOLs). (When an image is not layered, it is constituted by a single VOL. In the case where an image is layered, it is constituted by VOLs corresponding to the number of layers.) Each VOL is constituted by video object plane classes (VOP).

Note that VSs are a sequence of images and equivalent, for example, to a single program or movie.

FIGS. 20 and 21 show the syntax of a VS and the syntax of a VO. The VO is a bit stream corresponding to an entire image or a sequence of objects constituting an image. Therefore, VSs are constituted by a set of such sequences. (Therefore, VSs are equivalent, for example, to a single program.)

FIG. 22 shows the syntax of a VOL.

The VOL is a class for the above-mentioned scalability and is identified by a number indicated with video_object_layer_id. For example, the video_object_layer_id for a VOL in a base layer is made a 0, while the video_object_layer_id for a VOL in an enhancement layer is made a 1. Note that, as described above, the number of scalable layers is not limited to 2, but it may be an arbitrary number including 1, 3, or more.

Also, whether a VOL is an entire image or part of an image is identified by video_object_layer_shape. This video_object_layer_shape is a flag for indicating the shape of a VOL and is set as follows.

When the shape of a VOL is rectangular, the video_object_layer_shape is made, for example, 00. Also, when a VOL is in the shape of an area cut out by a hard key (a binary signal which takes either a 0 or a 1), the video_object_layer_shape is made, for example, 01. Furthermore, when a VOL is in the shape of an area cut out by a soft key (a signal which can take a-continuous value (gray-scale) in a range of 0 to 1) (when synthesized by a soft key), the video_object_layer_shape is made, for example, 10.

Here, when video_object_layer_shape is made 00, the shape of a VOP is rectangular and also the position and size of a VOL in the absolute coordinate system do not vary with time, i.e., are constant. In this case, the sizes (horizontal length and vertical length) are indicated by video_object_layer_width and video_object_layer_height. The video_object_layer_width and video_object_layer_height are both 10-bit fixed-length flags. In the case where video_object_layer_shape is 00, it is first transmitted only once. (This is because, in the case where video_object_layer_shape is 00, as described above, the size of a VOL in the absolute coordinate system is constant.)

Also, whether a VOL is a base layer or an enhancement layer is indicated by scalability which is a 1-bit flag. When a VOL is a base layer, the scalability is made, for example, a 1. In the case other than that, the scalability is made, for example, a 0.

Furthermore, in the case where a VOL employs an image in a VOL other than itself as a reference image, the VOL to which the reference image belongs is represented by ref_layer_id, as described above. Note that the ref_layer_id is transmitted only when a VOL is an enhancement layer.

In FIG. 22 the hor_sampling_factor_n and the hor_sampling_factor_m indicate a value corresponding to the horizontal length of a VOP in a base layer and a value corresponding to the horizontal length of a VOP in an enhancement layer, respectively. The horizontal length of an enhancement layer to a base layer (magnification of horizontal resolution) is given by the following equation: hor_sampling_factor_n/hor_sampling_factor_m.

In FIG. 22 the ver_sampling_factor_n and the ver_sampling_factor_m indicate a value corresponding to the vertical length of a VOP in a base layer and a value corresponding to the vertical length of a VOP in an enhancement layer, respectively. The vertical length of an enhancement layer to a base layer (magnification of vertical resolution) is given by the following equation: ver_sampling_factor_n/ver_sampling_factor_m.

Next, FIG. 23 shows the syntax of a VOP.

The sizes (horizontal length and vertical length) of a VOP are indicated, for example, by VOP_width and VOP_ height having a 10-bit fixed-length. Also, the positions of a VOP in the absolute coordinate system are indicated, for example, by 10-bit fixed-length VOP_horizontal_spatial_mc_ref and VOP_vertical_mc_ref. The VOP_width and VOP_height represent the horizontal length and vertical length of a VOP, respectively. These are equivalent to size data FSZ_B and size data FSZ_E described above. The VOP_horizontal_spatial_mc_ref and VOP_vertical_mc_ref represent the horizontal and vertical coordinates (x and y coordinates) of a VOP, respectively. These are equivalent to offset data FPOS_B and offset data FPOS_E described above.

The VOP_width, VOP_height, VOP_horizontal_mc_ref, and VOP_vertical_mc_ref are transmitted only when video_object_layer_shape is not 00. That is, when video_object_layer_shape is 00, as described above, the size and position of a VOP are both constant, so there is no need to transmit the VOP_width, VOP_height, VOP_horizontal_spatial_mc_ref, and VOP_vertical_mc_ref. In this case, on a receiver side a VOP is arranged so that the left upper corner is consistent, for example, with the origin of the absolute coordinate system. Also, the sizes are recognized from the video_object_layer_width and video_object_layer_height described in FIG. 22.

In FIG. 23 the ref_select_code, as described in FIG. 19, represents an image which is employed as a reference image, and is prescribed by the syntax of a VOP.

Incidentally, in VM-6.0 the display time of each VOP (equivalent to a conventional frame) is determined by modulo_time_base and VOP_time_increment (FIG. 23) as follows:

That is, the modulo_time_base represents the encoder time on the local time_base within accuracy of one second (1000 milliseconds). The modulo_time_base is represented as a marker transmitted in the VOP header and is constituted by a necessary number of 1's and a 0. The number of consecutive "1" constituting the modulo_time_base followed by a "0" is the cumulative period from the synchronization point (time within accuracy of a second) marked by the last encoded/decoded modulo_time_base. For example, when the modulo_time_base indicates a 0, the cumulative period from the synchronization point marked by the last encoded/decoded modulo_time_base is 0 second. Also, when the modulo_time_base indicates 10, the cumulative period from the synchronization point marked by the last encoded/decoded modulo_time_base is 1 second. Furthermore, when the modulo_time_base indicates 110, the cumulative period from the synchronization point marked by the last encoded/decoded modulo_time_base is 2 seconds. Thus, the number of 1's in the modulo_time_base is the number of seconds from the synchronization point marked by the last encoded/decoded modulo_time_base.

Note that, for the modulo_time_base, the VM-6.0 states that:

This value represents the local time base at the one second resolution unit (1000 milliseconds). It is represented as a marker transmitted in the VOP header. The number of consecutive "1" followed by a "0" indicates the number of seconds has elapsed since the synchronization point marked by the last encoded/decoded modulo_time_base.

The VOP_time_increment represents the encoder time on the local time base within accuracy of 1 ms. In VM-6.0, for I-VOPs and P-VOPs the VOP_time_increment is the time from the synchronization point marked by the last encoded/decoded modulo_time_base. For the B-VOPs the VOP_time_increment is the relative time from the last encoded/decoded I- or P-VOP.

Note that, for the VOP_time_increment, the VM-6.0 states that:

This value represents the local time base in the units of milliseconds. For I- and P-VOPs this value is the absolute VOP_time_increment from the synchronization point marked by the last modulo_time_base. For the B-VOPs this value is the relative VOP_time_increment from the last encoded/decoded I- or P-VOP.

And the VM-6.0 states that:

At the encoder, the following formula are used to determine the absolute and relative VOP_time_increments for I/P-VOPs and B-VOPs, respectively.

That is, VM-6.0 prescribes that at the encoder, the display times for I/P-VOPs and B-VOPs are respectively encoded by the following formula:

$$tGTB(n)=n\times1000 \text{ ms}+tEST$$

$$tAVTI=tETB(I/P)-tGTB(n)$$

$$tRVTI=tETB(B)-tETB(I/P) \qquad (1)$$

where tGTB(n) represents the time of the synchronization point (as described above, accuracy of a second) marked by the nth encoded modulo_time_base, tEST represents the encoder time at the start of the encoding of the VO (the absolute time at which the encoding of the VO was started), tAVTI represents the VOP_time_increment for the I or P-VOP, tETB(I/P) represents the encoder time at the start of the encoding of the I or P-VOP (the absolute time at which encoding of the VOP was started), tRVTI represents the VOP_time_increment for the B-VOP, and tETB(B) represents the encoder time at the start of the encoding of the B-VOP.

Note that, for the tGTB(n), tEST, tAVTI, tETB(I/P), tRVTI, and tETB(B) in Formula (1), the VM-6.0 states that: tGTB(n) is the encoder time_base marked by the nth encoded modulo_time_base, tEST is the encoder time_base start time, tAVTI is the absolute VOP_time_increment for the I or P-VOP, tETB(I/P) is the encoder time base at the start of the encoding-of the I or P-VOP, tRVTI is the relative VOP_time_increment for the B-VOP, and tETB(B) is the encoder time base at the start of the encoding of the B-VOP.

Also, the VM-6.0 states that:

At the decoder, the following formula are used to determine the recovered time base of the I/P-VOPs and B-VOPs, respectively.

That is, VM-6.0 prescribes that at the decoder side, the display times for I/P-VOPs and B-VOPs are respectively decoded by the following formula:

$$tGTB(n)=n\times1000 \text{ ms}+tDST$$

$$tDTB(I/P)=tAVTI+tGTB(n)$$

$$tDTB(B)=tRVTI+tDTB(I/P) \qquad (2)$$

where tGTB(n) represents the time of the synchronization point marked by the nth decoded modulo_time_base, tDST represents the decoder time at the start of the decoding of the VO (the absolute time at which the decoding of the VO was started), tDTB(I/P) represents the decoder time at the start of the decoding of the I-VOP or P-VOP, tAVTI represents the VOP_time_increment for the I-VOP or P-VOP, tDTB(B) represents the decoder time at the start of the decoding of the B-VOP (the absolute time at which the decoding of the VOP was started), tRVTI represents the VOP_time_increment for the B-VOP.

Note that, for the tGTB(n), tDST, tDTB(I/P), tAVTI, tDTB(B), and tRVTI in Formula (2), the VM-6.0 states that:

tGTB(n) is the encoding time base marked by the nth decoded modulo_time_base, tDST is the decoding time base start time, tDTB(I/P) is the decoding time_base at the start of the decoding of the I or P-VOP, tAVTI is the decoding absolute VOP_time_increment for the I- or P-VOP, tDTB(B) is the decoding time base at the start of the decoding of the B-VOP, and tRVTI is the decoded relative VOP_time_increment for the B-VOP.

Figure 24:
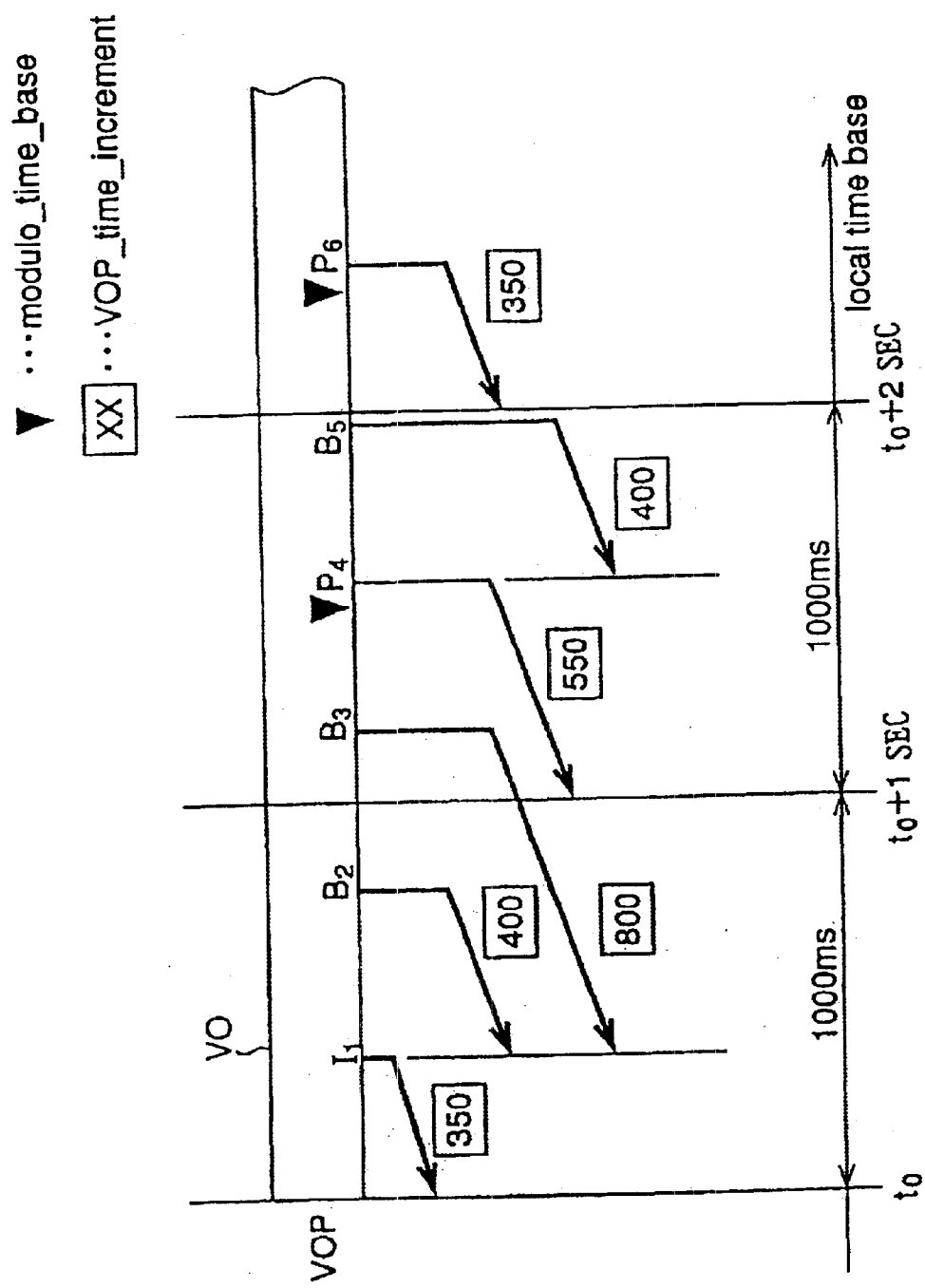
FIG. 24 is a diagram showing the relation between modulo_time_base and VOP_time_increment.

FIG. 24 shows the relation between modulo_time_base and VOP_time_increment based on-the above definition.

In the figure, a VO is constituted by a sequence of VOPs, such as I1 (I-VOP), B2 (B-VOP), B3, P4 (P-VOP), B5, P6, etc. Now, assuming the encoding/decoding start time (absolute time) of the VO is t0, the modulo_time_base will represent time (synchronization point), such as t0+1 sec, t0+2 sec. etc., because the elapsed time from the start time t0 is represented within accuracy of one second. In FIG. 24, although the display order is I1, B2, B3, P4, B5, P6, etc., the encoding/decoding order is I1, P4, B2, B3, P6, etc.

In FIG. 24 (as are FIGS. 28 to 31 and FIG. 36 to be described later), the VOP_time_increment for each VOP is indicated by a numeral (in the units of milliseconds) enclosed within a square. The switch of synchronization points indicated by modulo_time_base is indicated by a mark of ▼. In FIG. 24, therefore, the VOP_time_increments for the I1, B2, 83, P4, B5, and P6 are 350 ms, 400 ms, 800 ms, 550 ms, 400 ms, and 350 ms, and at P4 and P6, the synchronization point is switched.

Now, in FIG. 24 the VOP_time_increment for the I1 is 350 ms. The encoding/decoding time of the I1, therefore, is the time after 350 ms from the synchronization point marked by the last encoded/decoded modulo_time_base. Note that, immediately after the start of the encoding/decoding of the I1, the start time (encoding/decoding start time) t0 becomes a synchronization point., The encoding/decoding time of the I1; therefore, will be the time t0+350 ms after 350 ms from the start time (encoding/decoding start time) t0.

And the encoding/decoding time of the B2 or B3 is the time of the VOP_time_increment which has elapsed since the last encoded/decoded I-VOP or P-VOP. In this case, since the encoding/decoding time of the last encoded/decoded I1 is t0+350 ms, the encoding/decoding time of the B2 or B3 is the time t0+750 ms or t0+1200 ms after 400 ms or 800 ms.

Next, for the P4, at the P4 the synchronization point indicated by modulo_time_base is switched. Therefore, the synchronization point is time t0+1 sec. As a result, the encoding/decoding time of the P4 is the time (t0+1) sec+550 ms after 550 ms from the time t0+1 sec.

The encoding/decoding time of the B5 is the time of the VOP_time_increment which has elapsed since the last encoded/decoded I-VOP or P-VOP. In this case, since the encoding/decoding time of the last encoded/decoded P4 is (t0+1) sec+550 ms, the encoding/decoding-time of the B5 is the time (t0+1) sec+950 ms after 400 ms.

Next, for the P6, at the P6 the synchronization point indicated by modulo_time_base is switched. Therefore, the synchronization point is time t0+2 sec. As a result, the encoding/decoding time of the P6 is the time (t0+2) sec+350 ms after 350 ms from the time t0+2 sec.

Note that in VM-6.0, the switch of the synchronization points indicated by modulo_time_base is allowed only for I-VOPs and P-VOPs and is not allowed for B-VOPs.

Also the VM-6.0 states that for I-VOPs and P-VOPs the VOP_time_increment is the time from the synchronization point marked by the last encoded/decoded modulo_time_base, while for B-VOPs the VOP_time_increment is the relative time from the synchronization point marked by the last encoded/decoded I-VOP or P-VOP. This is mainly for the following reason. That is, a B-VOP is predictively encoded by employing as a reference image the I-VOP or P-VOP arranged across the B-VOP in display order. Therefore, the temporal distance to the I-VOP or P-VOP is set to the VOP_time_increment for the B-VOP so that the weight, relative to the I-VOP or P-VOP which is employed as a reference image in performing the predictive coding, is determined from the B-VOP on the basis of the temporal distance to the I-VOP or P-VOP arranged across the B-VOP. This is the main reason.

Incidentally, the definition of the VOP_time_increment of the above-mentioned VM-6.0 has a disadvantage. That is, in FIG. 24 the VOP_time_increment for a B-VOP is not the relative time from the I-VOP or P-VOP encoded/decoded immediately before the B-VOP but it is the relative time from the last displayed I-VOP or P-VOP. This is for the following reason. For example, consider B2 or B3. The I-VOP or P-VOP which is encoded/decoded immediately before the B2 or B3 is the P4 from the standpoint of the above-mentioned encoding/decoding order. Therefore, when it is assumed that the VOP_time_increment for a B-VOP is the relative time from the I-VOP or P-VOP encoded/decoded immediately before the B-VOP, the VOP_time_increment for the B2 or B3 is the relative time-from the encoding/decoding time of the P4 and becomes a negative value.

On the other hand, in the MPEG-4 standard the VOP_time_increment is 10 bits. If the VOP_time_increment has only a value equal to or greater than 0, it can express a value in a range of 0 to 1023. Therefore, the position between adjacent synchronization points can be represented in the units of milliseconds with the previous temporal synchronization point (in the left direction in FIG. 24) as reference.

However, if the VOP_time_increment is allowed to have not only a value equal to or greater than 0 but also a negative value, the position between adjacent synchronization points will be represented with the previous temporal synchronization point as reference, or it will be represented with the next temporal synchronization point as reference. For this reason, the process of computing the encoding time or decoding time of a VOP becomes complicated.

Therefore, as described above, for the VOP_time_increment the VM-6.0 states that:

This value represents the local time base in the units of milliseconds. For I- and P-VOPs this value is the absolute VOP_time_increment from the synchronization point marked by the last modulo_time_base. For the B-VOPs this value is the relative VOP_time_increment from the last encoded/decoded I- or P-VOP.

However, the last sentence "For the B-VOPs this value is the relative VOP_time_increment from the last encoded/decoded I- or P-VOP" should be changed to "For the B-VOPs this value is the relative VOP_time_increment from the last displayed I- or P-VOP". With this, the VOP_time_increment should not be defined as the relative time from the last encoded/decoded I-VOP or P-VOP, but it should be defined as the relative time from the last displayed I- or P-VOP.

By defining the VOP_time_increment in this manner, the computation base of the encoding/decoding time for a B-VOP is the display time of the I/P-VOP (I-VOP or P-VOP) having display time prior to the B-VOP. Therefore, the VOP_time_increment for a B-VOP always has a positive value, so long as a reference image I-VOP for the B-VOP is not displayed prior to the B-VOP. Therefore, the VOP_time_increments for I/P-VOPs also have a positive value at all times.

Also, in FIG. 24 the definition of the VM-6.0 is further changed so that the time represented by the modulo_time_base and VOP_time_increment is not the encoding/decoding time of a VOP but is the display time of a VOP. That is, in FIG. 24, when the absolute time on a sequence of VOPs is considered, the tEST(I/P) in Formula (1) and the tDTB(I/P) in Formula (2) represent absolute times present on a sequence of I-VOPs or P-VOPs, respectively, and the tEST(B) in Formula (1) and the tDTB(B) in Formula (2) represent absolute times present on a sequence of B-VOPs, respectively.

Next, in the VM-6.0 the encoder time base start time tEST in Formula (1) is not encoded, but the modulo_time_base and VOP_time_increment are encoded as the differential information between the encoder time base start time tEST and the display time of each VOP (absolute time representing the position of a VOP present on a sequence of VOPs). For this reason, at the decoder side, the relative time between VOPs can be determined by employing the modulo_time_base and VOP_time_increment, but the absolute display time of each VOP, i.e., the position of each VOP in a sequence of VOPs cannot be determined. Therefore, only the modulo_time_base and VOP_time_increment cannot perform access to a bit stream, i.e., random access.

On the other hand, if the encoder time_base start time tEST is merely encoded, the decoder can decode the absolute time of each VOP by employing the encoded tEST. However, by decoding from the head of the coded bit stream the encoder time base start time tEST and also the modulo_time_base and VOP_time_increment which are the relative time information of each VOP, there is a need to control the cumulative absolute time. This is troublesome, so efficient random access cannot be carried out.

Hence, in the embodiment of the present invention, a layer for encoding the absolute time present on a VOP sequence is introduced into the hierarchical constitution of the encoded bit stream of the VM-6.0 so as to easily perform an effective random access. (This layer is not a layer which realizes scalability (above-mentioned base layer or enhancement layer) but is a layer of encoded bit stream.) This layer is an encoded bit stream layer which can be inserted at an appropriate position as well as at the head of the encoded bit stream.

As this layer, this embodiment introduces, for example, a layer prescribed in the same manner as a GOP (group of picture) layer employed in the MPEG-1/2 standard. With this, the compatibility between the MPEG-4 standard and the MPEG-1/2 standard can be enhanced as compared with the case where an original encoded bit stream layer is employed in the MPEG-4 standard. This newly introduced layer is referred to as a GOV (or a group of video object plane (GVOP)).

Figure 25:
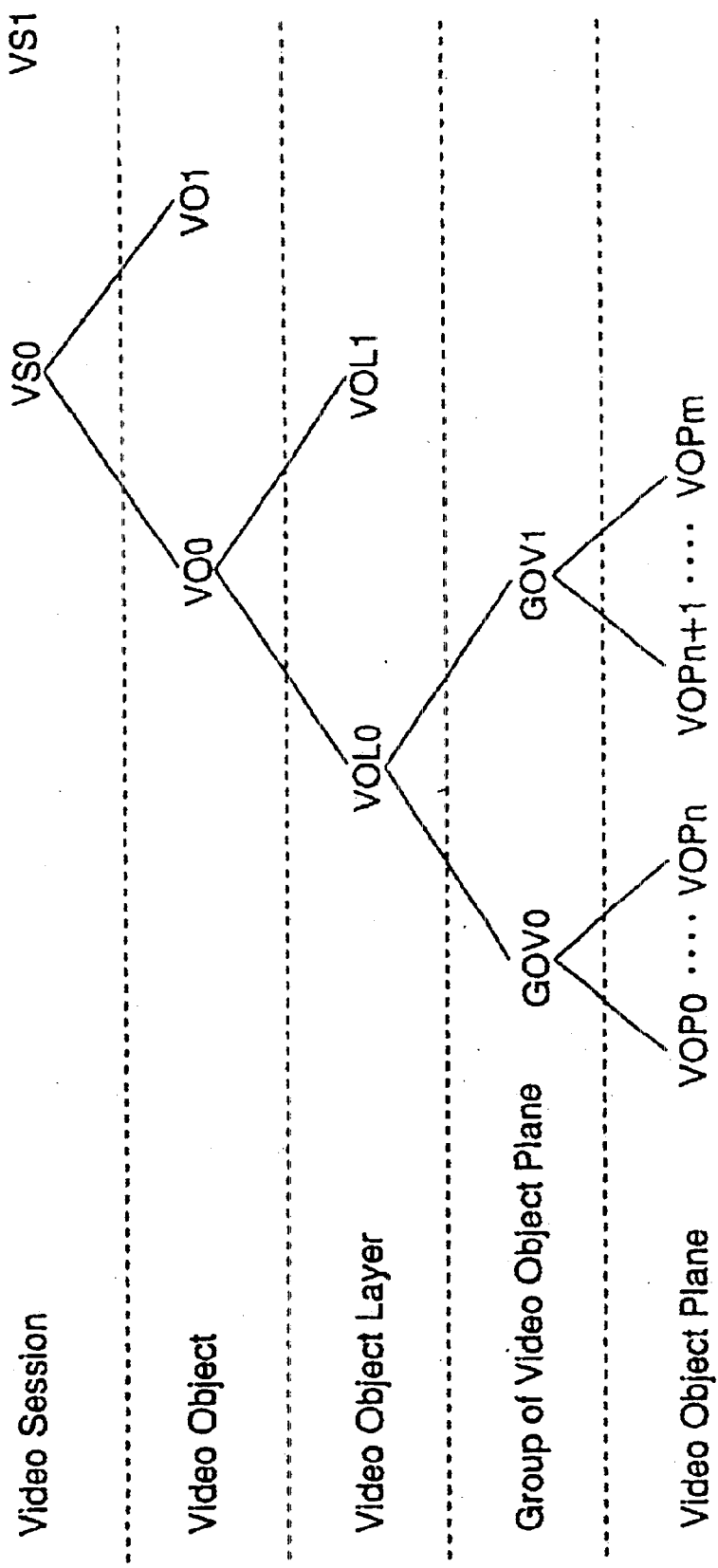
FIG. 25 is a diagram showing the syntax of a bit stream according to the present invention.

FIG. 25 shows a constitution of the encoded bit stream into which a GOV layer is introduced for encoding the absolute times present on a sequence of VOPs.

The GOV layer is prescribed between a VOL layer and a VOP layer so that it can be inserted at the arbitrary position of an encoded bit stream as well as at the head of the encoded bit stream.

With this, in the case where a certain VOL#0 is constituted by a VOP sequence such as VOP#0, VOP#1, ..., VOP#n, VOP#(n+1), ..., and VOP#m, the GOV layer can be inserted, for example, directly before the VOP#(n+1) as well as directly before the head VOP#0. Therefore, at the encoder, the GOV layer can be inserted, for example, at the position of an encoded bit stream where random access is performed. Therefore, by inserting the GOV layer, a VOP sequence constituting a certain VOL is separated into a plurality of groups (hereinafter referred to as a GOV as needed) and is encoded.

The syntax of the GOV layer is defined, for example, as shown in FIG. 26.

As shown in the figure, the GOV layer is constituted by a group_start_code, a time_code, a closed_gop, a broken_link, and a next_start_code( ), arranged in sequence.

Next, a description will be made of the semantics of the GOV layer. The semantics of the GOV layer is basically the same as the GOP layer in the MPEG-2 standard. Therefore, for the parts not described here, see the MPEG-2 video standard (ISO/IEC-13818-2).

The group_start_code is 000001B8 (hexadecimal) and indicates the start position of a GOV.

The time_code, as shown in FIG. 27, consists of a 1-bit drop_frame_flag, a 5-bit time_code_hours, a 6-bit time_code_minutes, a 1-bit marker_bit, a 6-bit time_code_seconds, and a 6-bit time_code_pictures. Thus, the time_code is constituted by 25 bits in total.

The time_code is equivalent to the "time and control codes for video tape recorders" prescribed in IEC standard publication 461. Here, the MPEG-4 standard does not have the concept of the frame rate of video. (Therefore, a VOP can be represented at an arbitrary time.) Therefore, this embodiment does not take advantage of the drop_frame_flag indicating whether or not the time_code is described in drop_frame_mode, and the value is fixed, for example, to 0. Also, this embodiment does not take advantage of the time_code_pictures for the same reason, and the value is fixed, for example, to 0. Therefore, the time_code used herein represents the time of the head of a GOV by the time_code_hours representing the hour unit of time representing the hour unit of time, time_code_minutes representing the minute unit of time, and time_code_seconds representing the second unit of time. As a result, the time_code (encoding start second-accuracy absolute time) in a GOV layer expresses the time of the head of the GOV layer, i.e., the absolute time on a VOP sequence when the encoding of the GOV layer is started, within accuracy of a second. For this reason, this embodiment of the present invention sets time within accuracy finer than a second (here, milliseconds) for each VOP.

Note that the marker_bit in the time_code is made 1 so that 23 or more 0's do not continue in a coded bit stream.

The closed_gop means one in which the I-, P- and B-pictures in the definition of the close_gop in the MPEG-2 video standard (ISO/IEC 13818-2) have been replaced with an I-VOP, a P-VOP, and a B-VOP, respectively. Therefore, the B-VOP in one VOP represents not only a VOP constituting the GOV but whether the VOP has been encoded with a VOP in another GOV as a reference image. Here, for the definition of the close_gop in the MPEG-2 video standard (ISO/IEC 13818-29) the sentences performing the above-mentioned replacement are shown as follows:

This is a one-bit flag which indicates the nature of the predictions used in the first consecutive B-VOPs (if any) immediately following the first coded I-VOP following the group of plane header. The closed_gop is set to 1 to indicate that these B-VOPs have been encoded using only backward prediction or intra coding. This bit is provided for use during any editing which occurs after encoding. If the previous pictures have been removed by editing, broken_link may be set to 1 so that a decoder may avoid displaying these B-VOPs following the first I-VOP following the group of plane header. However if the closed_gop bit is set to 1, then the editor may choose not to set the broken_link bit as these B-VOPs can be correctly decoded.

The broken_link also means one in which the same replacement as in the case of the closed_gop has been performed on the definition of the broken_link in the MPEG-2 video standard (ISO/IEC 13818-29). The broken_link, therefore, represents whether the head B-VOP of a GOV can be correctly regenerated. Here, for the definition of the broken_link in the MPEG-2 video standard (ISO/IEC 13818-2) the sentences performing the above-mentioned replacement are shown as follows:

This is a one-bit flag which shall be set to 0 during encoding. It is set to 1 to indicate that the first consecutive B-VOPs (if any) immediately following the first coded I-VOP following the group of plane header may not be correctly decoded because the reference frame which is used for-prediction is not available (because of the action of editing). A decoder may use this flag to avoid displaying frames that cannot be correctly decoded.

The next_start_code( ) gives the position of the head of the next GOV.

The above-mentioned absolute time in a GOV sequence which introduces the GOV layer and also starts the encoding of the GOV layer (hereinafter referred to as encoding start absolute time as needed) is set to the time_code of the GOV. Furthermore, as described above, since the time_code in the GOV layer has accuracy within a second, this embodiment sets a finer accuracy portion to the absolute time of each VOP present in a VOP sequence for each VOP.

Figure 28:
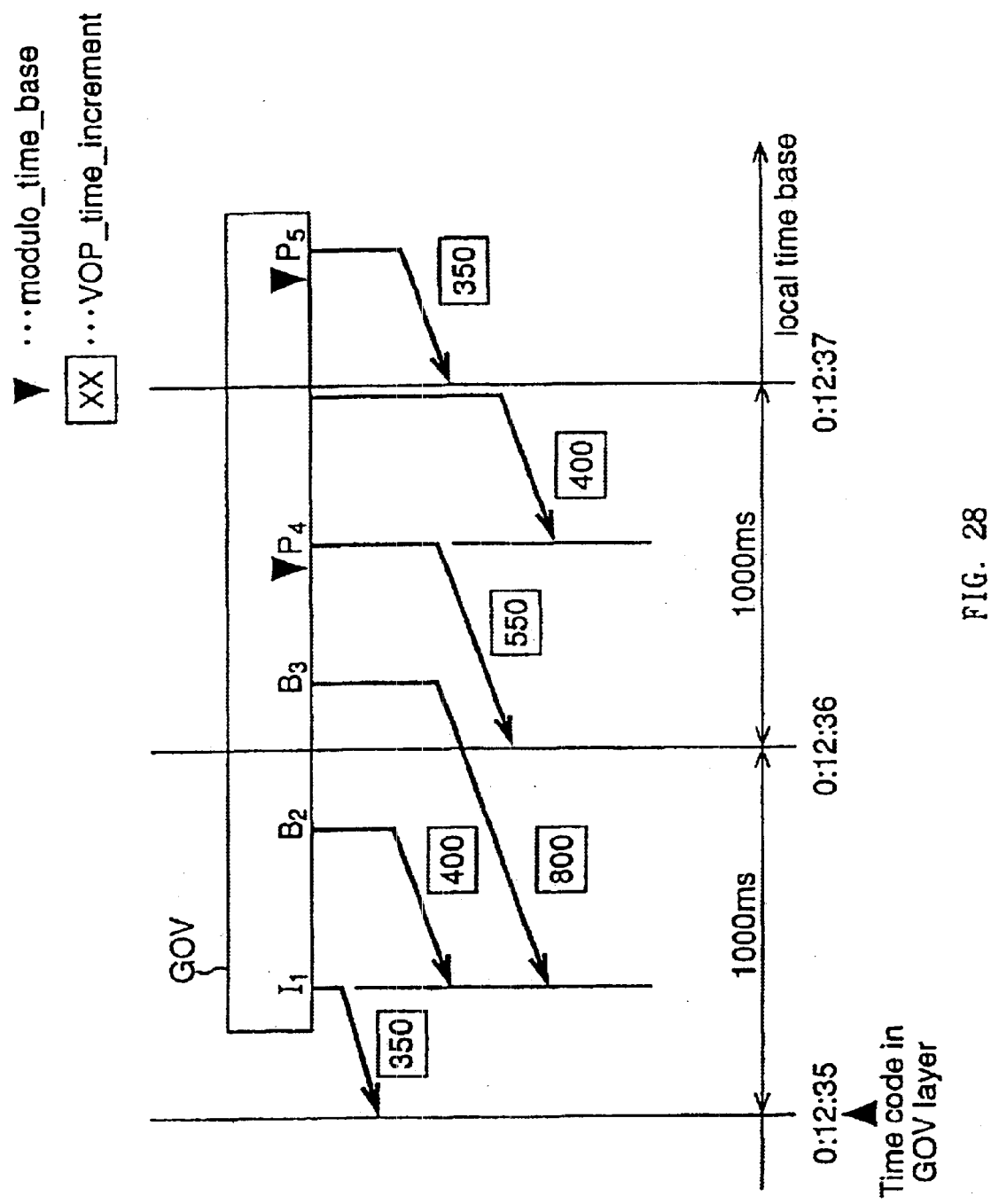
FIG. 28 is a diagram showing a method of encoding the time_code of the GOV layer and the modulo_time_base and VOP_time_increment of the first I-VOP of the GOV.

FIG. 28 shows the relation between the time_code, modulo_time_base, and VOP_time_increment in the case where the GOV layer of FIG. 26 has been introduced.

In the figure, the GOV is constituted by I1, B2, B3, P4, B5, and P6 arranged in display order from the head.

Now, for example, assuming the encoding start absolute time of the GOV is 0 h:12 m:35 sec:350 msec (0 hour 12 minutes 35 second 350 milliseconds), the time_code of the GOV will be set to 0 h:12 m:35 sec because it has accuracy within a second, as described above. (The time_code_hours, time_code_minutes, and time_code_seconds which constitute the time_code will be set to 0, 12, and 35, respectively.) On the other hand, in the case where the absolute time of the I1 in a VOP sequence (absolute time of a VOP sequence before-the encoding (or after the decoding) of a VS including the GOV of FIG. 28) (since this is equivalent to the display time of the I1 when a VOP sequence is displayed, it will hereinafter be referred to display time as needed) is, for example, 0 h:12 m:35 sec:350 msec, the semantics of VOP_time_increment is changed so that 350 ms which is accuracy finer than accuracy of a second is set to the VOP_time_increment of the I-VOP of the I1 and encoded (i.e., so that encoding is performed with the VOP_time_increment of the I1=350).

That is, in FIG. 28, the VOP_time_increment of the head I-VOP (I1) of a GOV in display order has a differential value between the time_code of the GOV and the display time of the I-VOP. Therefore, the time within accuracy of a second represented by the time_code is the first synchronization point of the GOV (here, a point representing time within accuracy of a second).

Note that, in FIG. 28, the semantics of the VOP_time_increments for the B2, B3, P4, B5, and P6 of the GOV which is VOP arranged as the second or later is the same as the one in which the definition of the VM-6.0 has been changed, as described in FIG. 24.

Therefore, in FIG. 28 the display time of the B2 or B3 is the time when VOP_time_increment has elapsed since the last displayed I-VOP or P-VOP. In this case, since the display time of the last displayed I1 is 0 h:12 m:35 s:350 ms, the display time of the B2 or B3 is 0 h:12 m:35 s:750 ms or 0 h:12 m:36 s:200 ms after 400 ms or 800 ms.

Next, for the P4, at the P4 the synchronization point indicated by modulo_time_base is switched. Therefore, the time of the synchronization point is 0 h:12 m:36 s after 1 second from 0 h:12 m:35 s. As a result, the display time of the P4 is 0 h:12 m:36 s:550 ms after 550 ms from 0 h:12 m:36 s.

The display time of the B5 is the time when VOP_time_increment has elapsed since the last displayed I-VOP or P-VOP. In this case, the display time of the B5 is 0 h:12 m:36 s:950 ms after 400 ms from the display time 0 h:12 m:36 s:550 ms of the last displayed P4.

Next, for the P6, at the P6 the synchronization point indicated by modulo_time_base is switched. Therefore, the time of the synchronization point is 0 h:12 m:35 s+2 sec, i.e., 0 h:12 m:37 s. As a result, the display time of the P6 is 0 h:12 m:37 s:350 ms after 350 ms from 0 h:12 m:37 s.

Figure 29:
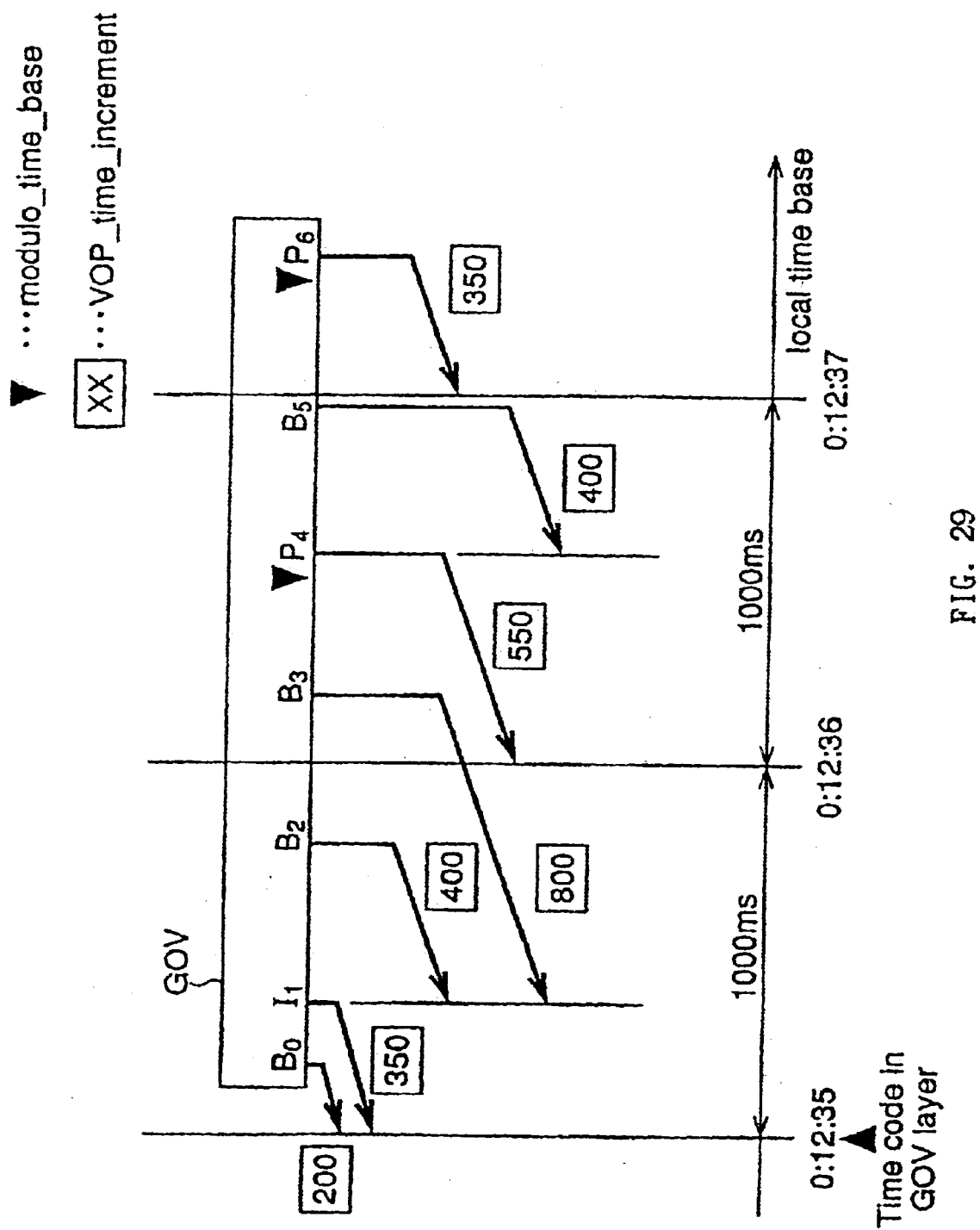
FIG. 29 is a diagram showing a method of encoding the time_code of the GOV layer and also the modulo_time_base and VOP_time_increment of the B-VOP located before the first I-VOP of the GOV.

Next, FIG. 29 shows the relation between the time_code, modulo_time_base, and VOP_time_increment in the case where the head VOP of a GOV is a B-VOP in display order.

In the figure, the GOV is constituted by B0, I1, B2, B3, P4, B5, and P6 arranged in display order from the head. That is, in FIG. 29 the GOV is constituted with the B0 added before the I1 in FIG. 28.

In this case, if it is assumed that the VOP_time_increment for the head B0 of the GOV is determined with the display time of the I/P-VOP of the GOV as standard, i.e., for example, if it is assumed that it is determined with the display time of the I1 as standard, the value will be a negative value, which is disadvantageous as described above.

Hence, the semantics of the VOP_time_increment for the B-VOP which is displayed prior to the I-VOP in the GOV (the B-VOP which is displayed prior to the I-VOP in the GOV which is first displayed) is changed as follows.

That is, the VOP_time_increment for such a B-VOP has a differential value between the time_code of the GOV and the display time of the B-VOP. In this case, when the display time of the B0 is, for example, 0 h:12 m:35 s:200 ms and when the time_code of the GOV is, for example, 0 h:12 m:35 s, as shown in FIG. 29, the VOP_time_increment for the B0 is 350 ms (=0 h:12 m:35 s:200 ms−0 h:12 m:35 s). If done in this manner, VOP_time_increment will always have a positive value.

With the aforementioned two changes in the semantics of the VOP_time_increment, the time_code of a GOV and the modulo_time_base and VOP_time_increment of a VOP can be correlated with each other. Furthermore, with this, the absolute time (display time) of each VOP can be specified.

Figure 30:
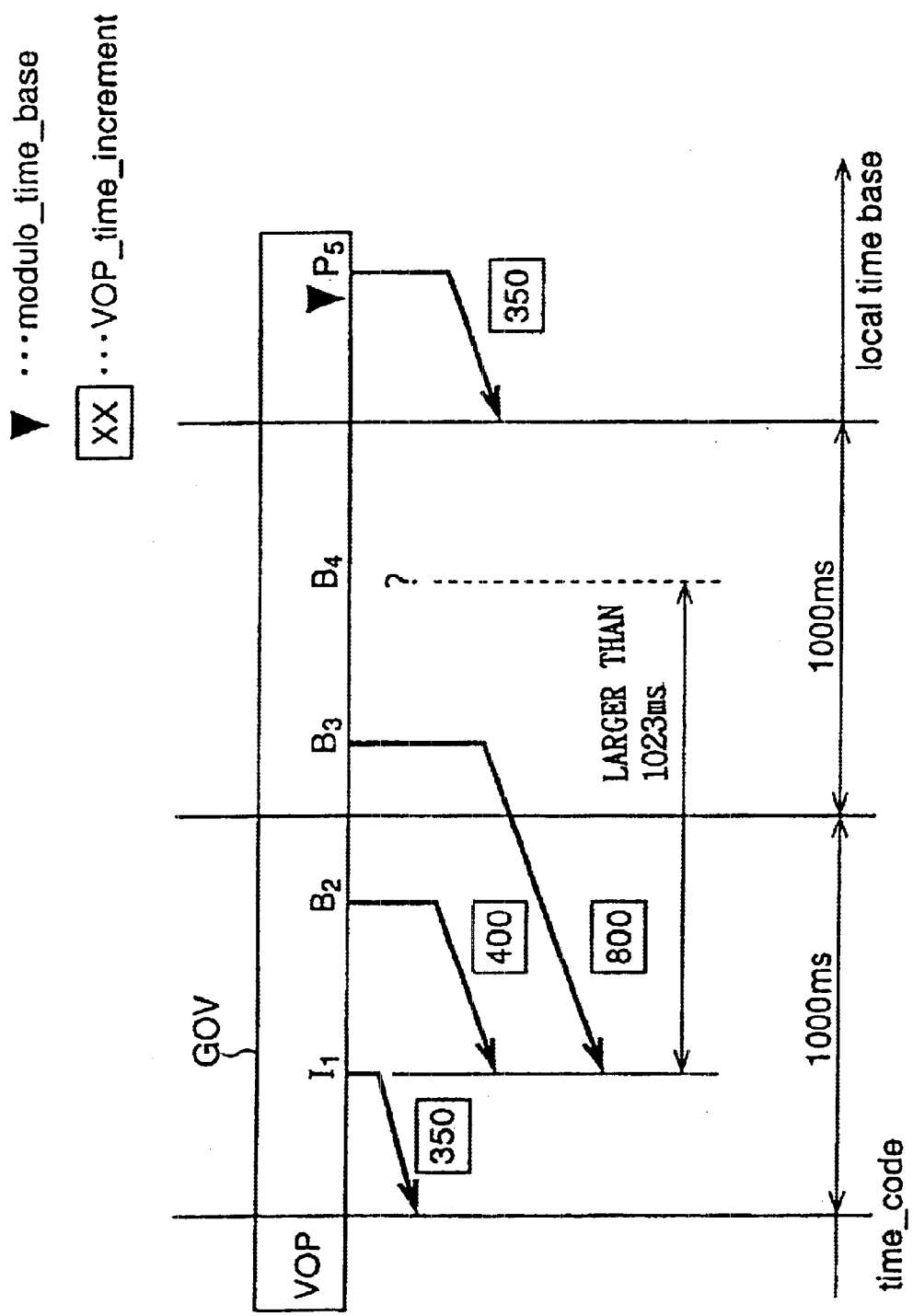
FIG. 30 is a diagram showing the relation between the modulo_time_base and the VOP_time_increment when the definitions thereof are not changed.
Figure 31:
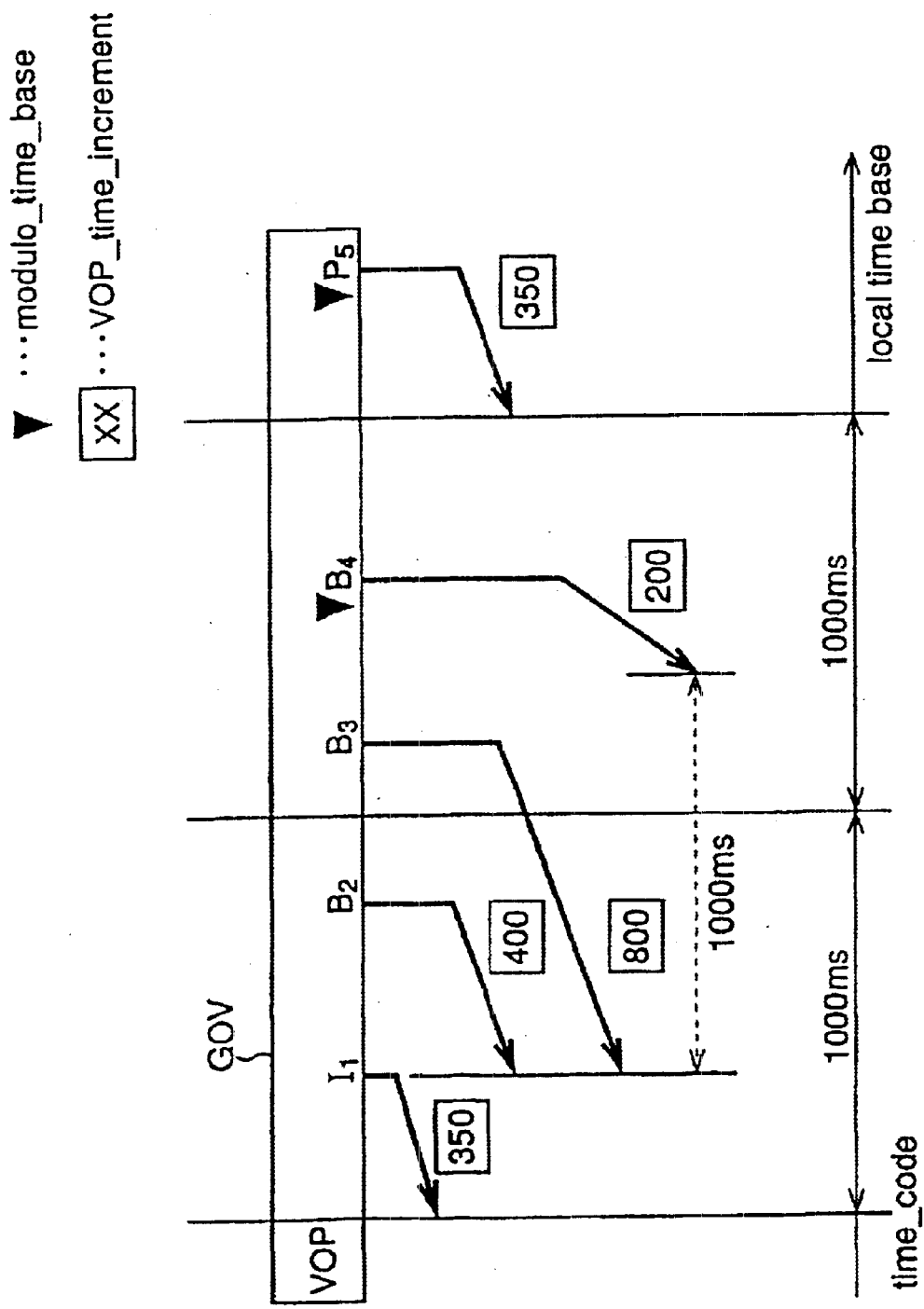
FIG. 31 is a diagram showing a process of encoding the modulo_time_base and VOP_time_increment of the B-VOP, based on a first method.

Next, FIG. 30 shows the relation between the time_code of a GOV and the modulo_time_base and VOP_time_increment of a VOP in the case where the interval between the display time of the I-VOP and the display time of the B-VOP predicted from the I-VOP is equal to or greater than 1 sec (exactly speaking, 1.023 sec).

In FIG. 30, the GOV is constituted by I1, B2, B3, B4, and P6 arranged in display order. The B4 is displayed at the time after 1 sec from the display time of the last displayed I1 (I-VOP).

In this case, when the display time of the B4 is encoded by the above-mentioned VOP_time_increment whose semantics has been changed, the VOP_time_increment is 10 bits as described above and can express only time up to 1023. For this reason, it cannot express time longer than 1.023 sec. Hence, the semantics of the VOP_time_increment is further changed and also the semantics of modulo_time_base which time finer than the accuracy of the second of the display time of the attention I/P-VOP, i.e., time in the units of milliseconds is set to VOP_time_increment, and the process ends.

At the VLC circuit 36, the modulo_time_base and VOP_time_increment of an attention I/P-VOP computed in the aforementioned manner are added to the attention I/P-VOP. With this, it is included in a coded bit stream.

Note that modulo_time_base, VOP_time_increment, and time_code are encoded at the VLC circuit 36 by variable word length coding.

Figure 33:
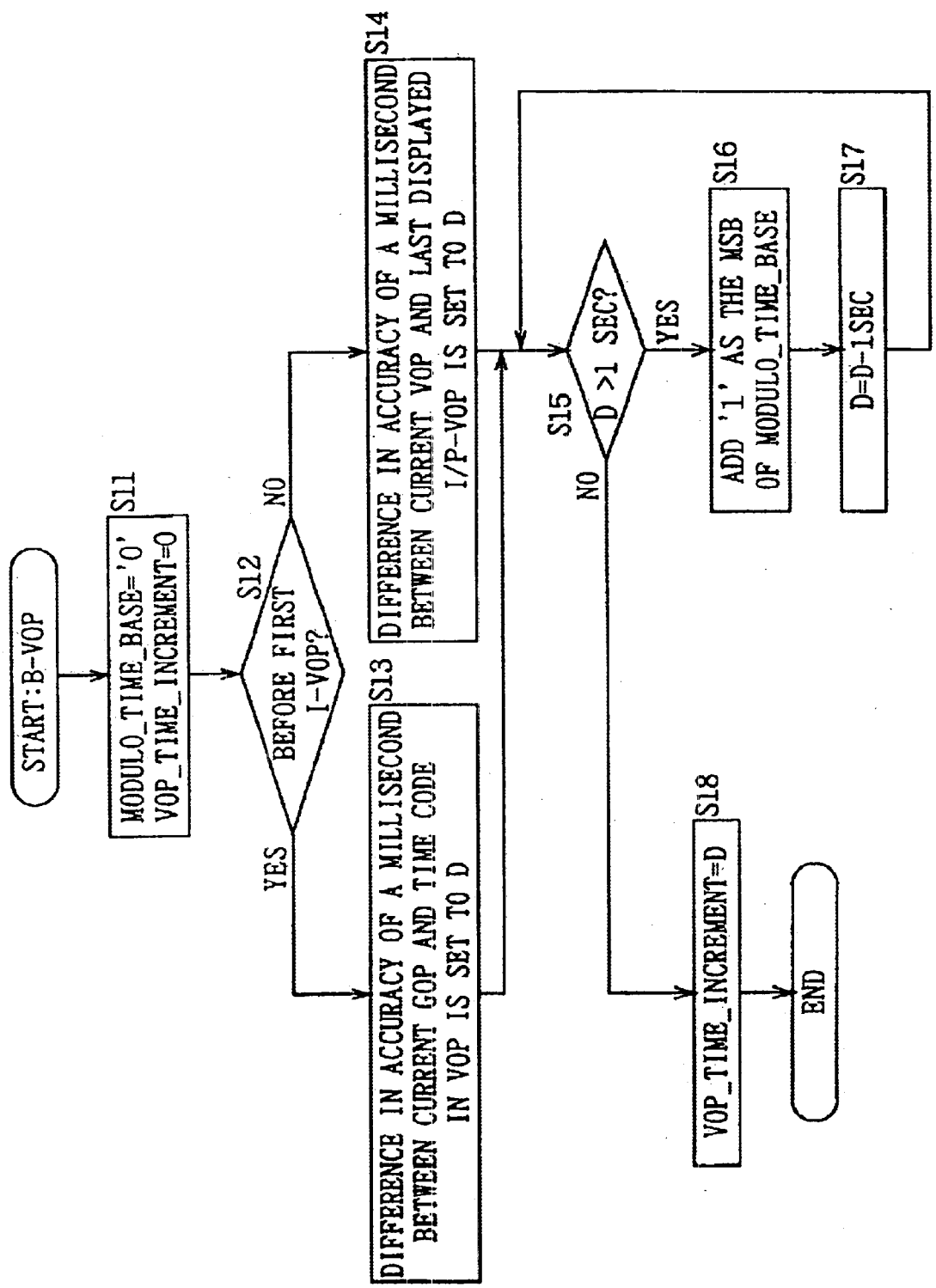
FIG. 33 is a flowchart showing a process of encoding the modulo_time_base and VOP_time_increment of the B-VOP, based on a first method.

Each time a B-VOP constituting a processing object GOV is received, the VLC unit 36 sets the B-VOP to an attention B-VOP, computes the modulo_time_base and VOP_time_increment of the attention B-VOP in accordance with a flowchart of FIG. 33, and performs encoding.

Figure 32:
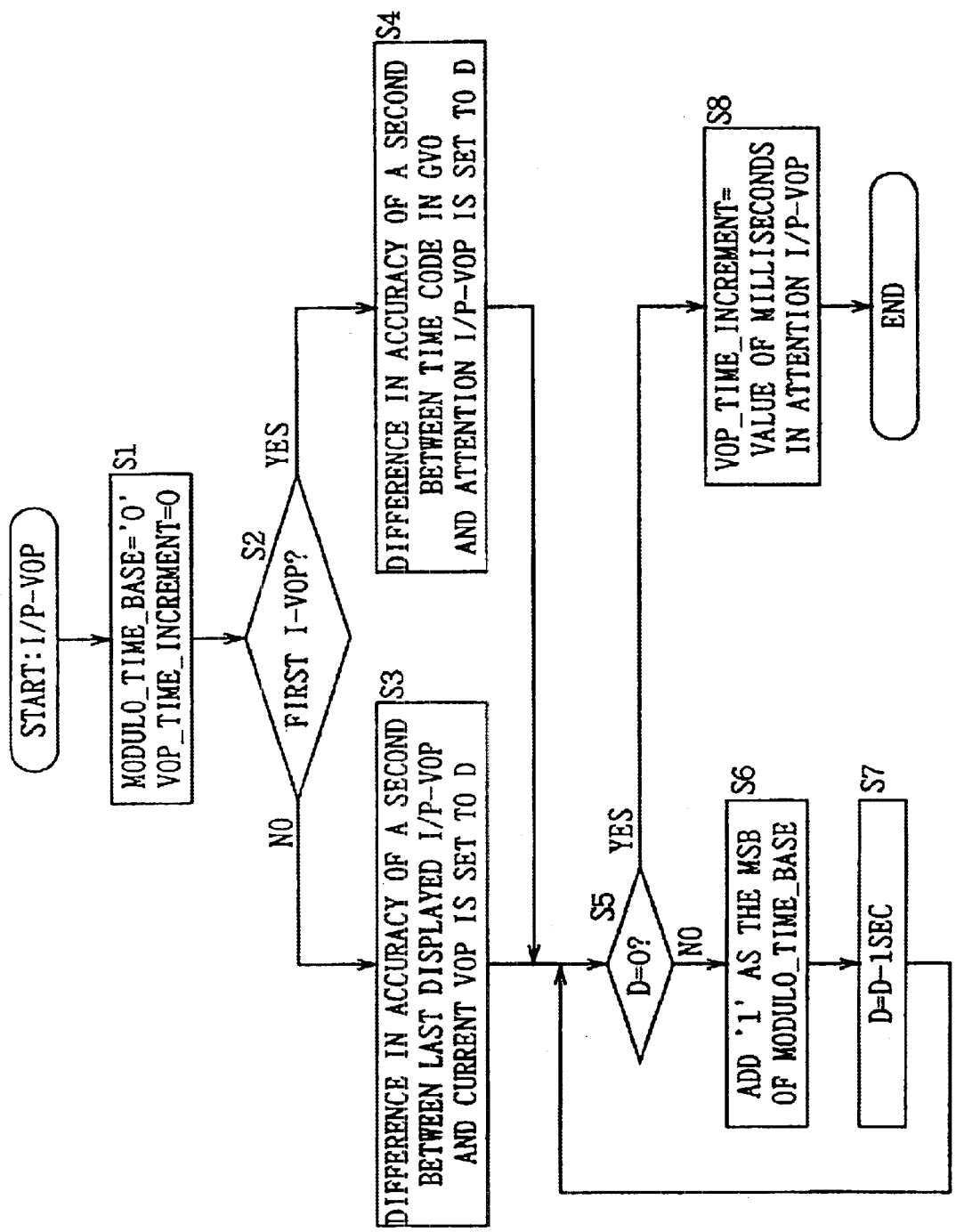
FIG. 32 is a flowchart showing a process of encoding the modulo_time_base and VOP_time_increment of I/P-VOP, based on a first method and a second method.

That is, at the VLC unit 36, in step S11, as in the case of step S1 in FIG. 32, the modulo_time_base and VOP_time_increment are first reset.

And step S11 advances to step S12, in which it is judged whether the attention B-VOP is displayed prior to the first I-VOP of the processing object GOV. In step S12, in the case where it is judged that the attention B-VOP is one which is displayed prior to the first I-VOP of the processing object GOV, step S12 advances to step S14. In step S14, the difference between the time_code of the processing object GOV and the display time of the attention B-VOP (here, B-VOP which is displayed prior to the first I-VOP of the processing object GOV) is computed and set to a variable D. Then, step S13 advances to step S15. Therefore, in FIG. 33, time within accuracy of a millisecond (the time up to the digit of the millisecond) is set to the variable D (on the other hand, time within accuracy of a second is set to the variable in FIG. 32, as described above).

Also, in step S12, in the case where it is judged that the attention B-VOP is one which is displayed after the first I-VOP of the processing object GOV, step S12 advances to step S14. In step S14, the differential value between the display time of the attention B-VOP and the display time of the last displayed I/P-VOP (which is displayed immediately before the attention B-VOP of the VOP constituting the processing object GOV) is computed and the differential value is set to the variable D. Then, step S13 advances to step S15.

In step S15 it is judged whether the variable D is greater than 1. That is, it is judged whether the difference value between the time_code and the display time of the attention B-VOP is greater than. 1, or it is judged whether the differential value between the display time of the attention B-VOP and the display time of the last displayed I/P-VOP is greater than 1. In step S15, in the case where it is judged that the variable D is greater than 1, step S15 advances to step S17, in which 1 is added as the most significant bit (MSB) of the modulo_time_base. In step S17 the variable D is decremented by 1. Then, step S17 returns to step S15. And until in step S15 it is judged that the variable D is not greater than 1, steps S15 through S17 are repeated. That is, with this, the number of consecutive 1's in the modulo_time_base is the same as the number of seconds corresponding to the difference between the time_code and the display time of the attention B-VOP or the differential value between the display time of the attention B-VOP and the display time of the last displayed I/P-VOP. And the modulo_time_base has 0 at the least significant digit (LSD) thereof.

And in step S15, in the case where it is judged that the variable D is not greater than 1, step S15 advances to step S18, in which the value of the current variable D, i.e., the differential value between the time_code and the display time of the attention B-VOP, or the milliseconds digit to the right of the seconds digit of the differential between the display time of the attention B-VOP and the display time of the last displayed I/P-VOP, is set to VOP_time_increment, and the process ends.

At the VLC circuit 36, the modulo_time_base and VOP_time_increment of an attention B-VOP computed in the aforementioned manner are added to the attention B-VOP. With this, it is included in a coded bit stream.

Next, each time the coded data for each VOP is received, the IVLC unit 102 processes the VOP as an attention VOP. With this process, the IVLC unit 102 recognizes the display time of a VOP included in a coded stream which the VLC unit 36 outputs-by dividing a VOP sequence into GOVs and also processing each GOV in the above-mentioned manner. Then, the IVLC unit 102 performs variable word length coding so that the VOP is displayed at the recognized display time. That is, if a GOV is received, the IVLC unit 102 will recognize the time_code of the GOV. Each time an I/P-VOP constituting the GOV is received, the IVLC unit 102 sets the I/P-VOP to an attention I/P-VOP and computes the display time of the attention I/P-VOP, based on the modulo_time_base and VOP_time_increment of the attention I/P-VOP in accordance with a flowchart of FIG. 34.

That is, at the IVLC unit 102, first, in step S21 it is judged whether the attention I/P-VOP is the first I-VOP of the processing object GOV. In step S21, in the case where the attention I/P-VOP is judged to be the first I-VOP of the processing object GOV, step S21 advances to step S23. In step S23 the time_code of the processing object GOV is set to a variable T, and step S23 advances to step S24.

Also, in step S21, in the case where it is judged that the attention I/P-VOP is not the first I-VOP of the processing object GOV, step S21 advances to step S22. In step S22, a value up to the seconds digit of the display time of the last displayed I/P-VOP (which is one of the VOPs constituting the processing object GOV) displayed immediately before the attention I/P-VOP is set to the variable T. Then, step S22 advances to step S24.

In step S24 it is judged whether the modulo_time_base added to the attention I/P-VOP is equal to 0B. In step S24, in the case where it is judged that the modulo_time_base added to the attention I/P-VOP is not equal to 0B, i.e., in the case where the modulo_time_base added to the attention I/P-VOP includes 1, step S24 advances to step S25, in which 1 in the MSB of the modulo_time_base is deleted. Step S25 advances to step S26, in which the variable T is incremented by 1. Then, step S26 returns to step S24. Thereafter, until in step S24 it is judged that the modulo_time_base added to the attention I/P-VOP is equal to 0B, steps S24 through S26 are repeated. With this, the variable T is incremented by the number of seconds which corresponds to the number of 1's in the first modulo_time_base added to the attention I/P-VOP.

And in step S24, in the case where the modulo_time_base added to the attention I/P-VOP is equal to 0B, step S24 advances step S27, in which time within accuracy of a millisecond, indicated by VOP_time_increment, is added to the variable T. The added value is recognized as the display time of the attention I/P-VOP, and the process ends.

Figure 35:
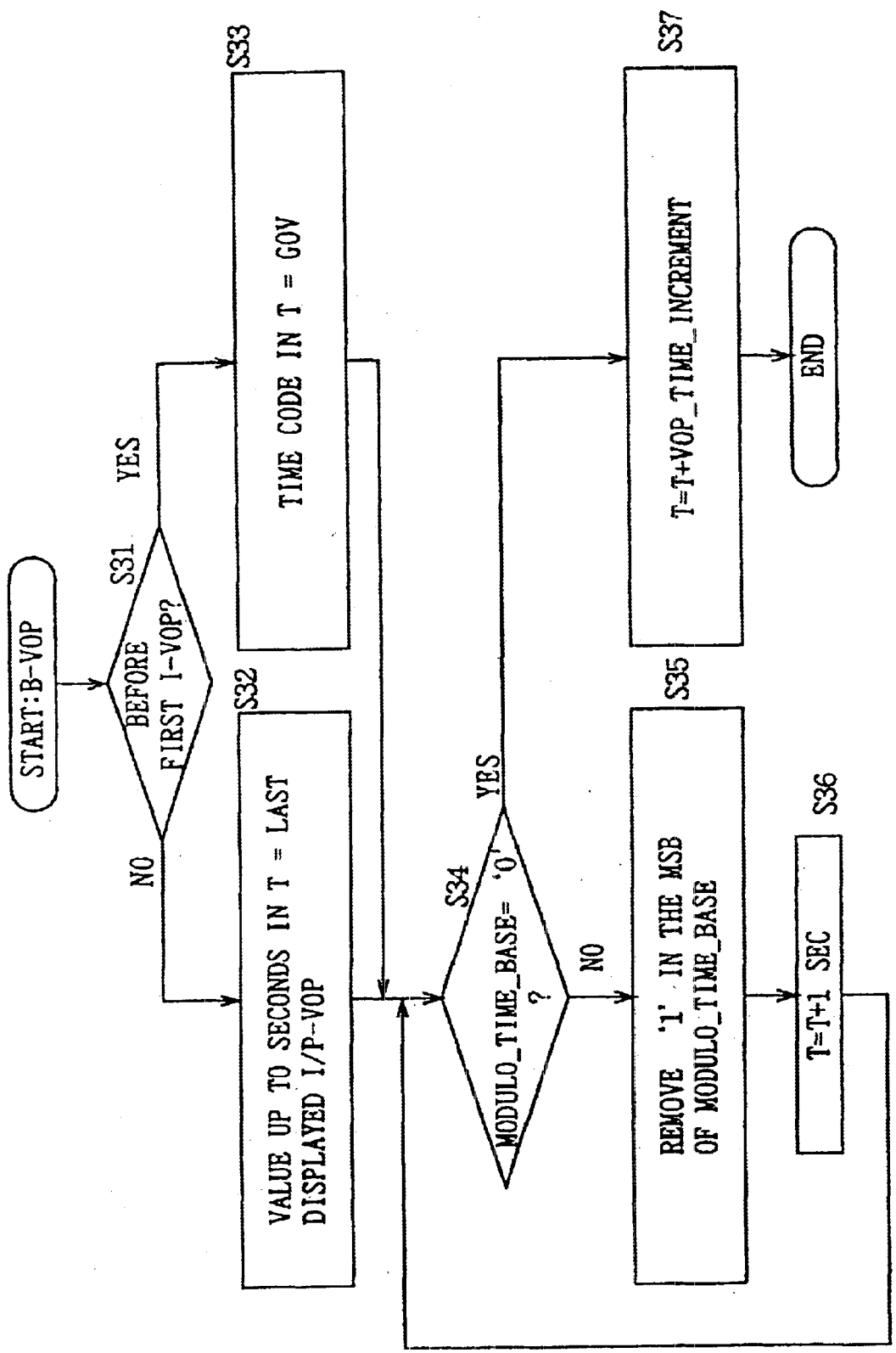
FIG. 35 is a flowchart showing a process of decoding the modulo_time_base and VOP_time_increment of the B-VOP encoded by the first method.

Next, when a B-VOP constituting the processing object GOV is received, the IVLC unit 102 sets the B-VOP to an attention B-VOP and computes the display time of the attention B-VOP, based on the modulo_time_base and VOP_time_increment of the attention B-VOP in accordance with a flowchart of FIG. 35.

That is, at the IVLC unit 102, first, in step S31 it is judged whether the attention B-VOP is one which is displayed prior to the first I-VOP of the processing object GOV. In step S31, in the case where the attention B-VOP is judged to be one which is displayed prior to the first I-VOP of the processing object GOV, step S31 advances to step S33. Thereafter, in steps S33 to S37, as in the case of steps S23 to S27 in FIG. 34, a similar process is performed, whereby the display time of the attention B-VOP is computed.

On the other hand, in step S31, in the case where it is judged that the attention B-VOP is one which is displayed after the first I-VOP of the processing object GOV, step S31 advances to step S32. Thereafter, in steps S32 and S34 to S37, as in the case of steps S22 and S24 to S27 in FIG. 34, a similar process is performed, whereby the display time of the attention B-VOP is computed.

Next, in the second method, the time between the display time of an I-VOP and the display time of a B-VOP predicted from the I-VOP is computed up to the seconds digit. The value is expressed with modulo_time_base, while the millisecond accuracy of the display time of B-VOP is expressed with VOP_time_increment. That is, the VM-6.0, as described above, the temporal distance to an I-VOP or P-VOP is set to the VOP_time_increment for a B-VOP so that the weight, relative to the I-VOP or P-VOP which is employed as a reference image in performing the predictive coding of the B-VOP, is determined from the B-VOP on the basis of the temporal distance to the I-VOP or P-VOP arranged across the B-VOP. For this reason, the VOP_time_increment for the I-VOP or P-VOP is different from the time from the synchronization point marked by the last encoded/decoded modulo_time_base. However, if the display time of a B-VOP and also the I-VOP or P-VOP arranged across the B-VOP are computed, the temporal distance therebetween can be computed by the difference therebetween. Therefore, there is little necessity to handle only the VOP_time_increment for the B-VOP separately from the VOP_time_increments for the I-VOP and P-VOP. On the contrary, from the viewpoint of processing efficiency it is preferable that all VOP_time_increments (detailed time information) for I-, B-, and P-VOPs and, furthermore, the modulo_time_bases (second-accuracy time information) be handled in the same manner.

Hence, in the second method, the modulo_time_base and VOP_time_increment for the B-VOP are handled in the same manner as those for the I/P-VOP.

Figure 36:
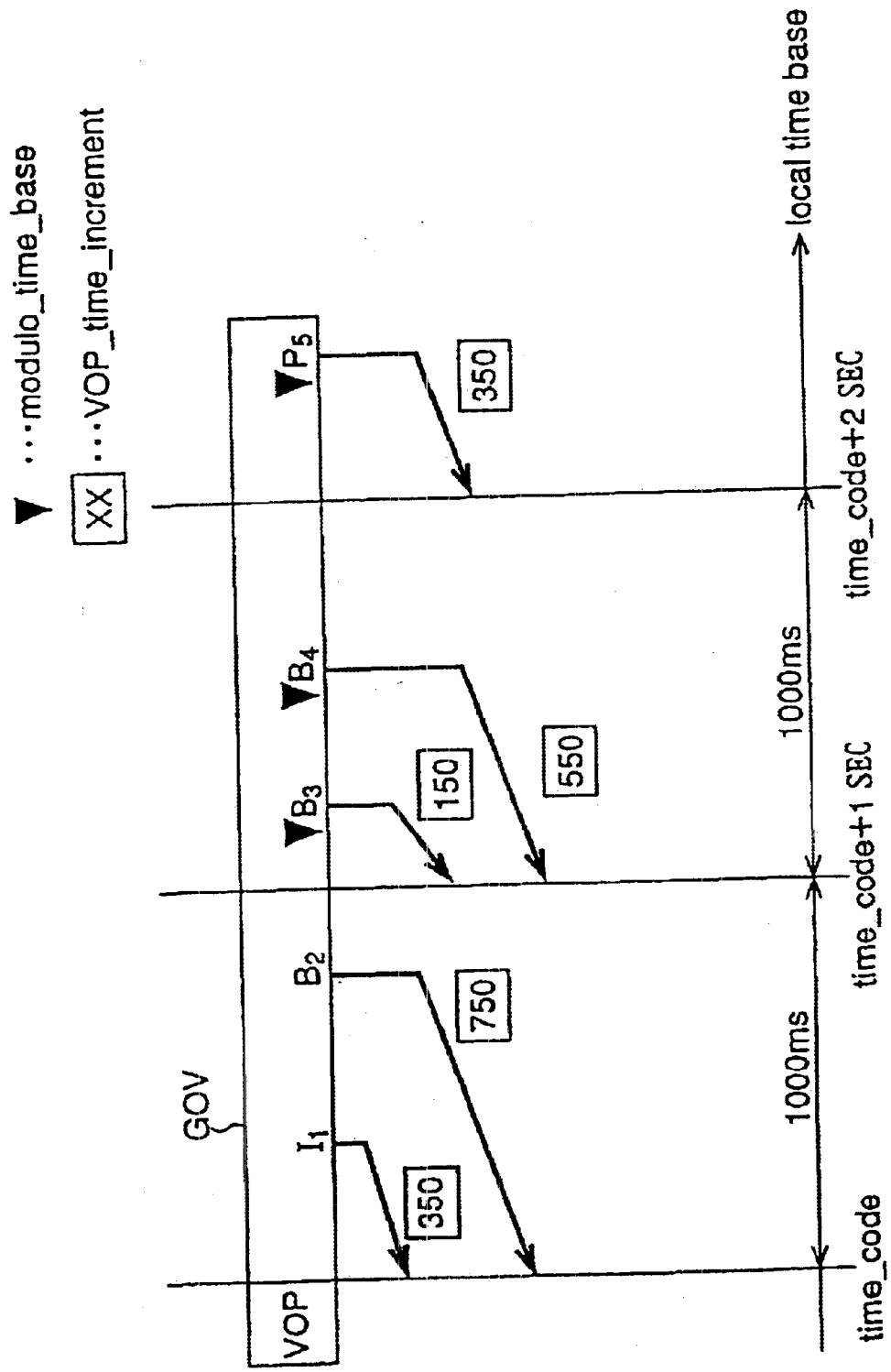
FIG. 36 is a diagram showing a process of encoding the modulo_time_base and VOP_time_increment of the B-VOP, based on a second method.

FIG. 36 shows the relation between the time_code for a GOV and the modulo_time_base and VOP_time_increment in the case where the modulo_time_base and VOP_time_increment have been encoded according to the second method, for example, in the case shown in FIG. 30.

That is, even in the second method, the addition of modulo_time_base is allowed not only for an I-VOP and a P-VOP but also for a B-VOP. And the modulo_time_base added to a B-VOP, as with the modulo_time_base added to an I/P-VOP, represents the switch of synchronization points.

Furthermore, in the second method, the time of the synchronization point marked by the modulo_time_base added to a B-VOP is subtracted from the display time of the B-VOP, and the resultant valve is set as the VOP_time_increment.

Therefore, according to the second method, in FIG. 30, the modulo_time_bases for I1 and B2, displayed between the first synchronization point of a GOV (which is time represented by the time_code of the GOV) and the synchronization point marked by the time_code+1 sec, are both 0B. And the values of the milliseconds unit lower than the seconds unit of the display times of the I1 and B2 are set to the VOP_time_increments for the I1 and B2, respectively. Also, the modulo_time_bases for B3 and B4, displayed between the synchronization point marked by the time_code+1 sec and the synchronization point marked by the time_code+2 sec, are both 10B. And the values of the milliseconds unit lower than the seconds unit of the display times of the B3 and B4 are set to the VOP_time_increments for the B3 and B4, respectively. Furthermore, the modulo_time_base for P5, displayed between the synchronization point marked by the time_code+2 sec and the synchronization point marked by the time_code+3 sec, is 110B. And the value of the milliseconds unit lower than the seconds unit of the display time of the P5 is set to the VOP_time_increment for the P5.

For example, in FIG. 30 if it is assumed that the display time of the I1 is 0 h:12 m:35 s:350 ms and also the display time of the B4 is 0 h:12 m:36 s:550 ms, as described above, the modulo_time_bases for I1 and B4 are 0B and 10B, respectively. Also, the VOP_time_increments for I1 and B4 are 0B are 350 ms and 550 ms (which are the milliseconds unit of the display time), respectively.

The aforementioned process for the modulo_time_base and VOP_time_increment according to the second method, as in the case of the first method, is performed by the VLC unit 36 shown in FIGS. 11 and 12 and also by the IVLC unit 102 shown in FIGS. 17 and 18.

That is, the VLC unit 36 computes the modulo_time_base and VOP_time for an I/P-VOP in the same manner as the case in FIG. 32.

Figure 37:
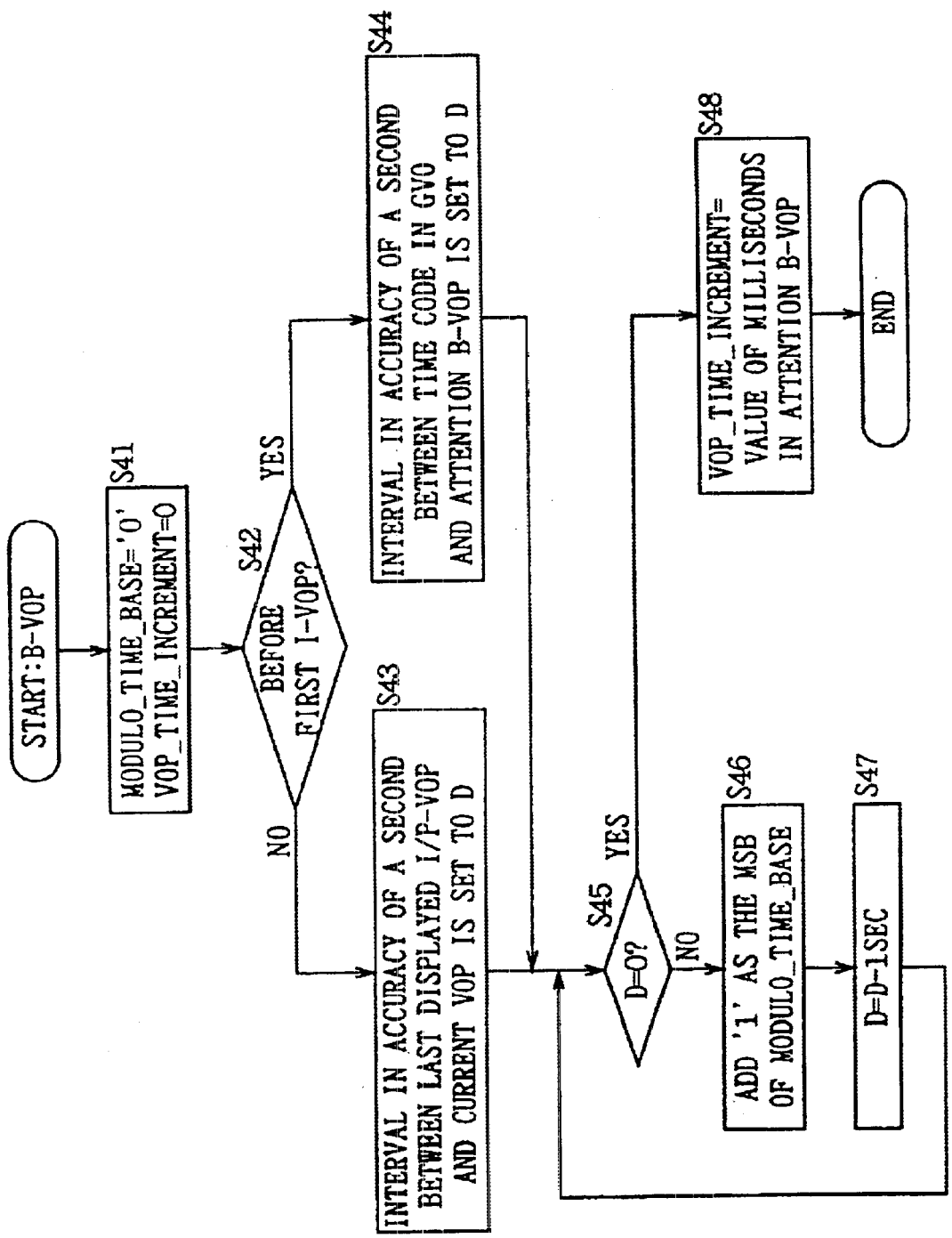
FIG. 37 is a flowchart showing the process of encoding the modulo_time_base and VOP_time_increment of the B-VOP, based on the second method.

Also, for a B-VOP, each time the B-VOP constituting a GOV is received, the VLC unit 36 sets the B-VOP to an attention B-VOP and computes the modulo_time_base and VOP_time_increment of the attention B-VOP in accordance with a flowchart of FIG. 37.

That is, at the VLC unit 36, first, in step S41 the modulo_time_base and VOP_time_increment are reset in the same manner as the case in step S1 of FIG. 32.

And step S41 advances to step S42, in which it is judged whether the attention B-VOP is one which is displayed prior to the first I-VOP of a GOV to be processed (a processing object GOV). In step S42, in the case where it is judged whether the attention B-VOP is one which is displayed prior to the first I-VOP of the processing object GOV, step S42 advances to step S44. In step S44, the difference between the time_code of the processing object GOV and the second-accuracy of the attention B-VOP, i.e., the difference between the time_code and the seconds digit of the display time of the attention B-VOP is computed and set to a variable D. Then, step S44 advances to step S45.

Also, in step S42, in the case where it is judged that the attention B-VOP is one which is displayed after the first I-VOP of the processing object GOV, step S42 advances to step S43. In step S43, the differential value between the seconds digit of the display time of the attention B-VOP and the seconds digit of the display time of the last displayed I/P-VOP (which is one of the VOPs constituting the processing object GOV, displayed immediately before the attention B-VOP) is computed and the differential value is set to the variable D. Then, step S43 advances to step S45.

In step S45 it is judged whether the variable D is equal to 0. That is, it is judged whether the difference between the time_code and the seconds digit of the display time of the attention B-VOP is equal to 0, or it is judged whether the differential value between the seconds digit of the display time of the attention B-VOP and the seconds digit of the display time of the last displayed I/P-VOP is equal to 0 sec. In step S4S, in the case where it is judged that the variable D is not equal to 0, i.e., in the case where the variable D is equal to or greater than 1, step S45 advances to step S46, in which 1 is added as the MSB of the modulo_time_base.

And step S46 advances to step S47, in which the variable D is incremented by 1. Then, step S47 returns to step S45. Thereafter, until in step S45 it is judged that the variable D is equal to 0, steps S45 through S47 are repeated. That is, with this, the number of consecutive 1's in the modulo_time_base is the same as the number of seconds corresponding to the difference between the time_code and the seconds digit of the display time of the attention B-VOP or the differential value between the seconds digit of the display time of the attention B-VOP and the seconds digit of the display time of the last displayed I/P-VOP. And the modulo_time_base has 0 at the LSD thereof.

And in step S45, in the case where it is judged that the variable D is equal to 0, step S45 advances to step S48, in which time finer than the seconds accuracy of the display time of the attention B-VOP, i.e., time in the millisecond unit is set to the VOP_time_increment, and the process ends.

Figure 34:
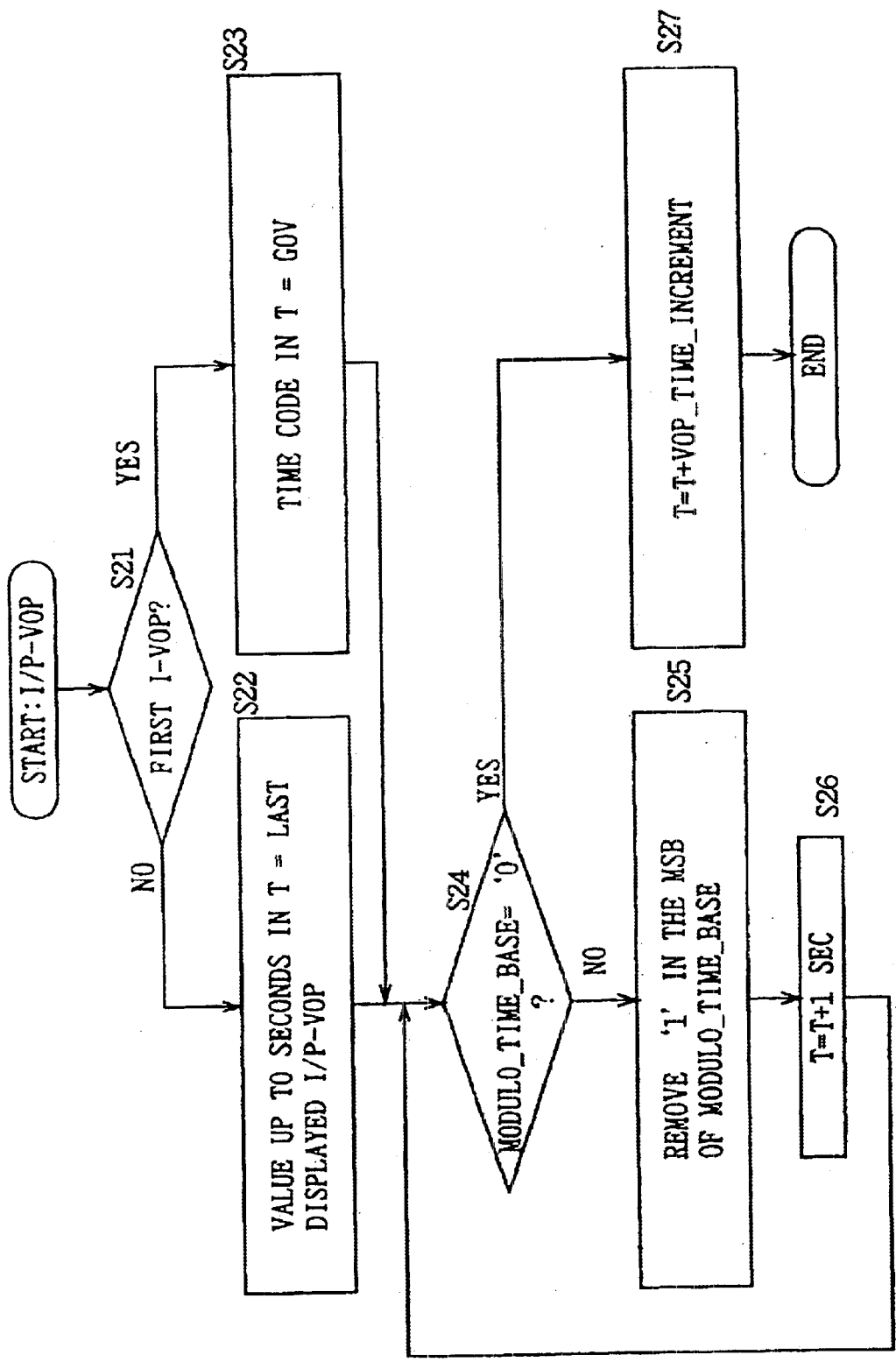
FIG. 34 is a flowchart showing a process of decoding the modulo_time_base and VOP_time_increment of the I/P-VOP encoded by the first and second methods.

On the other hand, for an I/P-VOP the IVLC unit 102 computes the display time of the I/P-VOP, based on the modulo_time_base and VOP_time_increment in the same manner as the above-mentioned case in FIG. 34.

Figure 38:
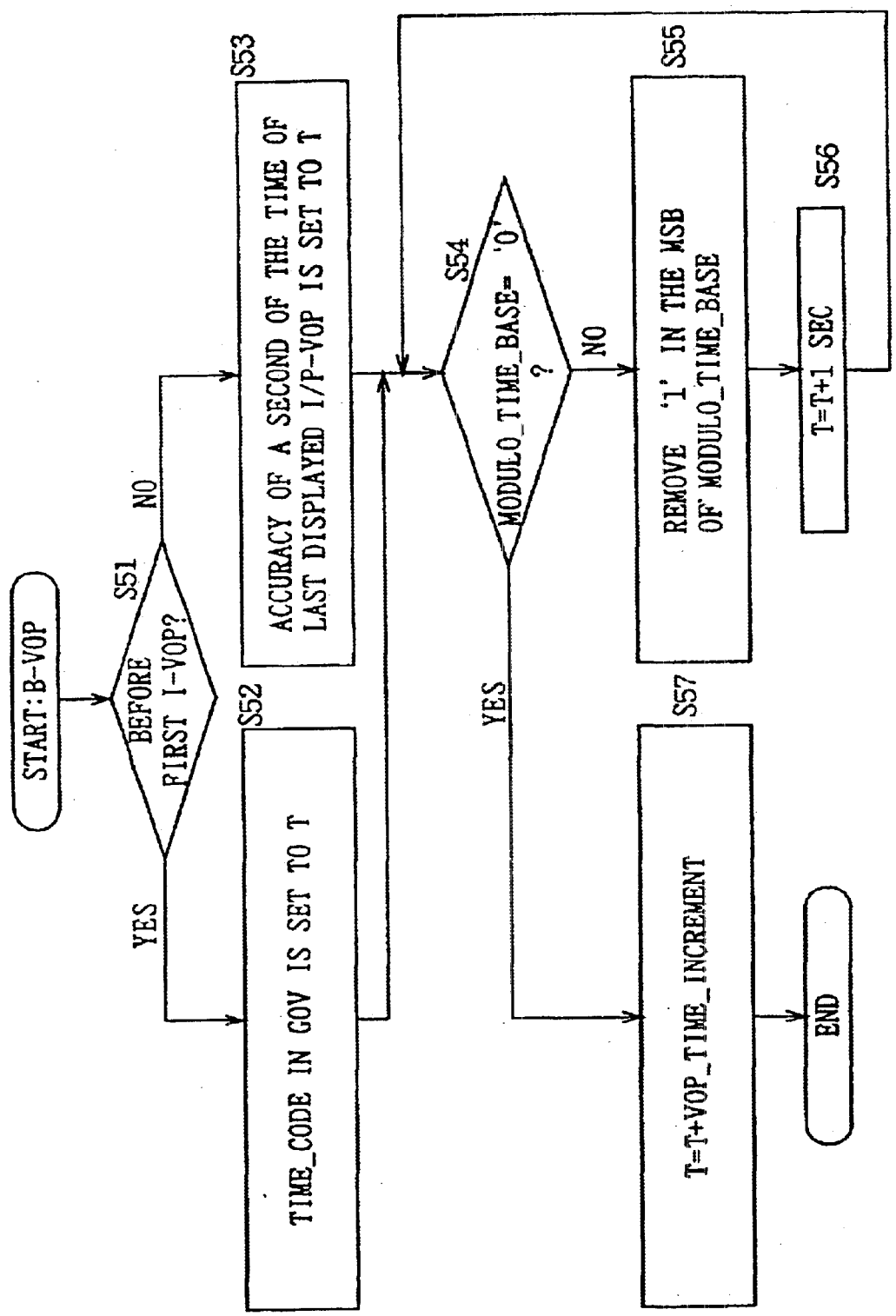
FIG. 38 is a flowchart showing a process of decoding the modulo_time_base and VOP_time_increment of the B-VOP encoded by the second method.

Also, for a B-VOP, each time the B-VOP constituting a GOV is received, the IVLC unit 102 sets the B-VOP to an attention B-VOP and computes the display time of the attention B-VOP, based on the modulo_time_base and VOP_time_increment of the attention B-VOP in accordance with a flowchart of FIG. 38.

That is, at the IVLC unit 102, first, in step S51 it is judged whether the attention B-VOP is one which is displayed prior to the first I-VOP of the processing object GOV. In step S51, in the case where it is judged that the attention B-VOP is one which is displayed prior to the first I-VOP of the processing object GOV, step S51 advances to step S52. In step S52 the time_code of the processing object GOV is set to a variable T, and step S52 advances to step S54.

Also, in step S51, in the case where it is judged that the attention B-VOP is one which is displayed after the first I-VOP of the processing object GOV, step S51 advances to step S53. In step S53, a value up to the seconds digit of the display time of the last displayed I/P-VOP (which is one of the VOPs constituting the processing object GOV, displayed immediately before the attention B-VOP) is set to the variable T. Then, step S53 advances to step S54.

In step S54 it is judged whether the modulo_time_base added to the attention B-VOP is equal to 0B. In step S54, in the case where it is judged that the modulo_time_base added to the attention B-VOP is not equal to 0B, i.e., in the case where the modulo_time_base added to the attention B-VOP includes 1, step S54 advances to step S55, in which the 1 in the MSB of the modulo_time_base is deleted. Step S55 advances to step S56, in which the variable T is incremented by 1. Then, step S56 returns to step S54. Thereafter, until in step S54 it is judged that the modulo_time_base added to the attention B-VOP is equal to 0B, steps S54 through S56 are repeated. With this, the variable T is incremented by the number of seconds which corresponds to the number of 1's in the first modulo_time_base added to the attention B-VOP.

And in step S54, in the case where the modulo_time_base added to the attention B-VOP is equal to 0B, step S54 advances to step S57, in which time within accuracy of a millisecond, indicated by the VOP_time_increment, is added to the variable T. The added value is recognized as the display time of the attention B-VOP, and the process ends.

Thus, in the embodiment of the present invention, the GOV layer for encoding the encoding start absolute time is introduced into the hierarchical constitution of an encoded bit stream. This GOV layer can be inserted at an appropriate position of the encoded bit stream as well as at the head of the encoded bit stream. In addition, the definitions of the modulo_time_base and VOP_time_increment prescribed in the VM-6.0 have been changed as described above. Therefore, it becomes possible in all cases to compute the display time (absolute time) of each VOP regardless of the arrangement of picture types of VOPs and the time interval between adjacent VOPs.

Therefore, at the encoder, the encoding start absolute time is encoded at a GOV unit and also the modulo_time_base and VOP_time_increment of each VOP are encoded. The coded data is included in a coded bit stream. With this, at the decoder, the encoding start absolute time can be decoded at a GOV unit and also the modulo_time_base and VOP_time_increment of each VOP can be decoded. And the display time of each VOP can be decoded, so it becomes possible to perform random access efficiently at a GOV unit.

Note if the number of 1's which are added to modulo_time_base is merely increased as a synchronization point is switched, it will reach the huge number of bits. For example, if 1 hr (3600 sec) has elapsed since the time marked by time_code (in the case where a GOV is constituted by VOPs equivalent to that time), the modulo_time_base will reach 3601 bits, because it is constituted by a 1 of 3600 bits and a 0 of 1 bit.

Hence, in the MPEG-4 the modulo_time_base is prescribed so that it is reset at an I/P-VOP which is first displayed after a synchronization point has been switched.

Figure 39:
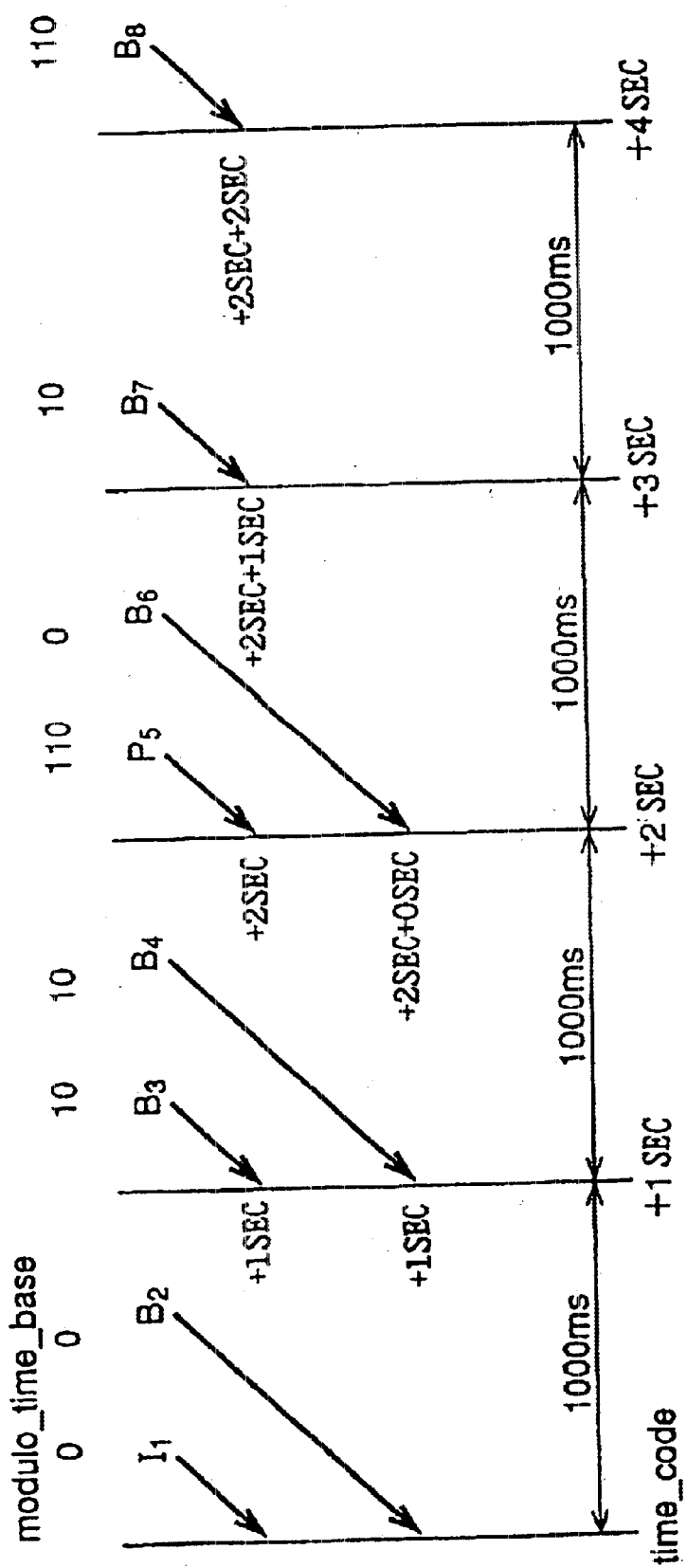
FIG. 39 is a diagram for explaining the modulo_time_base.

Therefore, for example, as shown in FIG. 39, in the case where a GOV is constituted by I1 and B2 displayed between the first synchronization point of the GOV (which is time represented by the time_code of the GOV) and the synchronization point marked by time_code+1 sec, B3 and B4 displayed between the synchronization point marked by the time_code+1 sec and the synchronization point marked by the time_code+2 sec, P5 and B6 displayed between the synchronization point marked by the time_code+2 sec and the synchronization point marked by the time_code+3 sec, B7 displayed between the synchronization point marked by the time_code+3 sec and the synchronization point marked by the time_code+4 sec, and B8 displayed between the synchronization point marked by the time_code+4 sec and the synchronization point marked by the time_code+5 sec, the modulo_time_bases for the I1 and B2, displayed between the first synchronization point of the GOV and the synchronization point marked by the time_code+1 sec, are set to 0B.

Also, the modulo_time_bases for the B3 and B4, displayed between the synchronization point marked by time_code+1 sec and the synchronization point marked by the time_code+2 sec, are set to 10B. Furthermore, the modulo_time_base for the P5, displayed between the synchronization point marked by the time_code+2 sec and the synchronization point marked by the time_code+3 sec, is set to 110B.

Since the P5 is a P-VOP which is first displayed after the first synchronization point of a GOV has been switched to the synchronization point marked by the time_code+1 sec, the modulo_time_base for the P5 is set to 0B. The modulo_time_base for the B6, which is displayed after the B5, is set the assumption that a reference synchronization point used in computing the display time of the P5, i.e., the synchronization point marked by the time_code+2 sec in this case is the first synchronization point of the GOV. Therefore, the modulo_time_base for the B6 is set to 0B.

Thereafter, the modulo_time_base for the B7, displayed between the synchronization point marked by the time_code+3 sec and the synchronization point marked by the time_code+4 sec, is set to 10B. The modulo_time_base for the B8, displayed between the synchronization point marked by the time_code+4 sec and the synchronization point marked by the time_code+5 sec, is set to 110B.

The process at the encoder (VLC unit 36) described in FIGS. 32, 33, and 37 is performed so as to set the modulo_time_base in the above-mentioned manner.

Also, in this case, when the first displayed I/P-VOP after the switch of synchronization points is detected, at the decoder (IVLC unit 102) there is a need to add the number of seconds indicated by the modulo_time_base for the I/P-VOP to the time_code and compute the display time. For instance, in the case shown in FIG. 39, the display times of I1 to P5 can be computed by adding both the number of seconds corresponding to the modulo_time_base for each VOP and the VOP_time_increment to the time_code. However, the display times of B6 to B8, displayed after P5 which is first displayed after a switch of synchronization points, need to be computed by adding both the number of seconds corresponding to the modulo_time_base for each VOP and the VOP_time_increment to the time_code and, furthermore, by adding 2 seconds which is the number of seconds corresponding to the modulo_time_base for P5. For this reason, the process described in FIGS. 34, 35, and 38 is performed so as to compute display time in the aforementioned manner.

Next, the aforementioned encoder and decoder can also be realized by dedicated hardware or by causing a computer to execute a program which performs the above-mentioned process.

Figure 40:
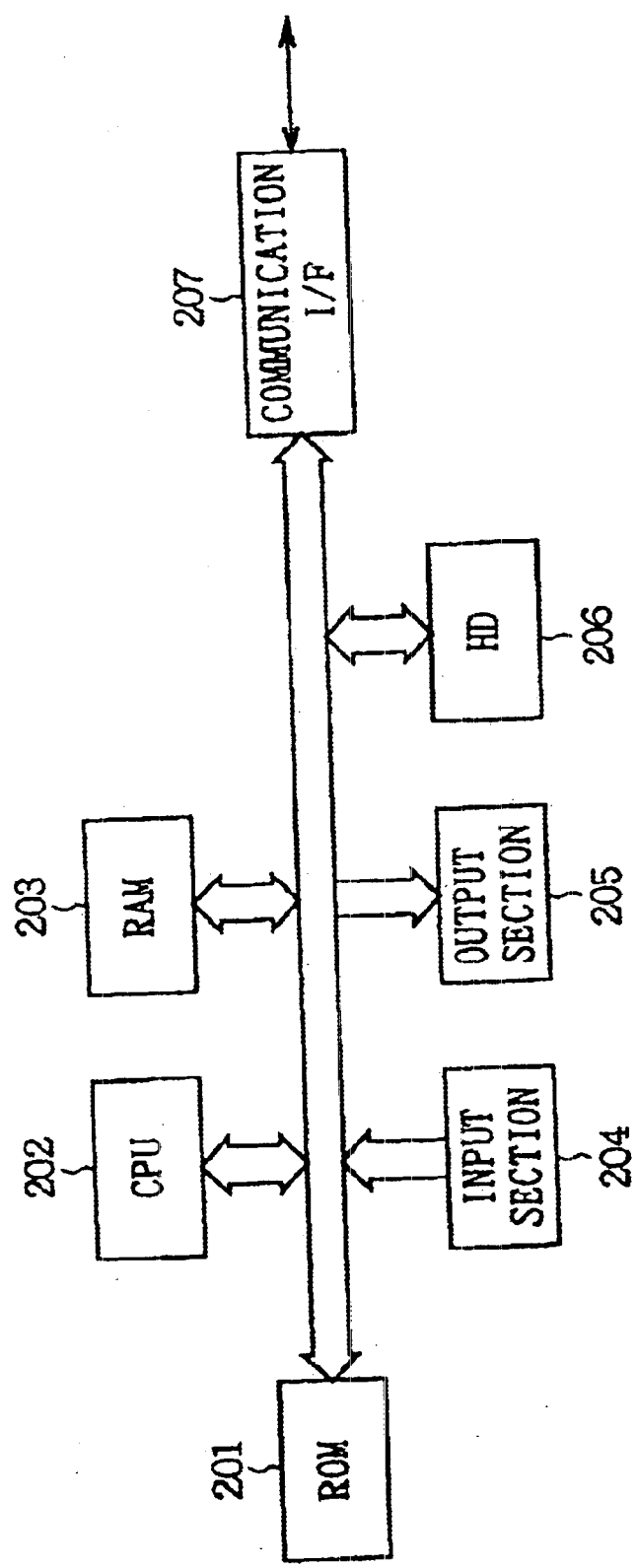
FIG. 40 is a block diagram showing the constitution example of another embodiment of an encoder and a decoder to which the present invention is applied.

FIG. 40 shows the constitution example of an embodiment of a computer which functions as the encoder of FIG. 3 or the decoder of FIG. 15.

A read only memory (ROM) 201 stores a boot program, etc. A central processing unit 202 performs various processes by executing a program stored on a hard disk (HD) 206 at a random access memory (RAM) 203. The RAM 203 temporarily stores programs which are executed by the CPU 202 or data necessary for the CPU 202 to process. An input section 204 is constituted by a keyboard or a mouse. The input section 204 is operated when a necessary command or data is input. An output section 205 is constituted, for example, by a display and displays data in accordance with control of the CPU 202. The HD 206 stores programs to be executed by the CPU 202, image data to-be encoded, coded data (coded bit stream), decoded image data, etc. A communication interface (I/F) 207 receives the image data of an encoding object from external equipment or transmits a coded bit stream to external equipment, by controlling communication between it and external equipment. Also, the communication I/F 207 receives a coded bit stream from an external unit or transmits decoded image data to an external unit.

By causing the CPU 202 of the thus-constituted computer to execute a program which performs the aforementioned process, this computer functions as the encoder of FIG. 3 or the decoder of FIG. 15.

In the embodiment of the present invention, although VOP_time_increment represents the display time of a VOP in the unit of a millisecond, the VOP_time_increment can also be made as follows. That is, the time between one synchronization point and the next synchronization point is divided into N points, and the VOP_time_increment can be set to a value which represents the nth position of the divided point corresponding to the display time of a VOP. In the case where the VOP_time_increment is thus defined, if N=1000, it will represent the display time of a VOP in the unit of a millisecond. In this case, although information on the number of divided points between two adjacent synchronization points is required, the number of divided points may be predetermined or the number of divided points included in an upper layer than a GOV layer may be transmitted to a decoder.

According to the image encoder of the present invention, one or more layers of each sequence of objects constituting an image are partitioned into a plurality of groups, and the groups are encoded. Therefore, it becomes possible to have random access to the encoded result at a group unit.

An advantage of the image encoder of the present invention is that second-accuracy time information indicative of time with an accuracy of one second, and detailed time information indicative of a time period between the second-accuracy time information which directly precedes the display time of I-VOP, P-VOP, or B-VOP and that display time with an accuracy finer than the accuracy of one second, are generated. Therefore, it becomes possible to recognize the display times of the I-VOP, P-VOP, and B-VOP on the basis of the second-accuracy time information and detailed time information and to perform random access on the basis of such recognition.

The present invention can be utilized with image information recording-regenerating in which dynamic image data is recorded on storage media, such as a magnetooptical disk, magnetic tape, etc., with the recorded data being regenerated and displayed. The invention can also be utilized in video-conference systems, videophone systems, broadcasting equipment, and multimedia data base retrieval systems, in which dynamic image data is transmitted from a transmitter to a receiver through a transmission path and, on the receiver side, the received dynamic data is displayed, edited or recorded.

What is claimed is:

1. A computer data signal encoded by an image encoder representing an encoded image formed of objects, with an object encoded by intracoding being an intra-video object plane (I-VOP), an object encoded by either intracoding or forward predictive coding being a predictive-VOP (P-VOP), and an object encoded by either intracoding, forward predictive coding, backward predictive coding, or bidirectionally predictive coding being a bidirectionally predictive-VOP (B-VOP), the image encoder comprising:

a first adder for grouping said objects into one or more groups and adding an absolute time code to the group at a head of the group at which encoding of the group is started;

a second-accuracy time information generator means for generating second-accuracy time information indicative of time having an accuracy of one second;

a detailed time information generator for generating detailed time information indicative of a time period between said second-accuracy time information which directly precedes display time of said I-VOP, P-VOP, or B-VOP and the display time with an accuracy finer than the accuracy of one second; and a second adder for adding said second-accuracy time information and said detailed time information to a corresponding I-VOP, P-VOP, or B-VOP as information indicative of the display time of said I-VOP, P-VOP, and B-VOP.

2. The computer data signal as set forth in claim 1, wherein said second-accuracy time information generator means selectively generates, as second-accuracy time information for a predetermined object, either a time between said absolute time code and the display time of said predetermined object, having an accuracy of one second, or a time between the display time of an I-VOP or P-VOP displayed immediately before said predetermined object and the display time of said predetermined object, having an accuracy of one second.

3. A method for generating a computer data signal representing an encoded image formed of a sequence of objects, with an object encoded by intracoding being an intra-video object plane (I-VOP), an object encoded by either intracoding or forward predictive coding being a predictive-VOP (P-VOP), and an object encoded by either intracoding, forward predictive coding, backward predictive coding, or bidirectionally predictive coding being a bidirectionally predictive-VOP (B-VOP), said generating method comprising the steps of:
grouping said objects into one or more groups and adding an absolute time code to the group at a head of the group at which encoding of the group is started;
generating second-accuracy time information indicative of time having an accuracy of one second;
generating detailed time information indicative of a time period between said second-accuracy time information which directly precedes display time of said I-VOP, P-VOP, or B-VOP and the display time with an accuracy finer than the accuracy of one second; and
adding said second-accuracy time information and said detailed time information to a corresponding I-VOP, P-VOP, or B-VOP as information indicative of the display time of said I-VOP, P-VOP, and B-VOP.

4. The method for generating a computer data signal as set forth in claim 3, wherein said second accuracy time information generator means selectively generates, as second-accuracy time information for a predetermined object, either a time between the encoding start time said absolute time code and the display time of said predetermined object, having an accuracy of one second, or a time between the display time of an I-VOP or P-VOP displayed immediately before said predetermined object and the display time of said predetermined object, having an accuracy of one second.

5. An image decoder for decoding a computer data signal representing a coded bit stream that had been produced by encoding an image formed of a sequence of objects, with an object encoded by intracoding being an intra-video object plane (I-VOP), an object encoded by either intracoding or forward predictive coding being a predictive-VOP (P-VOP), and an object encoded by either intracoding, forward predictive coding, backward predictive coding, or bidirectionally predictive coding being a bidirectionally predictive-VOP (B-VOP), wherein said objects have been grouped into one or more groups and an absolute time code has been added to the group at a head of the group at which encoding of the group is started, and with said coded bit stream including
both second-accuracy time information indicative of time within an accuracy of one second and detailed time information indicative of a time period between said second-accuracy time information which directly precedes a display time of the I-VOP, P-VOP, or B-VOP and the display time, said detailed time information having an accuracy finer than the accuracy of one second and having been added to a corresponding I-VOP, P-VOP, or B-VOP as information representing said display time, the image decoder comprising:
a display time computer for computing the display time of said I-VOP, P-VOP, or B-VOP on the basis of said absolute time code, said second-accuracy time information and said detailed time information; and
means for decoding said I-VOP, P-VOP, or B-VOP in accordance with the corresponding computed display time.

6. The image decoder as set forth in claim 5, wherein said second-accuracy time information for a predetermined object is selectively represented by a time between said absolute time code and the display time of said predetermined object having an accuracy of one second, or by a time between the display time of an I-VOP or P-VOP displayed immediately before said predetermined object and the display time of said predetermined object which is represented with an accuracy of one second.

7. An image decoding method for decoding a computer data signal representing a coded bit stream that has been produced by encoding an image formed of a sequence of objects, with an object encoded by intracoding being an intra-video object plane (I-VOP), an object encoded by either intracoding or forward predictive coding being a predictive-VOP (P-VOP), wherein said objects have been grouped into one or more groups and an absolute time code has been added to the group at a head of the group at which encoding of the group is started, and an object encoded by either intracoding, forward predictive coding, backward predictive coding, or bidirectionally predictive coding being a bidirectionally predictive-VOP (B-VOP), and with said coded bit stream including
both second-accuracy time information indicative of time with an accuracy of one second and detailed time information indicative of a time period between said second-accuracy time information which directly precedes display time of the I-VOP, P-VOP, or B-VOP and the display time, said detailed time information having an accuracy finer than the accuracy of one second and having been added to a corresponding I-VOP, P-VOP, or B-VOP as information representing said display time,
the image decoding method comprising the steps of:
computing the display time of said I-VOP, P-VOP, or B-VOP on the basis of said absolute time code, said second-accuracy time information and said detailed time information; and
decoding said I-VOP, P-VOP, or B-VOP in accordance with the corresponding computer display time.

8. The image decoding method as set forth in claim 7, wherein said second-accuracy time information for a predetermined object is selectively represented by a time between said absolute time code and the display time of said predetermined object having an accuracy of one second, or by a time between the display time of an I-VOP or P-VOP displayed immediately before said predetermined object and the display time of said predetermined object which is represented with an accuracy of one second.

9. A distribution medium for distributing a computer data signal representing a coded bit stream that has been produced by an encoding method for encoding an image formed of a sequence of objects, with an object encoded by intracoding being an intra-video object plane (I-VOP), an object encoded by either intracoding or forward predictive coding being a predictive-VOP (P-VOP), and an object encoded by either intracoding, forward predictive coding, or bidirectionally predictive coding being a bidirectionally predictive-VOP (B-VOP), said encoding method comprising:

grouping said objects into one or more groups and adding an absolute time code to the group at a head of the group at which encoding of the group is started;

generating second-accuracy time information indicative of time with an accuracy of one second;

generating detailed time information indicative of a time period between said second-accuracy time information which directly precedes a display time of said I-VOP, P-VOP, or B-VOP and the display time, said detailed time information having an accuracy finer than the accuracy of one second; and adding said second-accuracy time information and said detailed time information to a corresponding I-VOP, P-VOP, or B-VOP as information representing the display time of said I-VOP, P-VOP, or B-VOP.

10. The distribution medium as set forth in claim 9, wherein said second-accuracy time information for a predetermined object is selectively represented by a time between said absolute time code and the display time of said predetermined object having an accuracy of one second, or by time between the display time of an I-VOP or P-VOP displayed immediately before said predetermined object and the display time of said predetermined object which is represented with an accuracy of one second.

* * * * *